United States Patent
Mueller et al.

(10) Patent No.: US 11,416,129 B2
(45) Date of Patent: Aug. 16, 2022

(54) DATA ACCESS INTERFACE

(71) Applicant: The Research Foundation for The State University of New York, Albany, NY (US)

(72) Inventors: Klaus Mueller, New York, NY (US); Shenghui Cheng, Port Jefferson, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 380 days.

(21) Appl. No.: 15/997,108

(22) Filed: Jun. 4, 2018

(65) Prior Publication Data
US 2018/0348998 A1 Dec. 6, 2018

Related U.S. Application Data

(60) Provisional application No. 62/514,299, filed on Jun. 2, 2017.

(51) Int. Cl.
*G06F 16/332* (2019.01)
*G06F 3/04845* (2022.01)
(Continued)

(52) U.S. Cl.
CPC ........ *G06F 3/04845* (2013.01); *G06F 3/0482* (2013.01); *G06F 3/04815* (2013.01); *G06F 17/16* (2013.01); *G06K 9/00* (2013.01); *G06K 9/6221* (2013.01); *G06K 9/6251* (2013.01); *G06N 5/022* (2013.01); *G06N 5/048* (2013.01); *G06N 20/00* (2019.01); *G06N 20/10* (2019.01);
(Continued)

(58) Field of Classification Search
CPC ............ G06F 3/04845; G06F 3/04815; G06F 3/0482; G06F 17/16; G06F 3/04842; G06F 16/3328; G06F 16/2237; G06N 20/00; G06N 20/10; G06N 5/022; G06N 5/048; G06K 9/00; G06K 9/6221; G06K 9/6251
See application file for complete search history.

(56) References Cited

U.S. PATENT DOCUMENTS 6,453,246 B1   9/2002   Agrafiotis et al.
7,243,112 B2   7/2007   Qu et al.
(Continued)

OTHER PUBLICATIONS

"The Data Context Map: Fusing Data and Attributes into a Unfiled Display", IEEE Transactions on visualization and computer graphics, vol. 22, No. 1, Jan. 2016, URL=https://ieeexplore.ieee.org/abstract/document/7194836, download date Oct. 17, 2021, pp. 10. (Year: 2016).*

*Primary Examiner* — Vaishali Shah
(74) *Attorney, Agent, or Firm* — Scully, Scott, Murphy & Presser, P.C.

(57) ABSTRACT

The system, method, and computer readable medium described herein provide improvements in the ways that user interfaces present multi-dimensional relationships between data samples to a user. The disclosed user interface framework provides users with a visualization of the complex relationships between data samples having multi-dimensional attributes which allows the users to quickly and intuitively grasp the relationships between data samples for a large number of attributes at a glance and in a single data map visualization.

21 Claims, 37 Drawing Sheets
(36 of 37 Drawing Sheet(s) Filed in Color)

(51) Int. Cl.

| | | |
|---|---|---|
| *G06N 5/04* | (2006.01) | |
| *G06F 3/04815* | (2022.01) | |
| *G06F 3/0482* | (2013.01) | |
| *G06F 17/16* | (2006.01) | |
| *G06N 20/00* | (2019.01) | |
| *G06K 9/00* | (2022.01) | |
| *G06K 9/62* | (2022.01) | |
| *G06N 20/10* | (2019.01) | |
| *G06N 5/02* | (2006.01) | |
| *G06F 3/04842* | (2022.01) | |
| *G06F 16/22* | (2019.01) | |

(52) U.S. Cl.
CPC ...... *G06F 3/04842* (2013.01); *G06F 16/2237* (2019.01); *G06F 16/3328* (2019.01)

(56) References Cited

U.S. PATENT DOCUMENTS

| | | | |
|---|---|---|---|
| 7,603,329 B2 | 10/2009 | Wocke et al. | |
| 7,792,332 B2 | 9/2010 | Griffin | |
| 8,744,840 B1 | 6/2014 | Morrison | |
| 8,788,501 B2 | 7/2014 | Li et al. | |
| 8,832,140 B2 | 9/2014 | Tunkelang et al. | |
| 8,935,249 B2 | 1/2015 | Traub et al. | |
| 8,949,233 B2 | 2/2015 | Hsiao et al. | |
| 8,972,312 B2 | 3/2015 | Rachevsky et al. | |
| 9,111,375 B2 | 8/2015 | Meier | |
| 9,177,248 B2 | 11/2015 | Sweeney et al. | |
| 9,183,509 B2 | 11/2015 | Frank et al. | |
| 9,317,778 B2 | 4/2016 | Cordova-Diba et al. | |
| 9,396,412 B2 | 7/2016 | Kuo et al. | |
| 9,514,213 B2 | 12/2016 | Wood et al. | |
| 9,576,241 B2 | 2/2017 | Sweeney et al. | |
| 9,619,908 B1 | 4/2017 | Zuczek | |
| 9,740,773 B2 | 8/2017 | Grokop et al. | |
| 9,760,241 B1 * | 9/2017 | Lewbel | G06F 3/041 |
| 9,779,504 B1 * | 10/2017 | Biagiotti | G06K 9/00 |
| 9,852,195 B2 | 12/2017 | Ma et al. | |
| 10,325,272 B2 | 6/2019 | Hunt et al. | |
| 10,417,262 B2 | 9/2019 | Lewis | |
| 10,417,523 B2 | 9/2019 | Singh et al. | |
| 10,474,647 B2 | 11/2019 | Sweeney et al. | |
| 10,573,406 B2 | 2/2020 | DeHaven et al. | |
| 10,580,020 B2 * | 3/2020 | Sharma | G06Q 30/0204 |
| 10,769,197 B2 | 9/2020 | Elkaim et al. | |
| 10,824,607 B2 | 11/2020 | Xia et al. | |
| 10,878,292 B2 | 12/2020 | Sutton et al. | |
| 10,915,586 B2 | 2/2021 | Ulfelder, Jr. et al. | |
| 10,929,464 B1 | 2/2021 | Zuczek | |
| 10,937,213 B2 | 3/2021 | Zhao | |
| 11,003,694 B2 | 5/2021 | Kenedy et al. | |
| 11,151,982 B2 | 10/2021 | Tomkins et al. | |
| 11,176,589 B2 | 11/2021 | Pyati | |
| 11,182,422 B2 | 11/2021 | Elkaim et al. | |
| 11,244,765 B2 | 2/2022 | Warrier et al. | |
| 2007/0022074 A1 * | 1/2007 | Muramatsu | A61B 5/0002 706/50 |
| 2012/0303258 A1 * | 11/2012 | Pampus | B60W 30/0956 701/301 |
| 2015/0309962 A1 * | 10/2015 | Lichman | G06Q 10/10 703/2 |
| 2017/0048266 A1 * | 2/2017 | Hovor | H04L 63/14 |
| 2017/0090460 A1 * | 3/2017 | Andrew | G06T 19/20 |
| 2018/0314939 A1 * | 11/2018 | Skiles | G06N 3/08 |
| 2018/0336645 A1 * | 11/2018 | Price | H04L 51/32 |
| 2019/0064794 A1 * | 2/2019 | Chen | G05D 1/106 |
| 2019/0139642 A1 * | 5/2019 | Roberge | G06F 3/013 |
| 2019/0311781 A1 * | 10/2019 | Stratford | G16B 40/20 |
| 2020/0019882 A1 * | 1/2020 | Garg | G06N 20/00 |
| 2020/0040719 A1 * | 2/2020 | Maniar | E21B 41/00 |

* cited by examiner

100

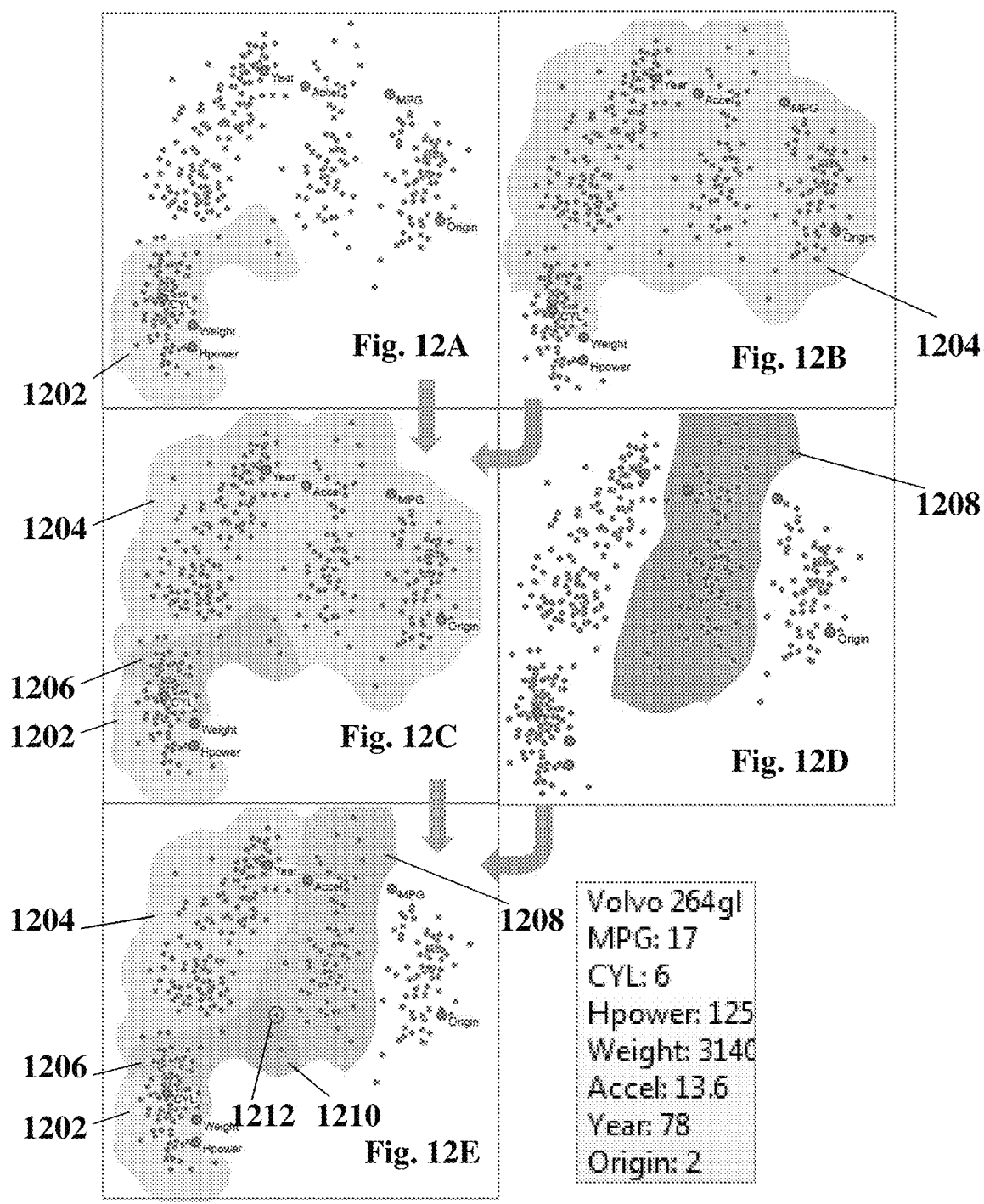

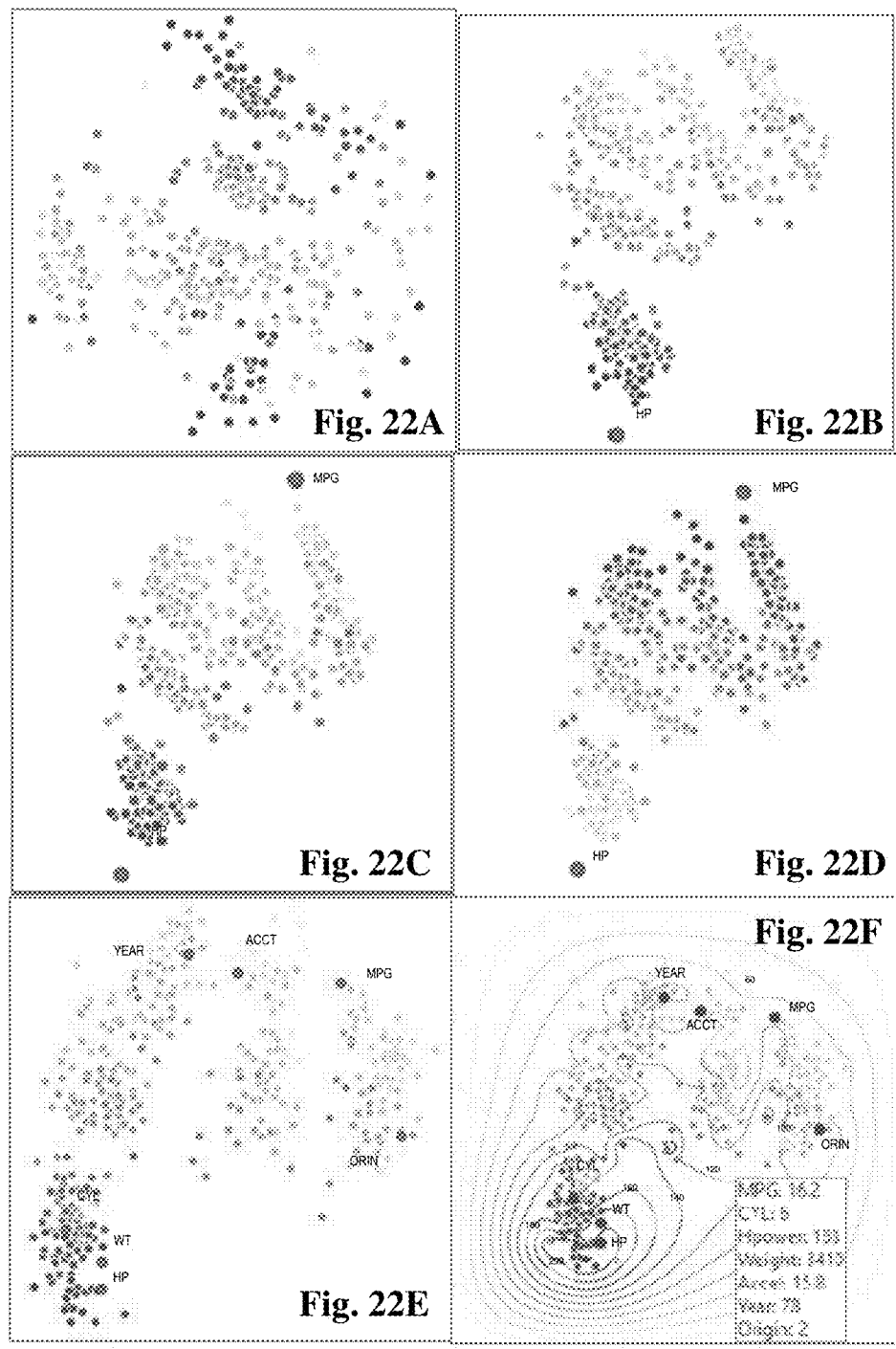

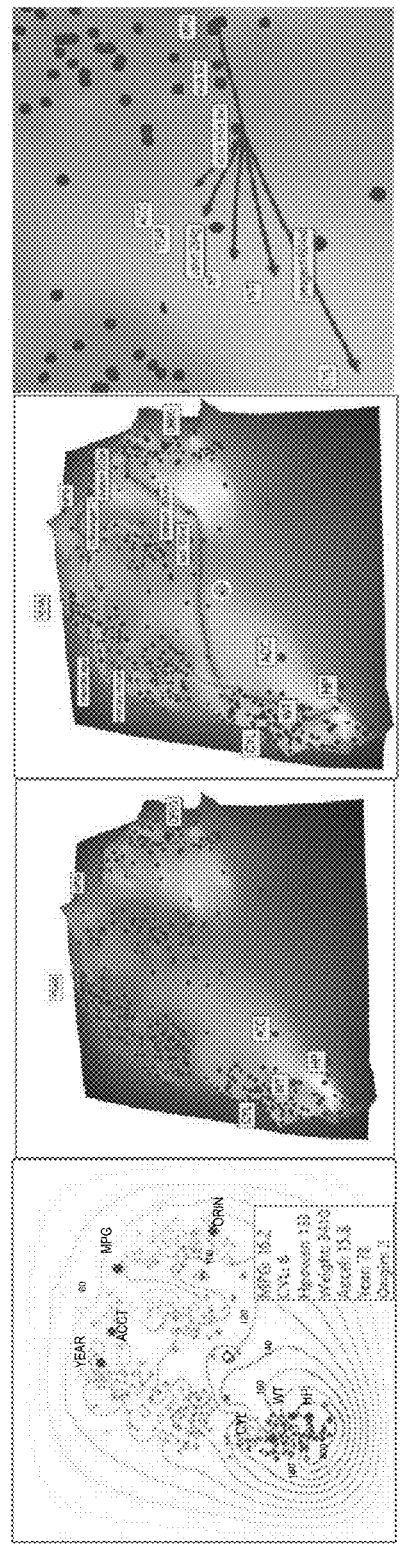

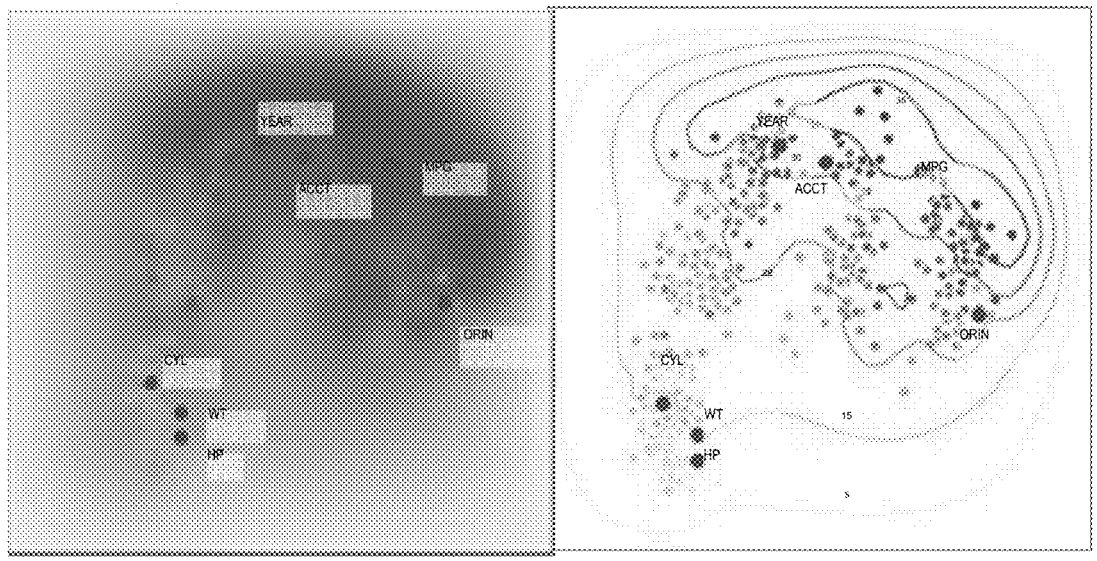
Fig. 25A                Fig. 25B
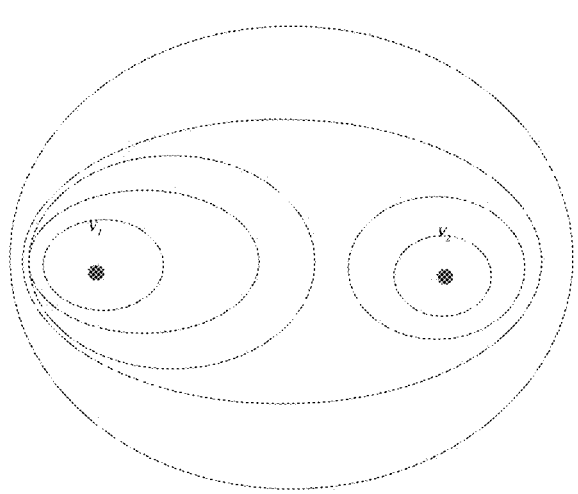                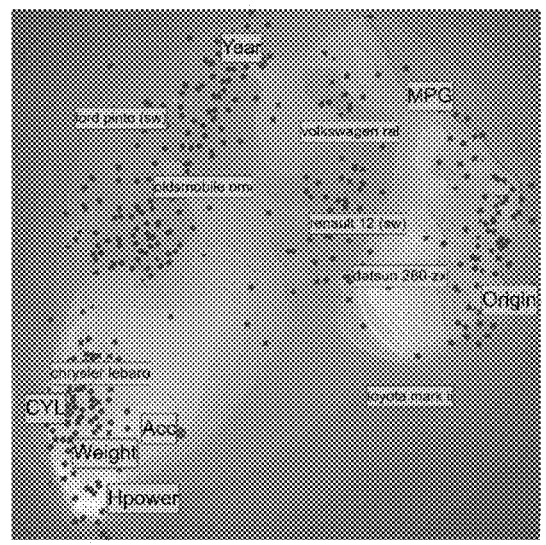
Fig. 26A                Fig. 26B

DATA ACCESS INTERFACE

CROSS REFERENCE TO RELATED APPLICATION

This application claims the benefit of priority from U.S. Provisional Application No. 62/514,299 filed Jun. 2, 2017, the entire contents of which are incorporated herein by reference.

GOVERNMENT LICENSE RIGHTS

This invention was made with government support under 1527200 awarded by the National Science Foundation. The government has certain rights in the invention.

TECHNICAL FIELD

The present disclosure relates to improvements in the ways user interfaces may present multi-dimensional relationships between data samples to a user.

BACKGROUND

The data matrix, DM, is one of the most fundamental structures in data analytics. It is the M×N rectangular array of N variables (often referred to as attributes or labels) and M samples (also frequently called cases, observations, data items, or data points). The N×N or M×M similarity (e.g., co-occurrence or correlation) matrix S is another often used structure and is frequently derived from DM. It should be noted that the roles of variables and samples may also change. For example, there are many practical settings in which the 'variables' may be considered as outcomes that are to be predicted (or used to make predictions) using a set of samples that are previously acquired.

BRIEF SUMMARY

The system, method, and computer readable medium described herein provide improvements in the ways that user interfaces present multi-dimensional relationships between data samples to a user. The disclosed user interface framework provides users with a visualization of the complex relationships between data samples having multi-dimensional attributes which allows the users to quickly and intuitively grasp the relationships between data samples for a large number of data sample attributes at a glance and in a single context data map visualization.

In an aspect of the present disclosure, a method is disclosed including generating a first similarity matrix encoding a similarity between a plurality of attributes, generating a second similarity matrix encoding a similarity between a plurality of data samples, fusing the first and second similarity matrices to generate a first fused similarity matrix that encodes a similarity of the plurality of data samples with respect to the plurality of attributes and a second fused similarity matrix that encodes the similarity of the plurality of attributes with respect to the plurality of data samples, generating a composite distance matrix based on the first similarity matrix, second similarity matrix, first fused similarity matrix and second fused similarity matrix, and generating a data context map based on the composite distance matrix. The data context map presents each data sample at a distance relative to each attribute based on a relative value of each attribute for each data sample. The method further includes presenting the data context map to a user via a display device, receiving a selection on the presented data context map of a first data sample, and receiving a selection on the presented data context map of a second data sample. The first data sample is located closer to a first of the attributes on the presented data context map than the second data sample. The second data sample is located closer to a second of the attributes on the presented data context map than the first data sample. The method further including generating a pathway between the first data sample and the second data sample where the pathway includes the first data sample, the second data sample, and at least one intermediate data sample. The intermediate data sample represents a tradeoff between the first data sample and the second data sample with respect to the first of the attributes and the second of the attributes. The method further including presenting the pathway to a user on the data context map via the display device.

In an aspect, the location of each data sample on the data context map may be based at least in part on a similarity of the data sample to at least one other data sample and on a similarity between an attribute of the data sample to the same attribute of the at least one other data sample.

In some aspects, the location of each data sample on the context map may be based at least in part on the similarity of the plurality of data samples with respect to the plurality of attributes encoded in the first fused similarity matrix and the similarity of the plurality of attributes with respect to the plurality of data samples encoded in the second fused similarity matrix.

In additional aspects, the first of the attributes and the second of the attributes may be negatively correlated or have a level of similarity below a pre-determined threshold amount.

In yet additional aspects, the method may further include determining first and second frontier pathways based on the negative correlation or level of similarity between first of the attributes and the second of the attributes where the first frontier pathway corresponds to data samples having as high a correlation between the first and second of the attributes as possible and the second frontier path corresponds to data samples having as low a correlation between the first and second attributes as possible, and presenting the first and second frontier pathways on the data context map.

In some aspects, the context data map may be presented as a 3D scalar field.

In some additional aspects, the method may further include receiving a selection of a first of the attributes and a second of the attributes, and colorizing contour lines of the 3D scalar field associated with the selected first of the attributes and second of the attributes where the contour lines associated with each selected attribute may have a different color.

In some aspects, the method may further include receiving a selection of a first criteria associated with a first of the attributes, determining a first region of the data context map corresponding to the first criteria where each data sample in the first region has corresponding attributes that meet the first criteria, receiving a selection of a second criteria associated with the second of the attributes, and determining a second region of the data context map corresponding to the second criteria where each data sample in the second region has corresponding attributes that meet the second criteria. In some aspects, presenting the data context map may include presenting a visual indication of the first and second regions on the data context map to a user via a display device.

In yet other aspects, the method may further include determining an impact region extending along the pathway and defining a pre-determined width about the pathway where the impact region includes at least one intermediate data sample that is not located on the pathway but has a tradeoff between the first data sample and the second data sample with respect to the first of the attributes and the second of the attributes that is similar to a tradeoff that would be found in an intermediate data sample located on the pathway at a location adjacent to the at least one intermediate data sample.

In an aspect, a non-transitory computer readable medium is disclosed that stores instructions that, when executed by at least one hardware processor, configure the at least one hardware processor to generate a first similarity matrix encoding a similarity between a plurality of attributes, generate a second similarity matrix encoding a similarity between a plurality of data samples, fuse the first and second similarity matrices to generate a first fused similarity matrix that encodes a similarity of the plurality of data samples with respect to the plurality of attributes and a second fused similarity matrix that encodes the similarity of the plurality of attributes with respect to the plurality of data samples, generate a composite distance matrix based on the first similarity matrix, second similarity matrix, first fused similarity matrix and second fused similarity matrix, generate a data context map based on the composite distance matrix where the data context map presents each data sample at a distance relative to each attribute based on a relative value of each attribute for each data sample, present the data context map to a user via a display device, receive a selection on the presented data context map of a first data sample, receive a selection on the presented data context map of a second data sample where the first data sample is located closer to a first of the attributes on the presented data context map than the second data sample and the second data sample is located closer to a second of the attributes on the presented data context map than the first data sample, generate a pathway between the first data sample and the second data sample where the pathway includes the first data sample, the second data sample, and at least one intermediate data sample representing a tradeoff between the first data sample and the second data sample with respect to the first of the attributes and the second of the attributes, and present the pathway to a user on the data context map via the display device.

In some aspects, the location of each data sample on the data context map may be based at least in part on a similarity of the data sample to at least one other data sample and a similarity between an attribute of the data sample to the same attribute of the at least one other data sample.

In additional aspects, the location of each data sample on the context map may be based at least in part on the similarity of the plurality of data samples with respect to the plurality of attributes encoded in the first fused similarity matrix and the similarity of the plurality of attributes with respect to the plurality of data samples encoded in the second fused similarity matrix.

In yet other aspects, the first of the attributes and the second of the attributes may be negatively correlated or have a level of similarity below a pre-determined threshold amount.

In some aspects, the instructions may further configure the at least one hardware processor to determine first and second frontier pathways based on the negative correlation or level of similarity between first of the attributes and the second of the attributes where the first frontier pathway corresponds to data samples having as high a correlation between the first and second of the attributes as possible and the second frontier path corresponding to data samples having as low a correlation between the first and second attributes as possible, and present the first and second frontier pathways on the data context map.

In yet other aspects, the context data map may be presented as a 3D scalar field.

In some additional aspects, the instructions may further configure the at least one hardware processor to receive a selection of a first of the attributes and a second of the attributes, and colorize contour lines of the 3D scalar field associated with the selected first of the attributes and second of the attributes where the contour lines associated with each selected attribute may have a different color.

In some aspects, the instructions may further configure the at least one hardware processor to receive a selection of a first criteria associated with a first of the attributes, determine a first region of the data context map corresponding to the first criteria where each data sample in the first region may have corresponding attributes that meet the first criteria, receive a selection of a second criteria associated with the second of the attributes, and determine a second region of the data context map corresponding to the second criteria where each data sample in the second region may have corresponding attributes that meet the second criteria. In further aspects, presenting the data context map may include presenting a visual indication of the first and second regions on the data context map to a user via a display device.

In some additional aspects, the instructions may further configure the at least one hardware processor to determine an impact region extending along the pathway and defining a pre-determined width about the pathway where the impact region includes at least one intermediate data sample that is not located on the pathway but has a tradeoff between the first data sample and the second data sample with respect to the first of the attributes and the second of the attributes that is similar to a tradeoff that would be found in an intermediate data sample located on the pathway at a location adjacent to the at least one intermediate data sample.

In an aspect, a method is disclosed including receiving training data for training a machine learning model where the training data includes a plurality of data samples, receiving classifier data for training the machine learning model where the classifier data includes a plurality of attributes, generating a first similarity matrix encoding a similarity between the plurality of attributes of the classifier data, generating a second similarity matrix encoding a similarity between the plurality of data samples of the training data, fusing the first and second similarity matrixes to generate a first fused similarity matrix that encodes a similarity of the plurality of data samples with respect to the plurality of attributes and a second fused similarity matrix that encodes the similarity of the plurality of attributes with respect to the plurality of data samples, generating a composite distance matrix based on the first similarity matrix, second similarity matrix, first fused similarity matrix and second fused similarity matrix, generating a data context map based on the composite distance matrix where the data context map presents each data sample at a distance relative to each attribute based on a relative value of each attribute for each data sample, receiving a selection of a first criteria associated with a first of the attributes, determining a first region of the data context map corresponding to the first criteria where each data sample in the first region has corresponding attributes that meet the first criteria, receiving a selection of a second criteria associated with the second of the attributes, determining a second region of the data context map corresponding to the second criteria where each data sample in the second region has corresponding attributes that meet the second criteria, presenting the data context map including the first and second regions to a user via a display device, receiving a user input selecting at least one data sample of the data context map, the user input indicating that the selected at least one data sample is misclassified, and updating the classification data based on the received user input.

In some aspects, the method may further include training a machine learning model based on the training data and the updated classification data.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The details of the present disclosure, both as to its structure and operation, can be understood by referring to the accompanying drawings, in which like reference numbers and designations refer to like elements.

FIGS. 12A-E illustrate the creation of decision regions in a map in accordance with some aspects of the present disclosure.

FIG. 22A illustrates an MDS layout in accordance with some aspects of the present disclosure.

FIG. 22B illustrates an attribute driven layout with one attribute in accordance with some aspects of the present disclosure.

FIGS. 22C and 22D illustrate an attribute driven layout with two attribute having corresponding fields in accordance with some aspects of the present disclosure.

FIG. 22E illustrates an attribute driven layout with all attributes included in accordance with some aspects of the present disclosure.

FIG. 22F illustrates an attribute driven layout with all attributes and including an iso-contour for a selected attribute in accordance with some aspects of the present disclosure.

FIG. 24A is a plot based on a scatterplot++ layout with HP contour lines in accordance with some aspects of the present disclosure.

FIG. 24B is a height field surface plot of the plot of FIG. 24A in accordance with some aspects of the present disclosure.

FIG. 24C is a colorized version of the height field surface plot of FIG. 24B including pareto frontier pathways in accordance with some aspects of the present disclosure.

FIG. 24D illustrates a plot including a multidimensional gradient for a point in accordance with some aspects of the present disclosure.

FIGS. 25A and 25B illustrate heatmap and contour plot visualizations, respectively, for MPG in accordance with some aspects of the present disclosure.

FIG. 26A illustrates a plot of a value mixture distribution in accordance with some aspects of the present disclosure.

FIG. 26B illustrates a height field with contour likes of HP and MPG in accordance with some aspects of the present disclosure.

DETAILED DESCRIPTION

Figure 1A:
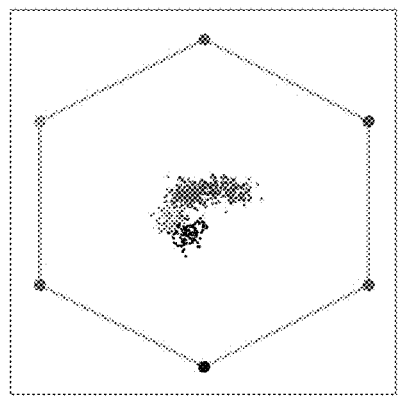
FIG. 1A illustrates a plot of data samples and attributes according to a GBC layout scheme.

When using a data matrix DM as described above it may often be beneficial to present a visualization of the data matrix DM to a user in a format that allows a user to easily understand the relationships between the various parts of the data matrix DM. Current visualization methods either focus on spatially preserving the relations among the data samples or spatially preserving the relations among the attributes, but not both. These types of visualizations, however, may severely limit a user's understanding of the relationships between the attributes and the data samples in the data matrix DM.

Disclosed is a transformation of the data matrix DM into a comprehensive map in which the acquired data samples are accurately presented in the context of the attributes which significantly improves the value of the presented visualization.

To illustrate these points, consider a parent looking for a university for their child. This is an important decision with many variables or attributes to consider, e.g., academic score, tuition, athletics, teacher/student ratio, and many others attributes. Some existing websites allow users to navigate this attribute space by filtering, e.g., using slider bars and menu selections for each attribute to narrow down the search. But this method may be tedious and also makes it difficult to recognize tradeoffs between different attributes, since a filtered attribute is no longer present. In another example method, a visualization expert may utilize interactive parallel coordinates plots to present the data but it may be difficult for an average parent to engage in such an advanced interface. Other visualization methods, such as biplots or interior layouts are seldom found in the mainstream arena.

The wide-spread familiarity of maps, on the other hand, makes these a natural canvas to overview the landscape of universities in the context of the various attributes to consider. Parents and students may simply examine this illustration like an infographic and then decide on a school. They could still use a filter to eliminate some schools from the map but they would never lose sight of the big picture.

Methods like Multidimensional scaling (MDS), self-organizing map (SOM), t-distributed stochastic neighbor embedding (t-SNE), locally linear embedding (LLE), etc., create 2D map-like data layouts computed from the similarity matrix S of data samples, e.g., a similarity matrix of schools in this case. The entries of S are derived by assessing the distances of pairs of the M schools in the N-D space spanned by the N attribute axes. The maps will show similar schools as clusters, and special schools as outliers. While this type of visualization is certainly useful, parents and students will not know from the plot alone why some schools are special and others are clustered. For example, they will not have an understanding of what the relationships between their respective attributes are, e.g., ranking, tuition, athletics, or other similar attributes.

It is important to note that similarity matrix S could alternatively hold the similarities of attributes. The maps mentioned above would then allow a visual assessment of the groupings of attributes based on similarity. So instead of finding that schools A and B are very similar (or dissimilar) in terms of their attributes, one would find that attributes C and D are heavily correlated (or not) in this set of schools. A parent might learn that the higher the academic score, the higher the tuition, and the higher the number of students per faculty. And so, if the parent is interested in smaller classes, schools with lower academic scores might be a better choice. Hence, while such a plot is useful in explaining the relationships of the different features of the educational landscape, it does not provide sufficient information to allow a parent to pick a specific school for their child, which is what they really wish to do.

The disclosed framework overcomes these limitations and combines both of the similarity aspects derived from data matrix DM into a single comprehensive map called the data context map. It requires a non-trivial fusion of the two alternative similarity matrices S discussed above, the similarity matrix of data samples and the similarity matrix of attributes. This fused matrix may be used to generate a mapping that allows users to appreciate all three types of relationships in a single user interface display: (1) the patterns of the collection of data samples, (2) the patterns of the collection of attributes, and (3) the relationships of data samples with the attributes and vice versa. Further, the contextual mapping also provides the information needed to add semantic labeling of the data samples as well as the regions they reside in. Iso-contouring these regions then creates decision boundaries by which one can easily recognize trade-offs among different data samples which may assist the user in complex decision making.

The visualization of high-dimensional data on a 2D canvas essentially follows three major paradigms—projective data displays, interior displays, and space embeddings. However, since the visualization of high-dimensional data in 2D is inherently an ill-posed problem, there is no method without drawbacks. It is simply impossible to preserve all variances of a high-dimensional point cloud in a 2D mapping. Hence the different methods that have been described offer different strengths and weaknesses, but some do better than others.

Projective and Interior Displays

Projective and interior displays typically warp the data in some way to emphasize certain properties, such as locality or similarity. An example projective display is the scatterplot matrix which is an extension of the scatterplot. It reserves a scatterplot tile for each pair of variables and projects the data items into it. This distributes the data context into two variables per tile which makes it difficult to appreciate the overall context pertaining to all variables simultaneously. In addition, the mapping operation can lead to ambiguities as points located far away in high-dimensional space may project into similar 2D locations. This adds to the difficulties for recognizing multivariate relationships.

Parallel coordinates and their radial version, the star plot, represent the variables as parallel or radial axes, respectively, and map the data as polylines across the axes. However, the clutter of polylines may become a significant problem once the number of dimensions and data points increases. In order to decrease the clutter of lines, star coordinates may be used to arrange the attribute axes in a radial fashion but instead of constructing polylines, they plot the data points as a vector sum of the individual axis coordinates. However, since a vector sum is an aggregation, it maps the data to locations that are not unique. In other words, points that map to nearby locations may not be close in high-dimensional space, and vice versa. To help users resolve these ambiguities, at least partially, an interactive interface is often provided that allows them to rotate and scale the data axes and so uncover false neighbors.

There are a number of display frameworks that are similar to star coordinates and share its shortcomings. These include, for example, are Radviz, Generalized Barycentric Coordinates (GBC) plot, and PolyViz. These are called interior displays since they all lay out the variables as dimension anchors around a circle and map the data items as points inside it, given some weighting function that relates to a data point's different attribute strengths. All of these displays are useful in what they have been designed to convey, that is, the relation of data points with respect to the attributes. But since the mapping function does not involve the similarity of the data points, ambiguities result.

Disclosed is an optimization approach that reduces the data mapping ambiguities in Radviz-type displays. The current framework is radically different in that it maps the attributes not in the periphery along a circle, but intersperses them into the data distribution which reduces all mapping errors significantly. It also enables the use of region labeling and decision boundaries.

Comparing the Interior Displays

The GBC method can serve as a standard reference framework to describe most interior displays. The GBC plot uses the dimension values of an N-D point as weights in a weighted sum of the anchor 2D locations to determine the point's placement in the 2D polygon.

Figure 1B:
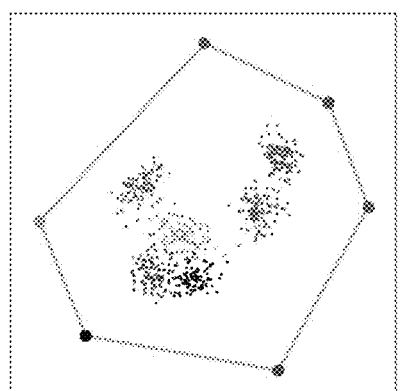
FIG. 1B illustrates a plot of data samples and attributes according to an optimized GBC layout scheme.
Figure 1C:
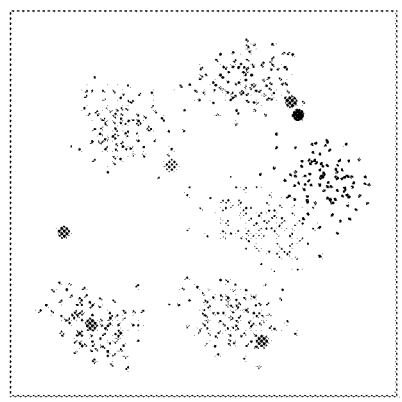
FIG. 1C illustrates a plot of data samples and attributes in accordance with some aspects of the present disclosure.
Figures 5A, 5B, 5C:
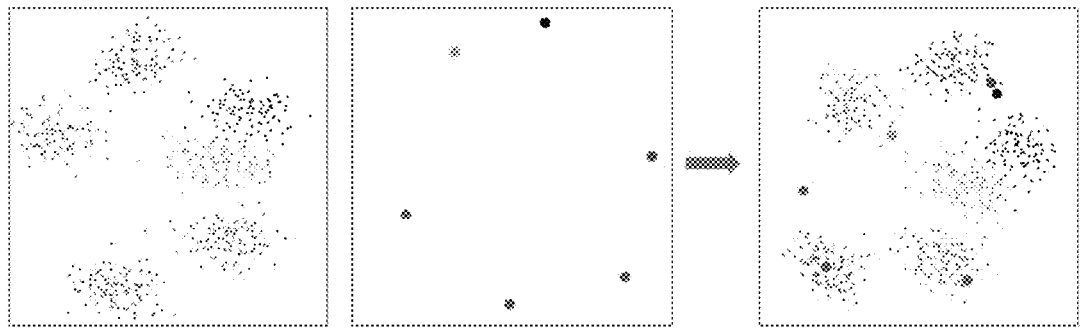
FIG. 5A is a plot of data samples according to the Multidimensional scaling (MDS) layout in accordance with some aspects of the present disclosure.
FIG. 5B is a plot of attributes according to the MDS layout in accordance with some aspects of the present disclosure.
FIG. 5C is a plot of the combined data samples and attributes of FIGS. 5A and 5B in accordance with some aspects of the present disclosure.
Figure 5D:
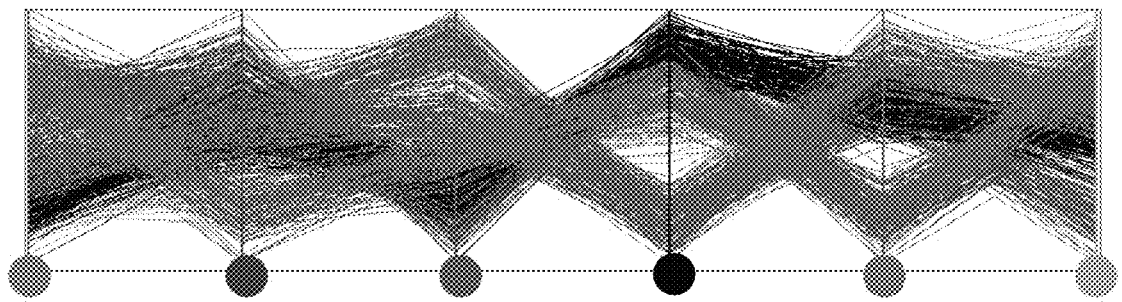
FIG. 5D is a parallel coordinate display of the dataset with the axes marked with the colors used for the attribute nodes in accordance with some aspects of the present disclosure.

A controlled experiment using GBC plots has been conducted for comparison to the framework of this disclosure. For this experiment, a test dataset comprised of a set of 6 6-D Gaussian distributions. The 6 6-D center vectors are first randomized and then 600 data points are randomized following these distributions. FIG. 5D visualizes this dataset using parallel coordinates, assigning each Gaussian a unique color. In addition, the axes are also colored (representing the 6 dimensions) such that each axis color matches that of the cluster with the highest value for that dimension. FIGS. 1A-1C show how standard GBC (FIG. 1A) compares with the optimized GBC plot (FIG. 1B) and the disclosed method (FIG. 1C) which allows the attribute nodes to intersperse with the samples. The disclosed method is more flexible with improved preservation of the pairwise distances as compared to the standard and optimized GBC plots.

Figure 2A:
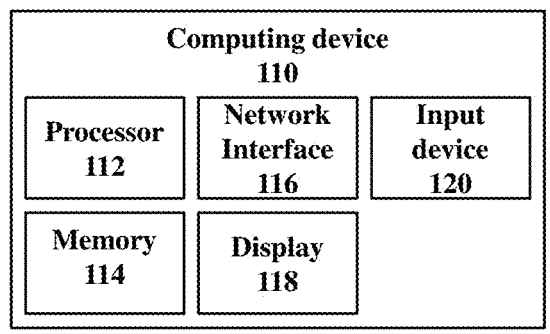
FIG. 2A is a system diagram illustrating a system for generating a data context map in accordance with some aspects of the present disclosure.

With reference now to FIG. 2A, a system 100 for generating data context map for a data matrix DM is illustrated. In some aspects, system 100 includes a computing device 110.

Computing device 110 includes at least one processor 112, memory 114, at least one network interface 116, a display 118, an input device 120, and may include any other features commonly found in a computing device. In some aspects, computing device 110 may, for example, be a computing device associated with a user that is configured to present the user with a data context map generated based on a data matrix DM. In some aspects, computing device 110 may include, for example, a personal computer, laptop, tablet, smart device, smart phone, smart watch, or any other similar computing device that may be used by a user.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114. As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Memory 114 may include, for example, computer readable media or computer readable storage media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In some aspects, data matrix DM may be stored in memory 114.

Network interface 116 is configured to transmit and receive data or information to and from a server, remote data repository, or any other computing device via wired or wireless connections. For example, network interface 116 may utilize wireless technologies and communication protocols such as Bluetooth®, WWI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from server 150. In some aspects, for example, data matrix DM may be received from another computing device, server, data repository, or other similar device via network interface 116.

Display 118 may include any display device that is configured to display information to a user of computing device 110. For example, in some aspects, display 118 may include a computer monitor, television, smart television, or other similar displays. In some aspects, display 118 may be integrated into or associated with computing device 110, for example, as a display of a laptop, smart phone, smart watch, or other smart wearable devices, as a virtual reality headset associated with computing device 110, or any other mechanism for displaying information to a user. In some aspects, display 118 may include, for example, a liquid crystal display (LCD), an e-paper/e-ink display, an organic LED (OLED) display, or other similar display technologies. In some aspects, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Using system 100, a mapping may be created in which all three types of relationships in data matrix DM are preserved, the relationships among the data samples, the relationships among the attributes, and mutual relationships among the data samples and the attributes. In some aspects, the notion of relationship may be a distance, such as, e.g., Euclidian (across space), geodesic (across a manifold) or other similar types of distance, the relationship may be a similarity, such as, e.g., Pearson's correlation, cosine, pattern, or other similarities, or the relationship may be another measure of significance, such as, e.g., a value or a feature. In some aspects, these functions may be collectively combined into a distance metric, F, and, depending on the application, each relationship may be expressed in a different F. For example, the similarity of attributes may be measured by correlation, while the proximity of samples may be gauged via the Euclidian distance. The disclosed mapping attempts to preserve this set of simultaneous constraints as well as possible by using an optimization strategy based on a fused representation of the three types of relationships. The pipeline of this process is shown in FIG. 2B including data, distance, fusion, and mapping.

Figure 2B:
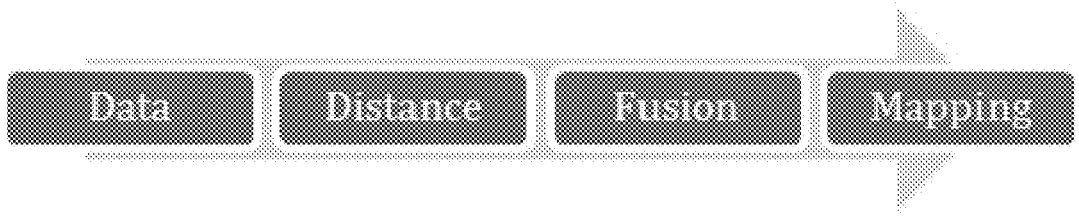
FIG. 2B is a diagram illustrating a fusion pipeline for generating a data context map in accordance with some aspects of the present disclosure.

The following description outlines the various steps of the pipeline of FIG. 2B in detail. The underlying primitive is a distance matrix, one for each of the three pairs, encoding the respective F. The fusion process then merges these three matrices into a single distance matrix emphasizing certain constituents or equalizing them. This is followed by a mapping to 2D using an optimization process.

Data Matrix

We begin with DM, the data matrix, with m rows and n columns as set forth below in equation (1):

$$DM = \begin{bmatrix} x_{11} & \cdots & x_{1n} \\ \vdots & \ddots & \vdots \\ x_{m1} & \cdots & x_{mn} \end{bmatrix} \quad (1)$$

In equation (1), the rows denote the data samples, the columns denote the attributes where $x_{ij}$ is the data value in the ith row and jth column. Without loss of generality, we assume DM is normalized to [0, 1].

Figure 3:
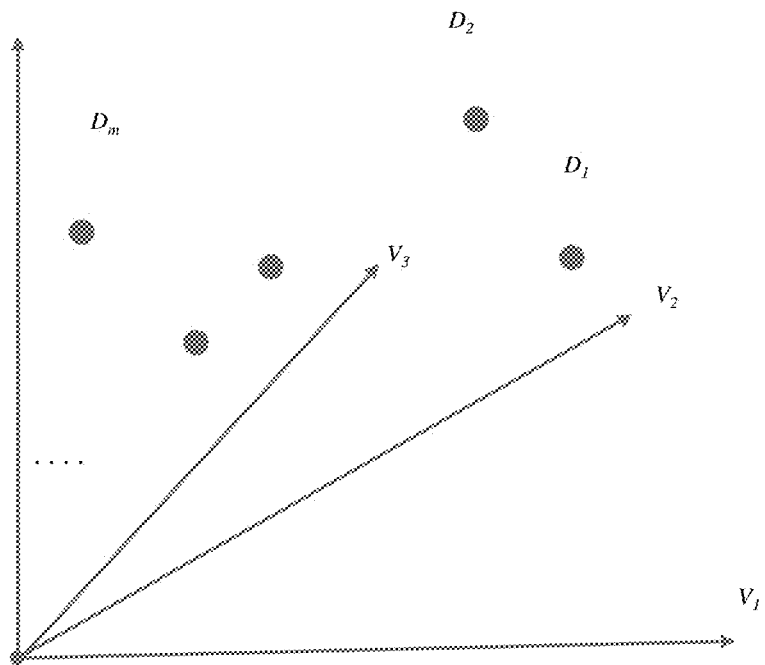
FIG. 3 is a plot of a data space in accordance with some aspects of the present disclosure.

Depending on how we visualize DM, row-wise or column-wise, two types of spaces may be determined, the data space D and the variable space V, respectively. The data space D contains all m data items (data samples), according to equation (2) below, and is spanned by the n orthogonal attribute axes, for example, as illustrated, for example, in FIG. 3.

$$D_i = [x_{i1}, x_{i2}, \ldots, x_{in}] (i=1,2,\ldots,m) \quad (2)$$

Figure 4:
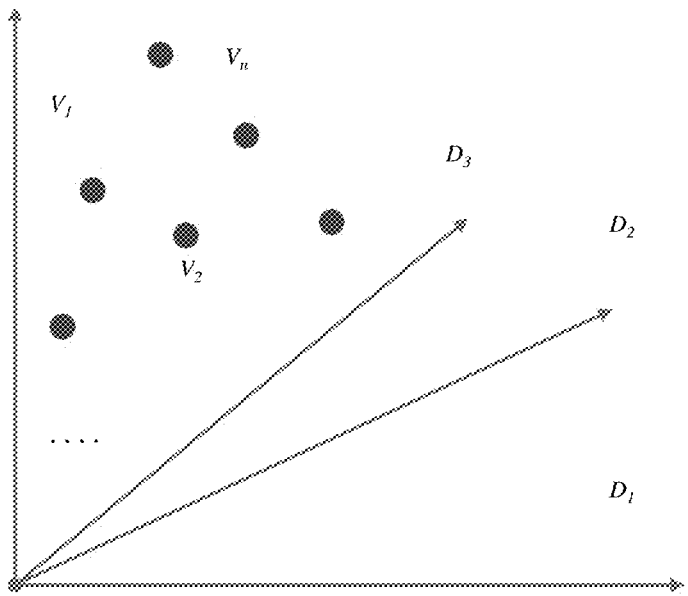
FIG. 4 is a plot of an attribute space in accordance with some aspects of the present disclosure.

Conversely, the variable space V contains all n data attributes, according to equation (3) below, and is spanned by a set of m orthogonal data item axes, for example, as illustrated in FIG. 4.

$$V_j = [x_{1j}, x_{2j}, \ldots, x_{mj}]' (j=1,2,\ldots,n) \quad (3)$$

The data space D is the more familiar of the two but there are many applications, in which data samples can turn into attributes and vice versa depending on the focus of the analytics. For example, for a data matrix storing the results of a DNA microarray experiment for multiple specimens, one research objective might consider the genes expressed in the microarray to be the data samples and the specimens to be the attributes, or vice versa.

The Composite Distance Matrix (CM)

Next the desired distance or similarity metric for each relationship is defined. To map more similar items into closer proximity, 1-correlation, and 1-attribute value, may be used, while the spatial distance metrics, such as Euclidian may be used as is. This provides four different distance matrices:

1) Matrix DD to store the pairwise distance of data samples.
2) Matrix VV to store the pairwise distance of attributes.
3) Matrix VD to store the pairwise distance of attributes to data samples.
4) Matrix DV to store the pairwise distance of data samples to attributes.

DD is an n×n matrix with elements DDij=F(Di, Dj) and VV is a m×m matrix with elements VVij=F(Vi,Vj). FIG. 5A illustrates an MDS layout of DD FIG. 5B illustrates an MDS layout of VV respectively based on 6 test Gaussian distributions.

The Data to Variables Distance Matrices (DV, VD)

The DV and VD matrices are new types of matrices. They are required to enforce the distance/similarity constraints in the relation of the data samples with the attribute (dimension) anchors and vice versa. In the following, let us first consider DV where similar arguments also hold for VD.

Referring again to FIG. 3 which shows the data space D, an attribute axis is essentially just another data sample, e.g., a (fictional) data point with unit length, n dimensions, and a single non-zero component, namely a value of 1 for the attribute's dimension j. The attribute vector serves a dual role: (1) as a dimension axis and (2) as a data point. With this in mind any distance metric may be imposed that links the m data samples with the n attribute axes to fill the m×n matrix DV.

Referring again to FIG. 4, the derivation of the matrix VD follows a similar format. The variable space V depicted in FIG. 4 includes axes that are m-dimensional unit vectors each with exactly one dimension component set to 1. A point in that space is defined by the values a certain variable has for all of the data samples, e.g., one column of DM. For example, for a car dataset, if V1 is horsepower (hp) and V2 is miles per gallons (mpg) and we have two cars, e.g., a VW and a Ford, then the coordinates for V1 would be [hp(VW), hp(Ford)] and the coordinates for V2 would be [mpg(VW), mpg(Ford)]. Any distance metric may then be imposed between the n V-points and the m points constituted by the D-vectors to fill the n×m matrix VD.

In order for a composite distance matrix CM to be a proper distance matrix, VD should ideally be a transpose of DV. In some aspects, however, this is not necessarily the case, even when normalizing the vectors in V and D which would place all distance relationships on the surface of a hypersphere. For example, because V and D have different dimensionalities (and different hyperspheres) and are also not related by a simple scale factor the matrix VD may not be a transposed of DV. The only similarity metric that fulfils this matrix identity is (1-value), where 'value' is the value a space point SP has for a space dimension vector SD's coordinate. The (1-value) distance can be thought of as a significance distance. It is small for a given data point when the value of a point's attribute is large, encoding a notion of affinity that SP has for SD.

For the case when VD is not a transpose of DV, like Euclidian or correlation distance, one of DV or VD may be selected, e.g., using the one with the larger matrix norm, and the other may be computed by transposing the selected matrix. In this case, DV and VD become symmetric.

Assembling the Composite Distance Matrix (CM)

Figure 6A:
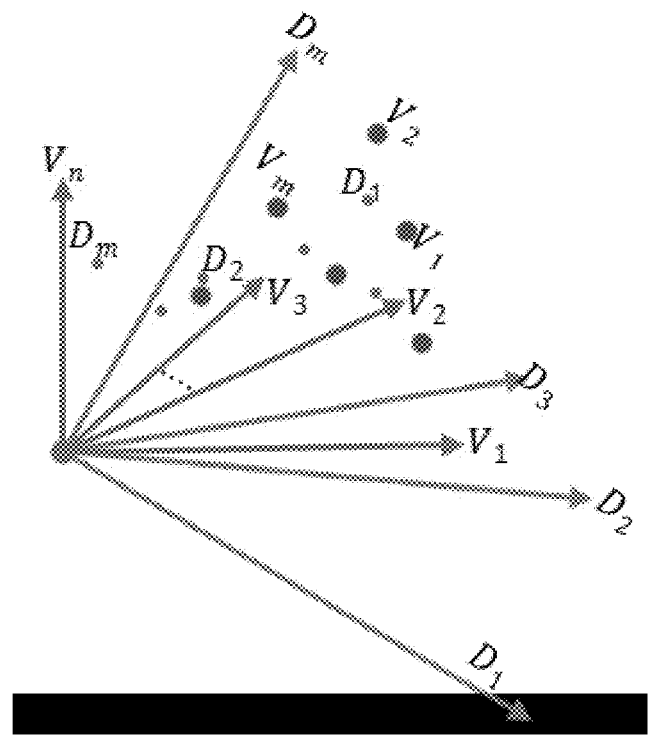
FIG. 6A is a plot of the fused data space and attribute space of FIGS. 3 and 4 in accordance with some aspects of the present disclosure.
Figure 6B:
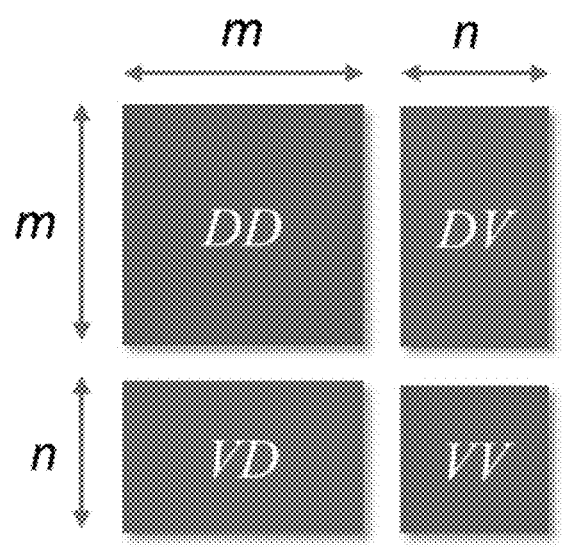
FIG. 6B is a diagram of a composite distance matrix in accordance with some aspects of the present disclosure.

With reference now to FIGS. 6A and 6B, with all four constraint matrices in place, the composite distance matrix CM may now be assembled. The fused space composed of D and V and the composite distance matrix CM are illustrated, for example, in FIGS. 6A and 6B. Composite matrix CM may be uses within an MDS-like optimization framework to achieve the 2D mapping into the joint sample/attribute display, after some further adjustments as described in the following section.

Fusion

In order to merge or fuse the two spaces, V and D, in consideration of the four distance constraint matrices, VV, DD, DV and VD, a set of one or more transformations may be required, e.g., scale, rotation, and translation.

For example, the four matrices VV, DD, DV and VD that make up CM may not be created equally. Instead, they may have been calculated from vectors with different lengths, e.g., in n or m, and they may also have used different distance metrics F. This inequality, if not compensated for, may lead to cases in which data samples and attributes do not mix well in the final map. For example, points due to the data samples and those due to the attributes may clump together into separate and disjoint communities.

To correct this issue, transformations may be necessary to enlarge or shrink the data or variable spaces. Suppose, for example, that we have the transformation θ according to equation 4 below:

$$D_\theta = \theta_D(D) V_\theta = \theta_V(V) \quad (4)$$

where D_θ and V_θ are the transformed D and V, respectively.

There are a number of different ways to define the θ. In order to mix the data and variables spaces well, the difference of each of the four matrices should be balanced. One way to define θ or achieve this balance is to make the four sub-matrices, i.e., the entities in each submatrix, have equal mean. In this way, the two spaces have equal scale. In addition, in order to keep the distance matrixes, the DV and VD may also be made to have these equal scales, as shown in equation (5) below:

$$\overline{D_\theta D_\theta} = \overline{D_\theta V_\theta} = \overline{V_\theta D_\theta} = \overline{V_\theta V_\theta} \quad (5)$$

where the ‾ operator denotes the mean of the distance matrix.

There are different options to make these four distance matrices have the same mean (or L1 norm). For example, a linear, polynomial, or kennel function may be used. A linear function has the advantage that it preserves the distribution and topology. For example, the linear weight adjustment may be applied to each submatrix. In this way, the transform is a simple weight adjustment for each submatrix where the weights may be obtained according to equation (6) as follows:

$$W_{DD}:W_{DV}:W_{VD}:W_{VV} = \frac{M_{max}}{\overline{D_\theta D_\theta}} : \frac{M_{max}}{\overline{D_\theta V_\theta}} : \frac{M_{max}}{\overline{V_\theta D_\theta}} : \frac{M_{max}}{\overline{V_\theta V_\theta}} \quad (6)$$

where W is the weight for the submatrix and $M_{max}$ is the maximum mean of all the submatrices.

Mapping

With the composite distance matrix CM in hand, the joint map of samples and attribute points may be created. In some aspects, an optimization approach for the map layout, as opposed to a linear projection with PCA or biplots may be used since it gives more freedom in choosing the constraints governing the layout, such as mixed distance functions, layout schedules, and mapping criteria. In some aspects, linear projection with PCA or biplots may alternatively be used. There are a number of distance-preserving optimization algorithms applicable for use with the composite distance matrix CM. For example, locally linear embedding (LLE) produces locally optimal layouts, while MDS-type schemes create globally optimal layouts which have become more popular in recent years since they provide a consistent overview of the data. Finally, t-distributed stochastic neighbor embedding (t-SNE) or linear discriminant analysis (LDA) excel in their ability to isolate individual clusters, but they have a reduced ability to preserve the statistical appearance of the clusters which may be important for visualization.

In some aspects, a metric MDS approach may be used. In some aspects, the iterative and progressive point insertion schedule of Glimmer MDS may be used where a multi-level scheme for the framework allows a variety of strategies to be implemented for controlling the layout.

One of these strategies makes use of the weighting scheme for handling the submatrices of CM, as mentioned above. This results in a general framework and offers freedom to design a visualization that fits current criteria of interest. Users may simply assign the default weights that give equal emphasis to all submatrices or they can increase the weight for one of more submatrices that influence those aspects they would like to focus on. For example, a user may want to have an accurate representation of the relationships among the samples and of the samples to the attributes but is less interested in an accurate representation of the relationships the attributes have with one another. So he/she would increase $W_{DD}$, $W_{DV}$ and at the same amount $W_{VD}$, but reduce $W_{VV}$. Reducing one or more constraints will enable the mapping algorithm to trade the precision losses incurred for these unimportant relations in favor of those that are less desirable. Essentially, it serves as a buffer of the errors that are incurred with the necessarily imperfect space embedding.

Example Case

With reference to FIGS. 5A-5D, a first result achieved with this mapping using a 6 test Gaussians distribution is illustrated. FIG. 5A is the MDS layout for just the data samples using the Euclidian distance metric; FIG. 5B is a MDS layout for the attributes using Pearson's correlation distance; FIG. 5C is the layout created with MDS using the entire CM matrix and weights set to not give emphasis to any CM submatrix, and FIG. 5D is the parallel coordinate display for this dataset with the axes marked with the colors used for the attribute nodes in FIGS. 5B and 5C. The (1-value) distance is used for the DV and VD submatrices.

In this example, the layout of the clusters in the sample-only MDS plots has been well preserved in the CM-based MDS layout. On the other hand, the locations of the attributes, while still largely isolated to account for the correlation differences, have changed and better match the associations they have with the data clusters. This shows that the fusion of the two spaces D and V is not just a trivial superposition of the two plots.

Some more specific observations include: (1) the red cluster has a clear dominance in the red attribute and its dimension node gets mapped right into the red cluster's center, (2) the green and the brown cluster both have high values in the green attribute and so the green attribute's node gets mapped between these two clusters, (3) similar is true for the brown attribute and the red and brown data clusters; (4) the dark blue and black attributes have somewhat similar (but switched) relationships with respect to high values of the black and dark blue clusters and so they get mapped more closely to each other right between these two clusters.

On closer inspection of FIGS. 5A-5D it appears that lower levels in the attributes are being taken into lesser or no account in CM's layout. This can be explained by the distance metrics chosen for this particular case. The preference of the algorithm in picking attribute locations with respect to high values of the data clusters is due to the (1-value) distance selected for the DV and VD submatrices. The behavior would change if a different distance is chosen. This and other choices, as well as their effects, largely depend on the aspects in the data that an analyst would like to emphasize. In this example, the emphasis was on extreme values.

Constructing the Data Context Map (DCM)

In this section more details are provided on the map construction and its segmentation into regions of similar properties.

Populating the Map

The submatrices of CM can not only be weighted differently during the MDS layout, but can also have different MDS schedules imposed on them for the samples and the attribute points. This may be taken advantage of to achieve layouts with different priorities.

An iterative MDS algorithm may be used to achieve this goal. Iterative MDS algorithms often do not update all points simultaneously at each step. Rather, they select a subset of points that are allowed to move, while other points stays put, either indefinitely, after an initial layout, or the point sets alternate. The point sets may also be transient and can change over time. A particularly convenient algorithm in this regards is the Glimmer MDS (G-MDS) algorithm. It has a stochastic force algorithm which iteratively moves each point until a stable state is reached. The forces acting on a point are based on a Near Set of points and a Random Set of points. The Near Set contains those points that are nearest to the point being updated. The Random Set contains points that are randomly chosen from the set of available points. This ensures some global control in the update process. The standard Glimmer MDS framework may be altered in the following two ways. First, which types of points, e.g., attribute or sample points, are allowed to be chosen for the Random Set may be manipulated. Second, which types of points are allowed to be updated may be manipulated. Both change the local minimum of G-MDS as it is a metric MDS scheme using non-convex optimization.

This flexible update scheme may be used to provide four MDS schedules: (1) Update the attributes and the data samples simultaneously (M-MDS); (2) Map the attributes first, then fix them and only map the data samples(VF-MDS); (3) Map the data samples first, then fix them, and only map the attributes (DF-MDS); (4) the user defined order (U-MDS). Each of these will now be described in more detail with reference to FIGS. 7A-7D.

(a) Update all Types of Points Simultaneously (M-MDS)

Figure 7A:
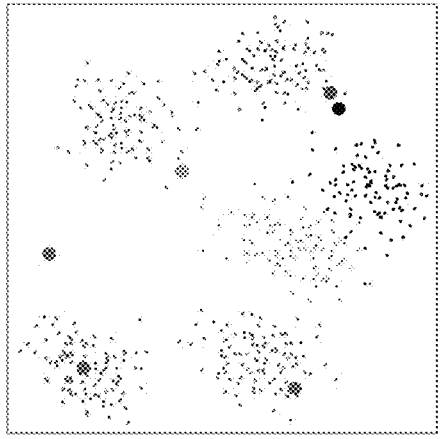
FIG. 7A is a plot of an M-MDS layout schedule in accordance with some aspects of the present disclosure.
Figure 7B:
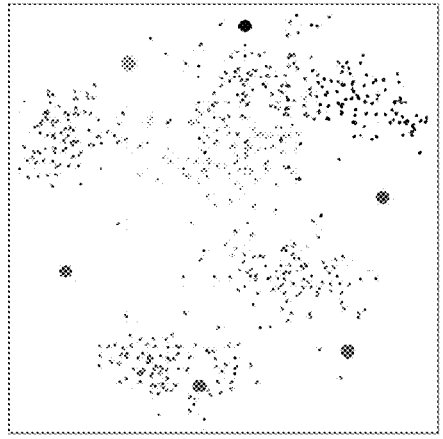
FIG. 7B is a plot of a VF-MDS layout schedule in accordance with some aspects of the present disclosure.
Figure 7C:
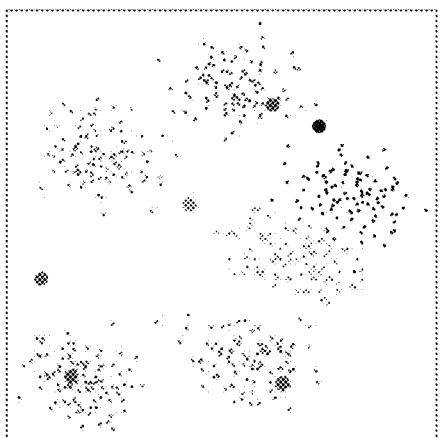
FIG. 7C is a plot of a DF-MDS layout schedule in accordance with some aspects of the present disclosure.
Figure 7D:
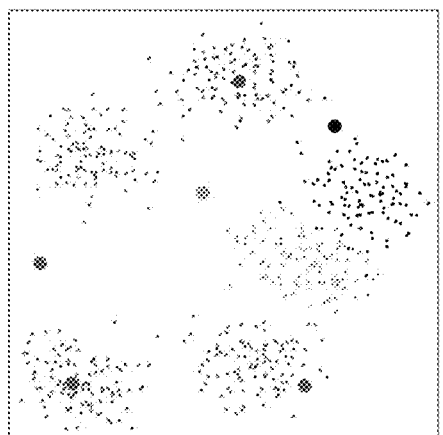
FIG. 7D is a plot of a U-MDS layout schedule in accordance with some aspects of the present disclosure.

This first schedule is the most general. It only runs G-MDS once and both types of points may be in the Random Set, for example, as illustrated in FIG. 7A.

(b) Update Attributes First, then the Data Samples (VF-MDS)

Here the goal is to achieve a layout that prioritizes the fidelity of the attribute-attribute (V-V) distances. It runs G-MDS two times. In the first run only the V-points are entered into the G-MDS point set. This results in an accurate V-layout. Then G-MDS is run the second time with the V-points frozen. For example, a statement may be added that disallows the selection of a V-point for update, that is, only the data samples (D-points) are allowed to move. Since this has the tendency to drive the D-points away from the V-points, only allow V-points may be included in the Random Set. This preserves the influence the V-points have on the layout of the D-points. The output of the VF-MDS is illustrated, for example, in FIG. 7B.

(c) Update Data Samples First, then the Attributes (DF-MDS)

This is the reverse of the VF-MDS scheduling scheme and prioritizes the fidelity of the data-data (D-D) distances. This schedule also has two stages. First G-MDS is run in the D-points only. Next, G-MDS is run on the V-points with the D-points frozen and only the D-points are included in the Random Set. The output of the DF-MDS is illustrated, for example, in FIG. 7C.

(d) User-Defined Iteration Schedule (U-MDS)

While the three schemes (a), (b), and (c) are suitable update schedules, other alternatives may be available. In some aspects, a user may be provided with the capability to draw a customized schedule via a timing (iteration) diagram editor or similar tool. In some aspects some or all of update schedules (a)-(d) may be run together or in sequence to generate a final output. For example, the VF-MDS schedule may be run for a few iterations, followed by the DF-MDS schedule, and finally by the M-MDS schedule, an example output of which is illustrated, for example, in FIG. 7D.

(e) Comparing the Schedules

Comparing the layouts achieved in FIGS. 7A-7D using the different schedules, it is observed that for VF-MDS the attribute to attribute error is lowest and for the DF-MDS the data to data error is lowest. It also appears that M-MDS and U-MDS may provide good compromises. Depending on the user's priorities, an appropriate method may be chosen.

First Use Case for a Car Dataset

Figure 8:
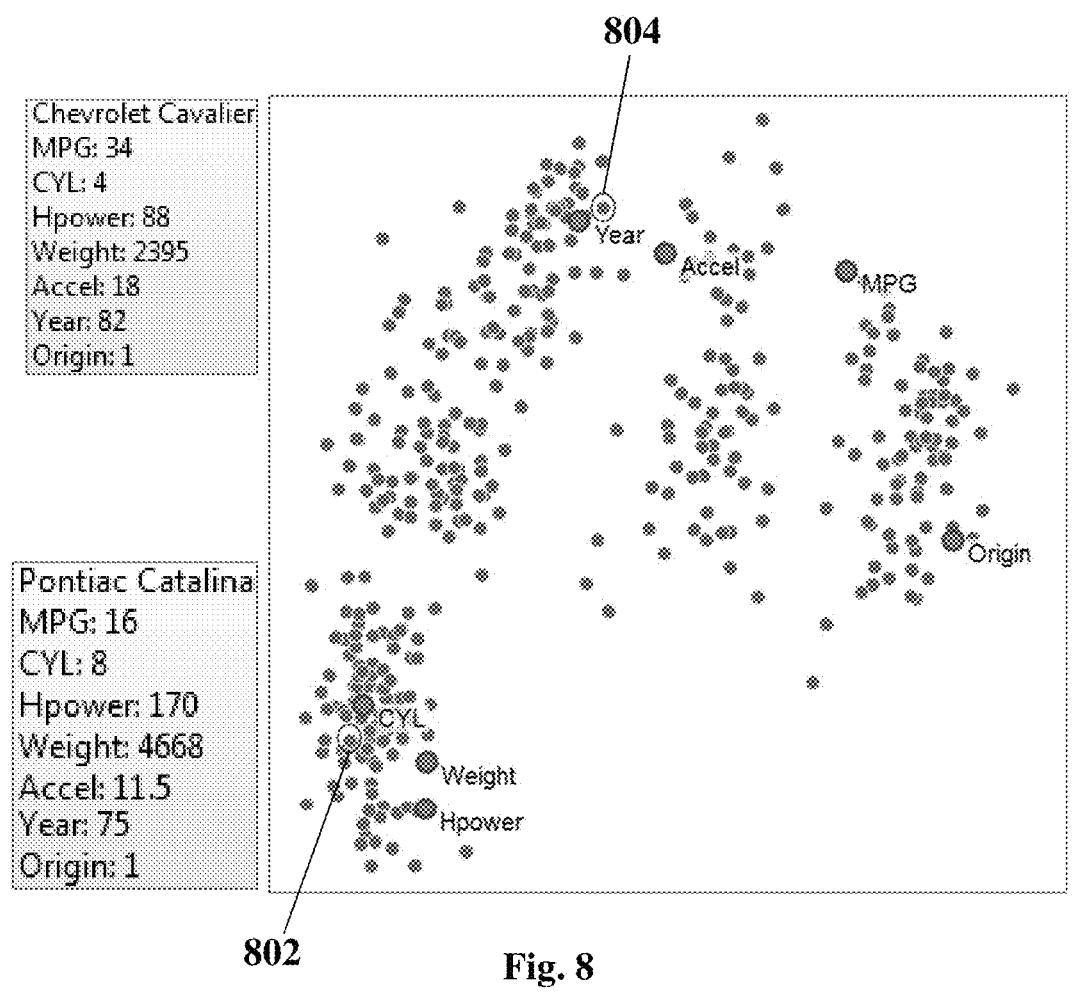
FIG. 8 is a plot of a context data map generated based on a sample data set in accordance with some aspects of the present disclosure.

Using a UCI Auto MPG dataset may be used as an example. This dataset has 392 cars built 1983 or older with 7 attributes—MPG, #cylinders (CYL), horsepower, weight, acceleration, year, and origin (US, Japan, Europe). Note that acceleration is the time a car requires to reach 60 mph and so slower cars have higher values. FIG. 8 shows a data context map generated via M-MDS. In this map, the large red points represent the attributes while the small blue points represent the cars (samples). Cars that locate close to a given attribute node have high values for this attribute. On the other hand, cars that locate far away from a certain attribute node have a low value for it.

As seen in FIG. 8, there are two main populations of correlated attributes. On one side there are horsepower, weight, and CYL, and on the other there are acceleration, mpg, and year. Origin is somewhat separate. FIG. 8 also shows that four distinct clusters of cars (with some subclusters) which are all heavily elongated in the vertical direction. Their relation with the attributes reveals that each cluster has a fairly large diversity in car attributes. Using the attribute nodes as landmarks the types of cars that these clusters contain can be gauged. For example, the cluster in the lower left contains the large high-performance cars with high horsepower and weight. The other clusters are more difficult to judge since they are so elongated and span a large attribute interval.

The map may be readily used for informed selection tasks. The user would simply look for features he is most interested in (or not at all), observe how many cars are actually available that have the desired feature constellation, and then select cars near these attributes (or far away depending on preference). For example, a user that is interested in a full-sized car may click on a node in that region on the map and uncovers a 1975 Pontiac Catalina which is an entry-level full-size car (red-circled sample node 802 in bottom cluster). Alternatively, the user may be interested in a newer economic car and so selects a node close to the year attribute and fairly close to the mph and acceleration attribute. He correctly finds a newer (for the dataset) 1982 Chevy Cavalier which is an economy-grade compact car (red-circled sample node 804 in top left cluster).

Error Evaluation

Since the data context map is a 2D optimized layout, there may be some error. As in every layout scheme, error may be estimated by comparing the distance in the matrix CM with the corresponding Euclidian distances in the 2D layout. We can use $\widetilde{DD}$, $\widetilde{DV}$, $\widetilde{VD}$ and $\widetilde{VV}$ to store the 2D layout distances, respectively. A popular metric to summarize the layout error is stress. The error E in each sub-matrix is set forth according to equation (7) below:

$$E_{IJ} = \sqrt{\frac{\sum_{(i \in I, j \in J)} (IJ_{ij} - \widetilde{IJ}_{ij})^2}{\sum_{(i \in I, j \in J)} IJ_{ij}^2}} \quad I, J \in \{D, V\} \quad (7)$$

The overall error $E_A$ is also weighted based on different blocks according to equation (8) below:

$$E_A = \Sigma_{I,J \in \{D,V\}} \beta_{IJ} E_{IJ} \quad (8)$$

where $\beta_{IJ}$ is the weight. Typically, the $\beta_{IJ}$ may be set according to equation (9) below:

$$\beta_{DD}:(\beta_{DV}+\beta_{VD}):\beta_{VV}=1:2:4 \quad (9)$$

As mentioned above, the GBC plot (FIG. 1A) may be used as the standard formulation to describe a set of interior displays and the optimized GBC plot (FIG. 1B) improves on the GBC plot error, called DIFGBC. The error in the GBC and optimized GBC plots may be compared to the error in the data context map (DCM) as set forth, for example in Table 1 below which compares the error for the three datasets.

TABLE 1

| DataSet | Layout | $E_{VV}$ | $E_{DV}$ | $E_{DD}$ | $E_A$ | Up % |
|---|---|---|---|---|---|---|
| Car | DIFGBC | 0.34 | 0.25 | 0.23 | 0.3 | 36.7% |
|  | DCM | 0.16 | 0.27 | 0.17 | 0.19 |  |
| University | DIFGBC | 2.07 | 0.32 | 0.49 | 1.35 | 71.1% |
|  | DCM | 0.38 | 0.41 | 0.36 | 0.39 |  |
| Campaign | DIFGBC | 0.33 | 0.26 | 0.31 | 0.31 | 25.8% |
|  | DCM | 0.22 | 0.3 | 0.16 | 0.23 |  |

As shown in Table 1, $E_{VV}$ improves greatly because the interior layouts map the attributes to the 1-dimensional space (e.g., the boundary of the enclosing shape) but the DCM maps them into 2-dimensional space which naturally incurs less error. The $E_{DD}$ error is also greatly improved, but the $E_{DV}$ error did not improve and may even have grown slightly for these examples. This may be dependent on the chosen update schedule, the distance metric, and the weighting. Overall the error improved greatly and quantitatively shows that the use of the data context map is more accurate than the competing interior layouts even when optimized.

Segmenting the Map

The data context map as presented so far allows attribute-informed selection of data objects. In some aspects, however, it may be difficult to judge the different value regions for combinations of attributes. In some aspects, the map may be colored into distinct spatial areas which then could each be tagged by the respective attribute value combinations. To achieve this a continuous representation of the map may be used. For example, adaptive kernel density estimation (AKDE) may be used for this purpose.

Adaptive Kernel Density Estimation (AKDE)

The AKDE is a method for estimating the density of a point cloud. It first estimates the local density of each sample and then shrinks or enlarges the sample's bandwidth. For example, if you have N points and each point is marked as P, with a fixed bandwidth H. For any point P, its local density f is obtained by equation (10) below:

$$f(P) = \frac{1}{N} \sum_{i=1}^{N} K_H(\|P - P_i\|) \tag{10}$$

where $\|p-p_i\|$ is the $L_2$ distance. the local smoothing parameter $\lambda_i$ may be estimated and from it, the new bandwidth $H_i$ for adaptive smoothing may be determined according to equation (11) below:

$$\lambda_i = (G/f(P_i))^2 H_i = H \times \lambda_i \tag{11}$$

where G is the geometric mean of all the samples local density.

Figure 9A:
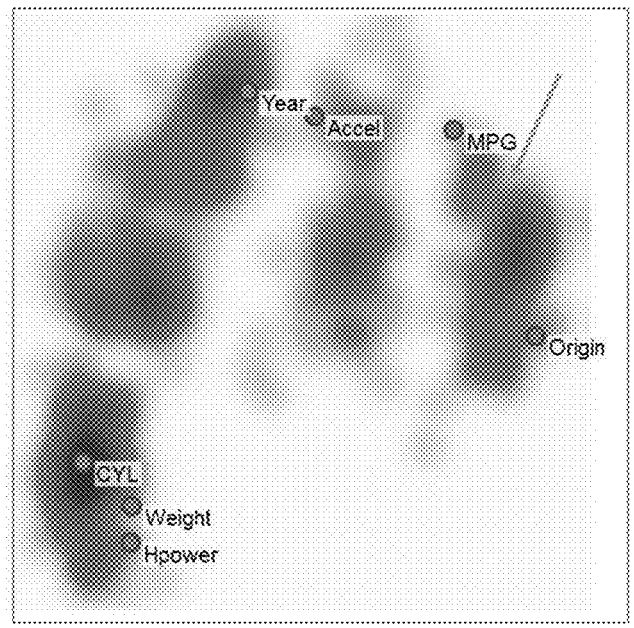
FIG. 9A is a Kernel Density Estimation (KDE) plot based on the sample data set of FIG. 8 in accordance with some aspects of the present disclosure.
Figure 9B:
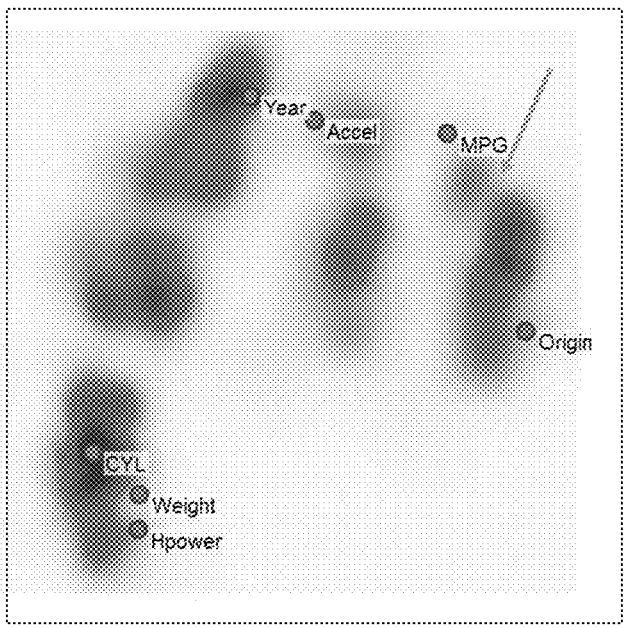
FIG. 9B is an Adaptive Kernel Density Estimation (AKDE) plot based on the sample data set of FIG. 8 in accordance with some aspects of the present disclosure.

The adaptive bandwidth of the AKDE kernels makes sure that small dense regions are preserved and not over-smoothed while less dense regions are properly fused. FIGS. 9A and 9B compare fixed kernel density estimation (KDE) (FIG. 9A) with AKDE (FIG. 9B) for the car dataset. In this figure the brighter values correspond to lower values and vice versa. Consider the regions pointed to by the orange arrow where two separate regions for the AKDE (FIG. 9B) are shown, while these regions appear mixed together for the KDE (FIG. 9A). There are also other examples in the map where AKDE gives a more accurate estimate of the local density.

Creating the Attribute Distance Field Using AKDE

The values in the continuous map may be estimated based on adaptive kernels, e.g., when the point has a higher density, it would have lower bandwidth to shrink its effect area, and vice versa. Based on the adaptive kernel distance, Nadaraya-Watson kernel regression may be used to obtain the estimated value. Suppose the value at $P_i$ is $x_i$, then the value x at the estimated point P is may be determined according to equation (12) below:

$$x = \sum_{i=1}^{N} \frac{K_H(\|P - P_i\|) \cdot x_i}{\sum_{j=1}^{N} K_H(\|P - P_j\|)} \tag{12}$$

where $K_H$ is the kennel function. Here the Gaussian function may be chosen. However, some areas on the 2D canvas are far away from the samples and are therefore undefined. Thus it is important to control the border of the map and remove these undefined areas. The threshold ε may be set for the sum distance, e.g., if the estimated point is far away from all the samples, it may be ignored, as shown, for example in equation (13) below.

$$\Sigma_{j=1}^{N} K_H(\|P-P_j\|) \leq \varepsilon \tag{13}$$

Figure 10A:
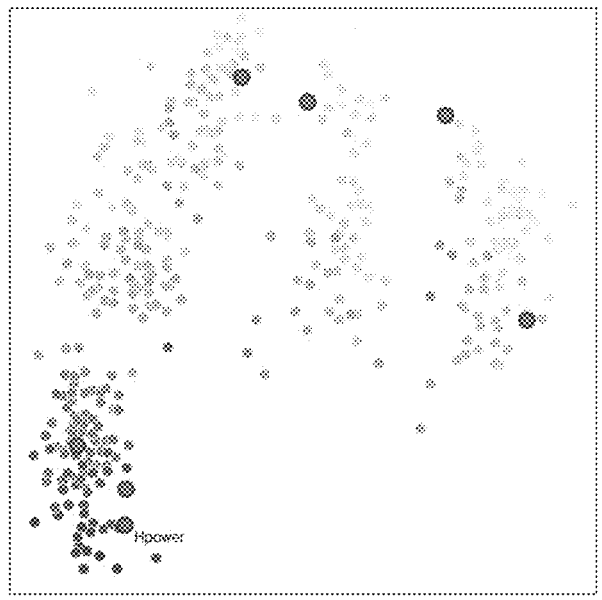
FIGS. 10A and 10B illustrate a conversion from a map of points to a distance heat map using AKDE in accordance with some aspects of the present disclosure.
Figure 10B:
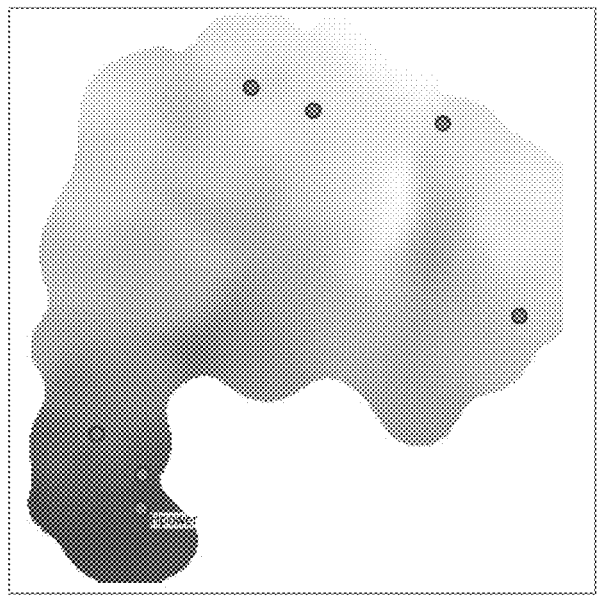

FIGS. 10A and 10B show how the point map may be converted into a distance heatmap using AKDE. For example, the data points may be colored based on their values, e.g., of the horsepower attribute (FIG. 10A), and the heatmap may be generated based on AKDE-based interpolation (FIG. 10B). As seen in FIGS. 10A and 10B, the AKDE estimates the values well and the border of this heatmap is also well defined.

Creating the Contour Fields

Figure 11A:
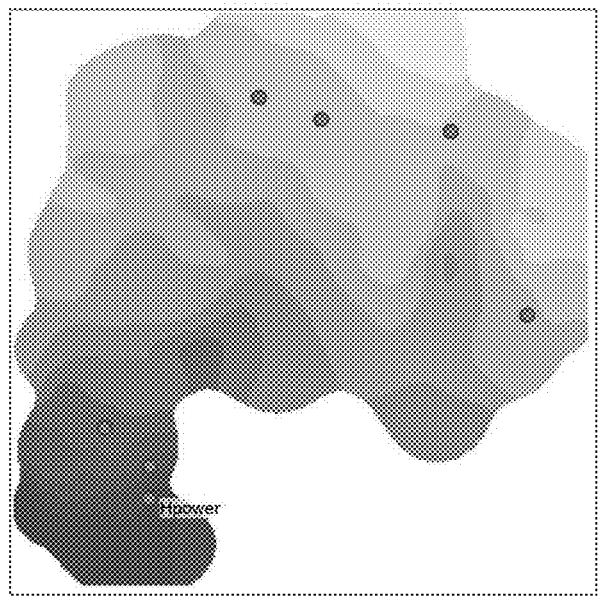
FIG. 11A illustrates a plot of a contour field generated from FIG. 10A in accordance with some aspects of the present disclosure.

Just by using the distance heatmap alone it may be difficult to make out actual values. A common technique to visualize distance fields is via topographic maps. If a point is within a certain pair of iso-contours, the value may be easily read. These contours may be generated via the conrec algorithm. For example, FIG. 11A shows the contour field of FIG. 10A, for the horsepower attribute. As seen in FIG. 11A, the contour region's value decreases level by level as it moves away from the attribute node.

Figure 11B:
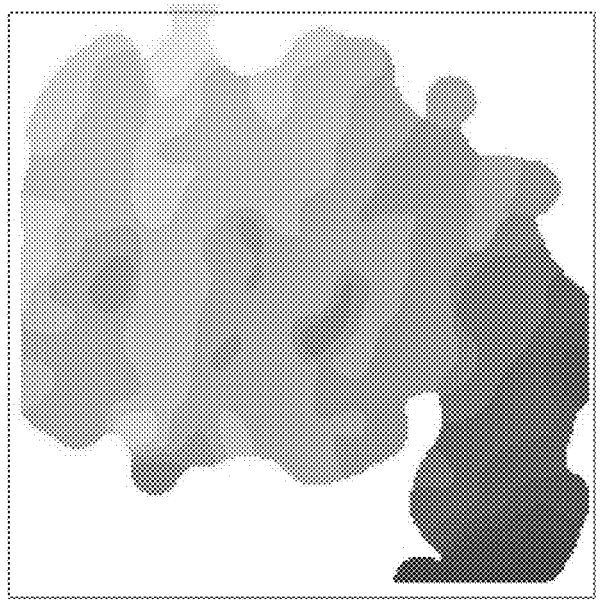
FIG. 11B illustrates a plot of a contour field generated from the heatmap of FIG. 10B in accordance with some aspects of the present disclosure.

The contour field can also compare the layouts generated with standard MDS and the disclosed DCM. FIG. 11B, for example, shows the contour field generated from a distance heatmap based on a standard MDS layout (also using Glimmer MDS but without using attribute points). The contour field in FIG. 11B has a rather ragged appearance with many more islands than the one generated from the DCM as shown in FIG. 11A. In the data context map, on the other hand, the attribute nodes attract high-valued points and push low-valued points away. This magnetic force organizes the samples and so a smooth distance field can be created.

Creating the Decision Regions

With reference now to FIGS. 12A-12E, each attribute may give rise to a set of contours, and a closed range of attribute values may give rise to a filled region between the two corresponding contours. For example, FIG. 12A shows such a region for the horsepower range (120~230). This region has been computed from the value field generated by the actual data samples and so any sample selection that is based on it will be accurate. As such any of the cars that get mapped into the salmon-colored region 1202 in FIG. 12A indeed has a horsepower value in it.

FIG. 12B shows the iso-region for the (15-46) mpg value range which can be obtained in a similar fashion. This purple region 1204 contains all cars that have a mpg rating in that range. The regions 1202 and 1204 may be superimposed to create the joint map shown in FIG. 12C. This joint map has three regions. The first 1202 is due to the original horsepower range only, the second 1204 is due to the original mpg range, and the third 1206, overlapping region blending into a darker salmon color, contains cars that fit both value ranges. So if a user wanted a car that fits both criteria the user would pick a car from this overlap region.

Finally, a third constraint may be added by the user, e.g., origin. Origin is a discrete variable and a value of 2 may be selected by the user, e.g., the European cars. This gives rise to the green region 1208 in FIG. 12D. Blending region 1208 with the horsepower-mpg joint map of FIG. 12C creates the triple-attribute joint map shown in FIG. 12E. Now if the user wanted to buy a car that is European and fits the other two range constraints, the user would look into the olive green region 1210 on the lower right of the triple-attribute joint map of FIG. 12E where there are still some choices that meet the criteria. For example, the user could pick a car on the upper boundary of that region which would be a more efficient car but with less horsepower. There is a car that fits the bill, which has been circled in the figure and labeled as

1212. Alternatively, the user may pick a car from the left region boundary which would be a less efficient car but with a bit more muscle. There is also a car that fits this preference. Alternatively, the user may seek to find a car that represents a compromise of mpg and horsepower, e.g., one that falls right into center of the region. There is also a car that fits this preference. However, if the user sought to find a less efficient car but with a bit more muscle he would look at the left region boundary and learn from the map that there is no such car in the database. There are many more explorations that a user can do with this map in hand. Since the interface is fully interactive, the user is free to modify the preferences in real time and fit the map to these preferences.

Creating a Fully Segmented and Self-Labeled Map

In another example, suppose that there are k attributes and each attribute can be divided into $l_k$ levels based on a users' preference. For example, these levels may be high level, middle level, low level, etc. The entire area may be encoded to see the combination of these attributes. Each region may be encoded as $[R_1, R_2, \ldots, R_k]$, where $R_i$ represents the level in the each factor i and $R_i \in [0, \ldots, l_i]$. The domain may be divided based on these codes and the regions may be colored. It may be important to maintain the color connection such that users can read the combination of different colors. For example, the color for each attribute may be assigned with the difference in shades of colors being as large as possible. For example, the intensity of each color may be set based on the contour range level. Finally, when a region is composited, these colors may be blended.

Figure 13:
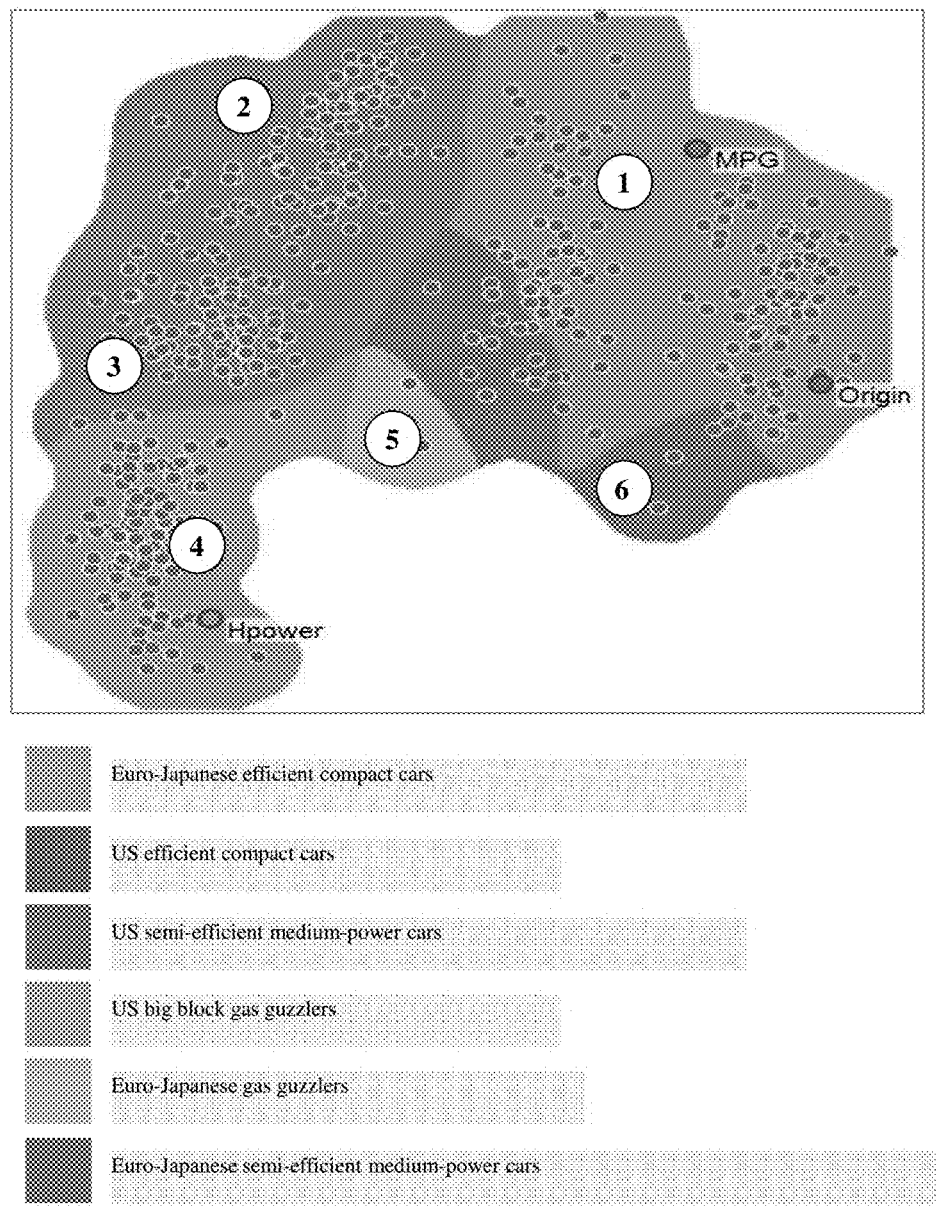
FIG. 13 illustrates an example of a segmented and labeled map based on horsepower, MPG, and origin in accordance with some aspects of the present disclosure.
Figure 14:
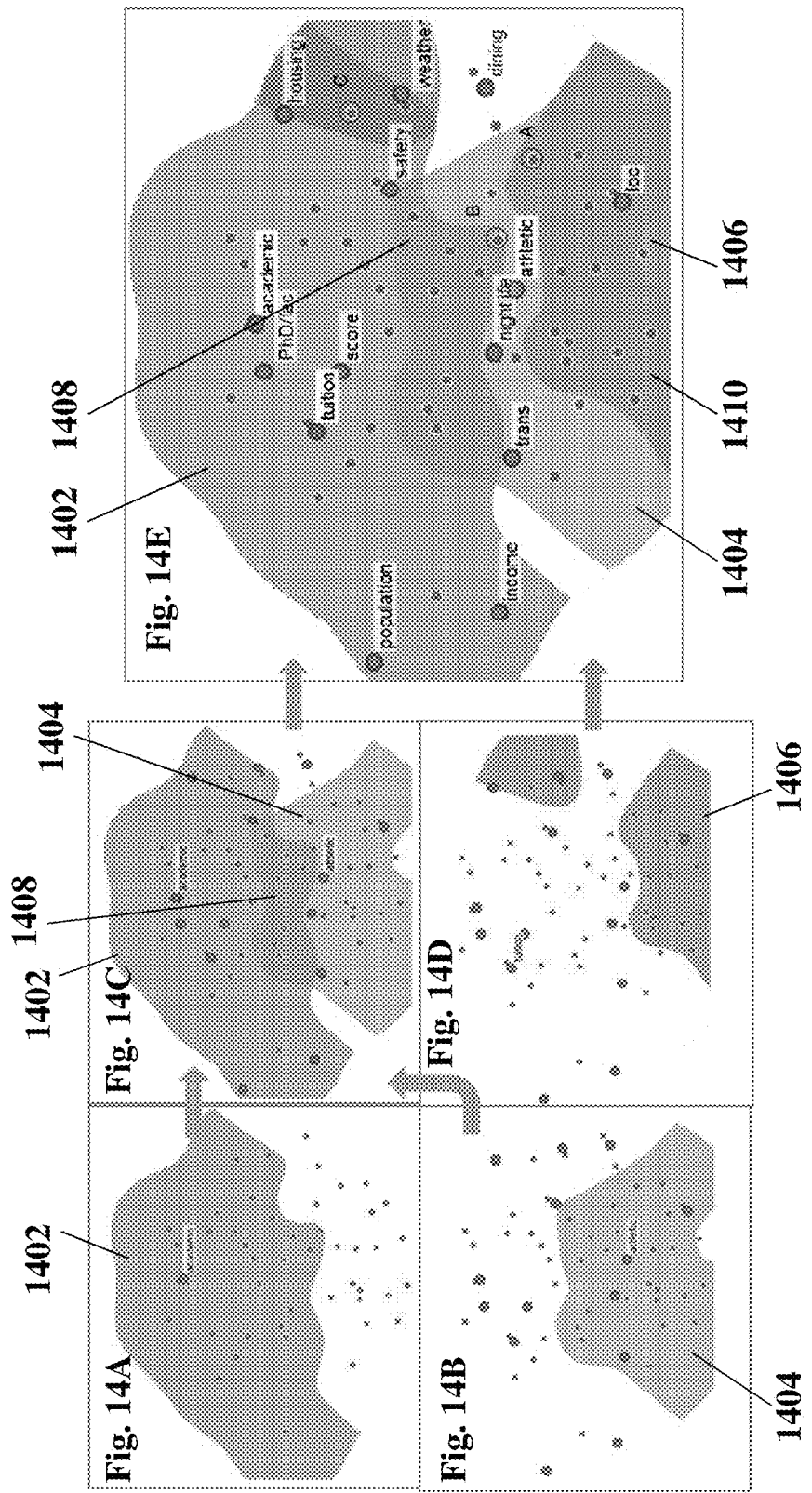
FIGS. 14A-14E illustrate the creation of a map including decision regions for an example case study for finding a college in accordance with some aspects of the present disclosure.

With reference now to FIG. 13, an example region map is illustrated for three attributes; horsepower, mpg, and origin. Two levels are selected for each attribute, e.g., low or high. For example, 40% may be set as a threshold. For origin, the set is split between Euro-Japanese cars and US cars. Other splits may also be used, e.g., Euro-American cars and Japanese cars, American-Japanese cars and Euro cars, just one nationality, or other similar splits. Each attribute may be given a color, for example, as shown inside the attributes' symbols. The entire domain may then be colored via color blending of the colors of the different attributes. Each of the regions may be colored depending on levels of the participating attributes where the legend below the figure lists a human-created annotation for the regions. Such a labeling may also be done automatically, e.g., using the levels of the attributes in each region to support natural language generation.

Case Studies

Selecting a College

Returning to the example scenario of selecting a college. An example database has 46 universities distinguished by 14 attributes of interest: academics, athletics, housing, location, nightlife, safety, transportation, weather, score, tuition, dining, PhD/faculty, population, and income. A prospective student, Tom, is looking for a university. He aims for a school that has high athletics (>9), high academics (>9), but low tuition (<$18,000). He searches the universities with a traditional browser, but cannot find one which can meet all three requirements at the same time. He knows that he needs to make a compromise, trading off a few factors, and find the school that offers the right balance. This, however, he finds hard to do because he does not even know what his personal good balance really is. He wants to see "what's out there" and get inspired. So he calls up the data context map to immersive himself into the landscape of schools to find the elusive balance.

Tom, the user, begins by generating the decision boundaries based on his three criteria. This is shown, for example, in FIGS. 14A-D where the purple region 1402 represents schools meeting his academic criteria, the brown region 1404 represents schools meeting his athletic criteria, and the green region 1406 represents schools meeting his tuition criteria. Then he merges them together and generates the combined map of FIG. 14E which shows the overlaps between these regions. He confirms by looking at the combined map that his prior research was correct in that there is no university that can satisfy all three criteria at the same time. For example, as illustrated in FIGS. 14A-14E, the green region 1406 representing his tuition criteria does not overlap with the purple region 1402 representing his academic criteria at all. By quickly reviewing the combined map visually, however, he is able to quickly ascertain in a single view what his options are for compromising on his criteria. For example, he can see from the map that there are a number of schools that meet at least two of his conditions, e.g., those schools that fall into two-layer overlap areas 1408 (orange) and 1410 (olive) representing an overlap of academics and athletics and athletics and tuition, respectively. Based on these visual clues, Tom may select a few schools that are closest to the third layer at "just the right distance" as he describes it, e.g., the schools labeled A, B, and C and circled in red in FIG. 14E.

He says that he likes school A "because it has good athletics and low tuition, while the academics is not stellar but alright". Similarly, school B is good and he'd be "OK with paying a bit more tuition for the great value." Finally, school C has good academics and low tuition which is great because he "could just use the savings to buy a big screen TV to watch the games of other schools". Nevertheless, he picks A and lives happily ever after.

This example shows the power of the disclosed data context map in visually assisting a user to make a decision by providing a single framework for comparing multivariate data in an easy and intuitive manner.

Analyzing the Business Priorities

Another example case study demonstrates the utility of the fused display of samples and attributes. The case study relates to an analysis session of a group of top level managers of a multinational company with many subsidiaries in different countries. The topic is to determine the different priorities these companies have when it comes to sales strategy and long term goals. They have 600 samples of sales team data with 10 attributes: #Leads (generated), #Leads Won (LW), #Opportunities (generated), Pipeline Revenue (Rev), Expected Return on Investment (EROI), Actual Cost (Cost), Cost/WonLead (Cost/LW), Planned Revenue (Rev), and Planned ROI (PROI). A visual analytics consultant hired by the firm brings up the data context map and with a few mouse clicks produces the visualization shown in FIG. 15. It is quickly seen that there are three clusters, call them red group 1502, blue group 1504, and green group 1506. It turns out from viewing the DCM that these three groups have rather different strategies and priorities.

Figure 15:
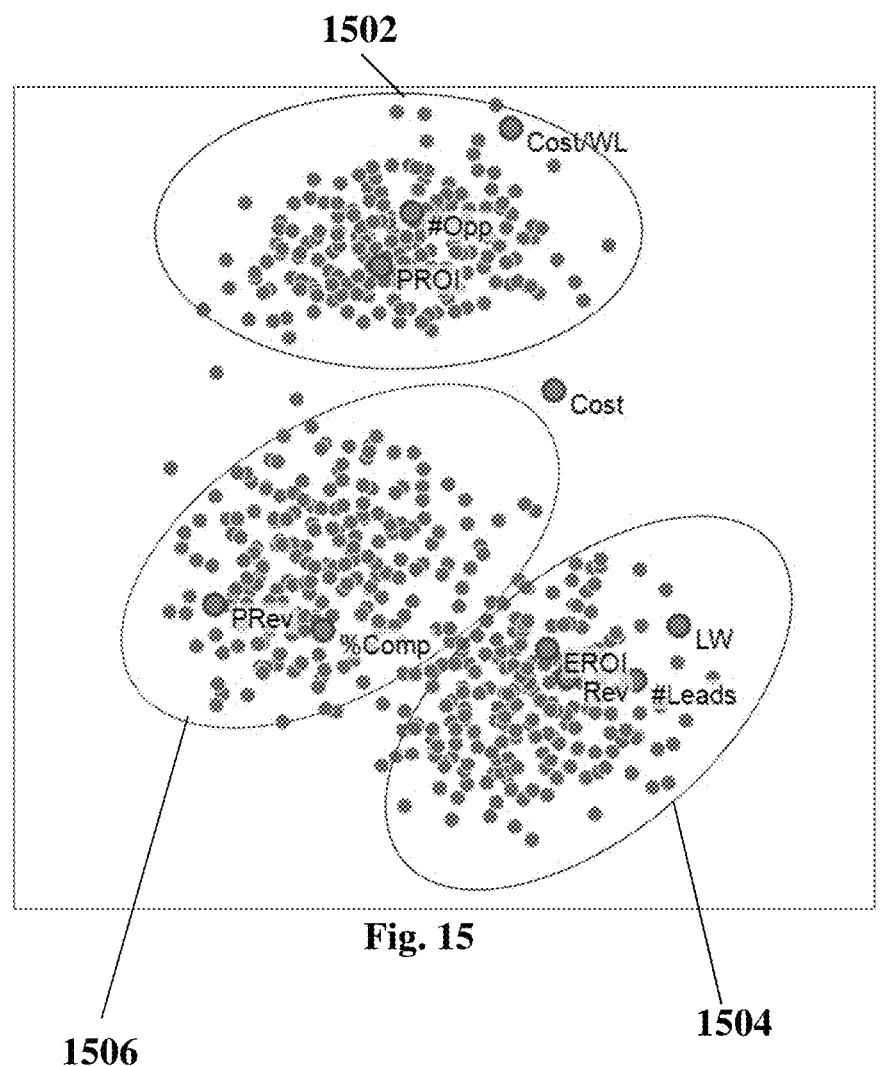
FIG. 15 illustrates an example data context map for a case study business priority in accordance with some aspects of the present disclosure.

As seen in the DCM, the red group's focus is dominated by the #Opp, PROI, and Cost/WL attributes, where they have high values and achievements. At the same time, however, they score very low in #Leads, LW, Rev, and other attributes. The members of this group tend to focus on the individual leads and invest a lot in these, and as a result they usually have a high number of opportunities. The samples included in the blue group, in contrast, are possibly larger companies, e.g., they have high revenue and they can generate a large amount of Leads. The green group is dominated by PRev and % Comp attributes. Since they have high expected revenue, their % completed is high. But clearly all groups have one thing in common, cost. As shown in FIG. 15, this factor has roughly equal distance for all of groups. For example, this means they all of the companies have similar weights and concerns care about the cost.

The visualization found in the data context map provides the top level managers with the ability to instantly recognize and characterize the subsidiaries at a glance based on a variety of attributes, to quickly determine correlations between particular attributes for these companies, and to make decisions accordingly.

Figure 16:
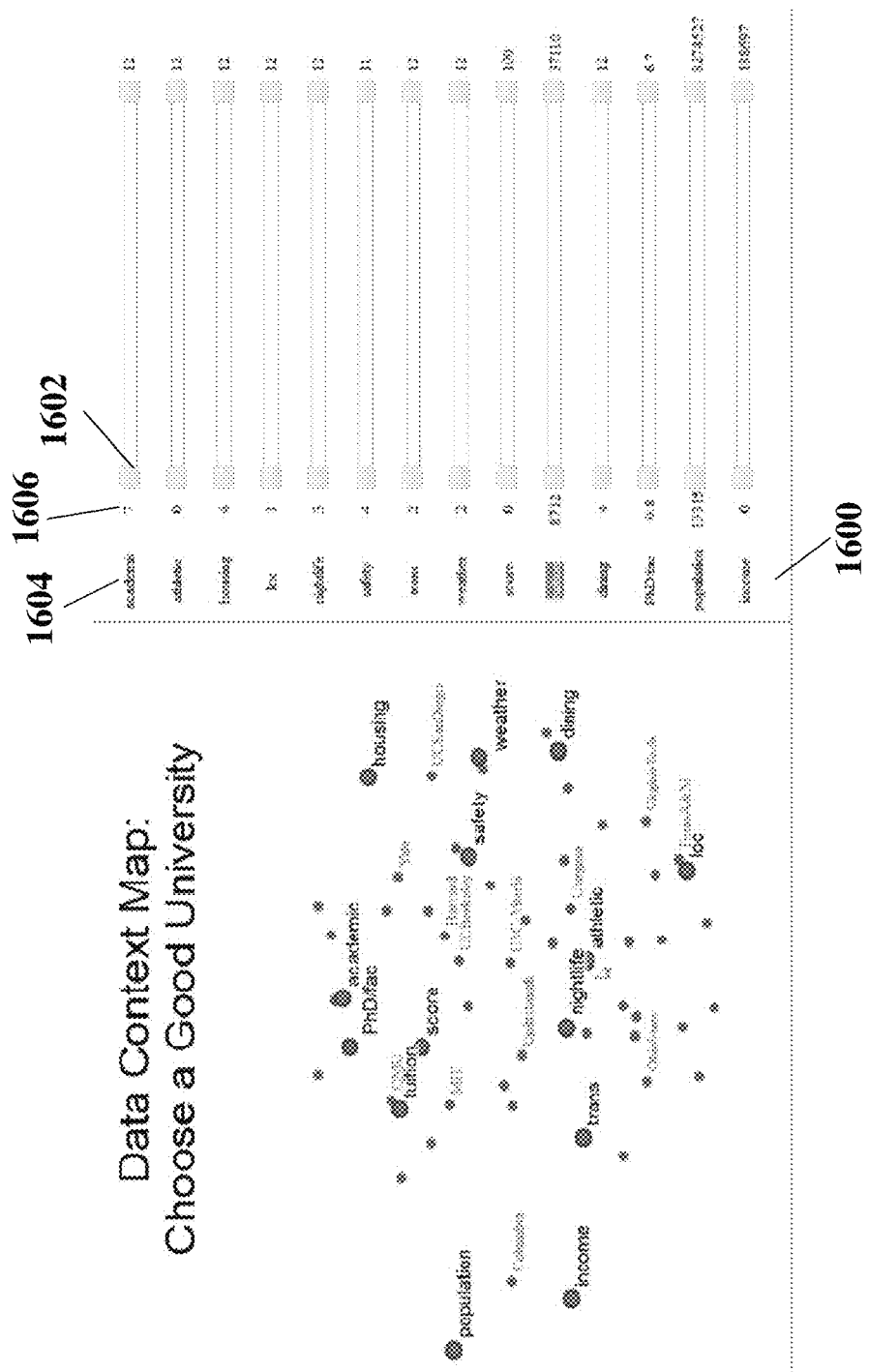
FIG. 16 illustrates an example user interface for setting weights associated with attributes for a data context map in accordance with some aspects of the present disclosure.

With reference now to FIG. 16, an example user interface for adjusting the weights of the attributes in the data context map is illustrated. For example, user interface 1600 may include an element 1602 associated with each attribute 1604 that is activatable or adjustable to set a weight or value criteria 1606 for the respective attribute. In some aspects, for example, the element may be a slider that allows a user to specify a value between a minimum value and a maximum value.

Sample Rankings

Figure 17:
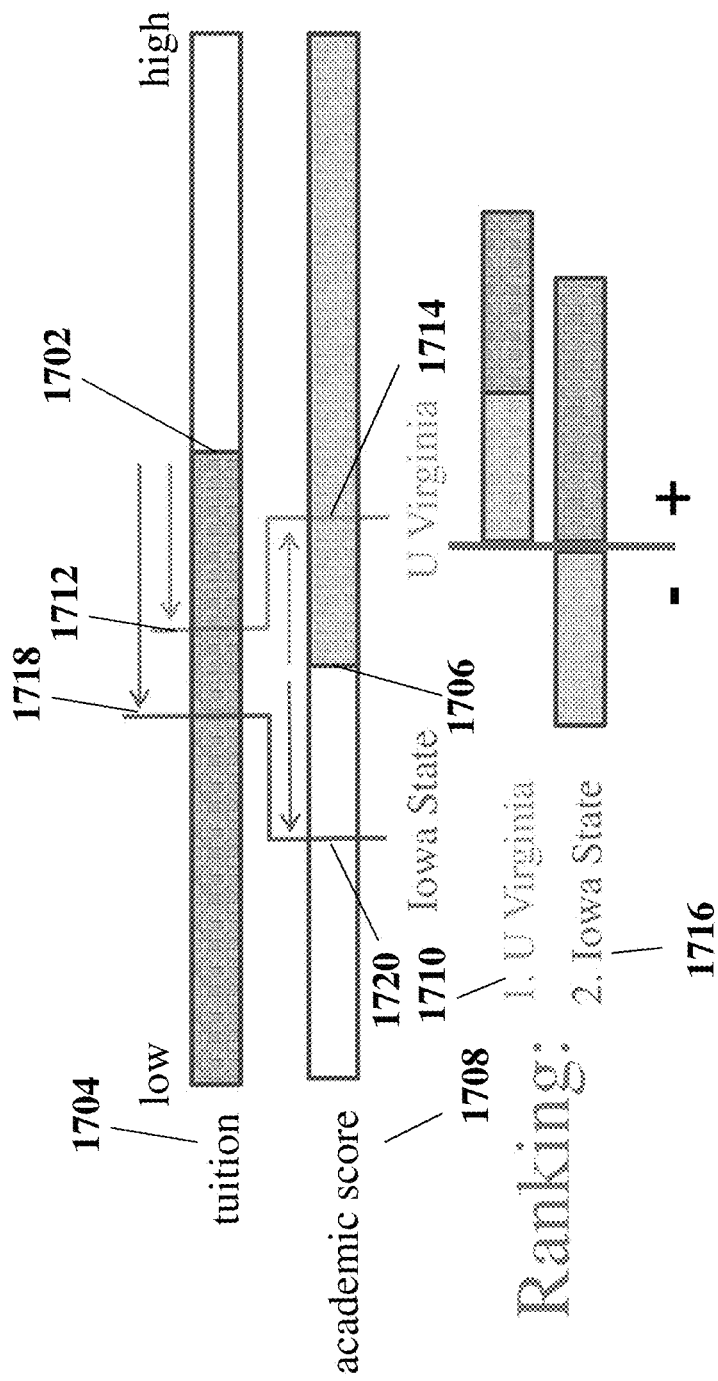
FIG. 17 illustrates an example of how two schools may be ranked relative to each other based on attribute values in accordance with some aspects of the present disclosure.

With reference now to FIG. 17, in some aspects, an example method of ranking two samples with respect to two or more attributes is illustrated. For example, as seen in FIG. 17, a decision boundary 1702 for a first attribute 1704, e.g., tuition, may be set, for example using the user interface of FIG. 16. Likewise, a decision boundary 1706 for a second attribute 1708, e.g., academic score, may be set, for example using the user interface of FIG. 16.

Sample 1710, e.g., U Virginia, may have a tuition value 1712 and an academic score value 1714. Sample 1716, e.g., Iowa State, may have a tuition value 1718 and an academic score value 1720. A distance between decision boundaries 1702 and 1704 and the respective values 1712, 1714, 1718, and 1720 for each sample 1710 and 1716 may be determined. In addition to the distance, a determination may be made of whether the respective value is considered an improvement over the value of the decision boundary or worse than the value of the decision boundary. This may be a determination made on an attribute by attribute basis as each attribute has a different meaning. For example, in the case of tuition, a value that is lower than the decision boundary is better than the decision boundary, i.e., the school costs less to attend than a school that is at the decision boundary. In the case of academic score, on the other hand, a value higher than the decision boundary is better than the decision boundary. As illustrated in FIG. 17, which side of the decision boundary is considered better than the decision boundary is indicated by the purple and peach zones, respectively.

When determining a ranking of the samples, any value that is better than the decision boundary is added to the ranking score, while any value that is worse than the decision boundary is subtracted from the decision boundary. For example, as seen in FIG. 17, while Iowa State has a better value 1718 for tuition than the value 1712 of U Virginia and decision boundary 1702, Iowa State also has an academic score value 1720 that is much lower than the decision boundary 1706 and the value 1714 of U Virginia is significantly higher than the decision boundary 1706. When the difference between these values and the decision boundaries for each attribute are added together (or subtracted in the case of value 1720 since value 1720 is worse than the decision boundary 1706), U Virginia has a higher total ranking score, even though the difference between value 1718 and decision boundary 1702 is greater than the difference between value 1712 and decision boundary 1702.

Decision Trees

Figure 18:
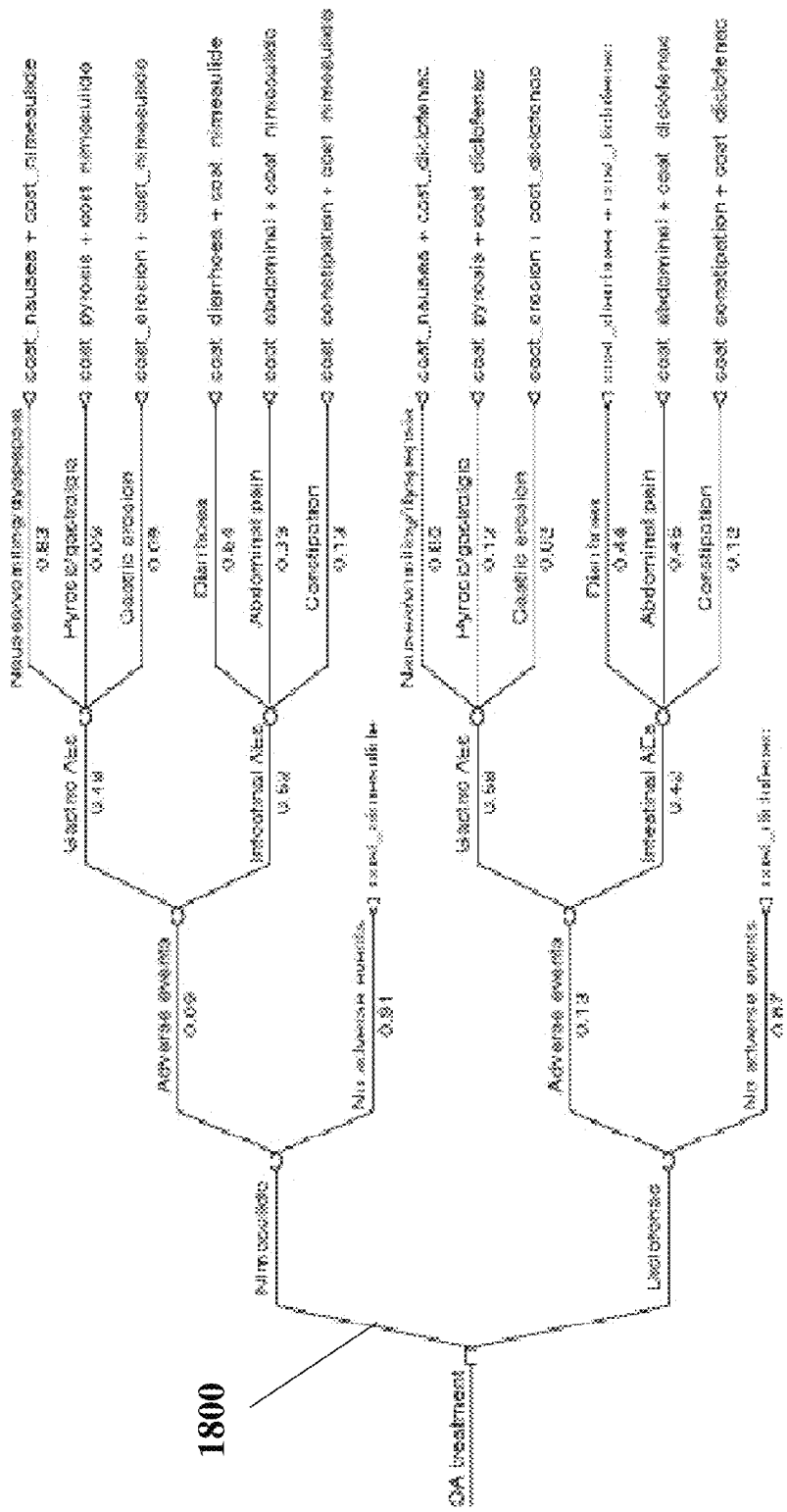
FIG. 18 is an example decision tree in accordance with some aspects of the present disclosure.
Figure 19:
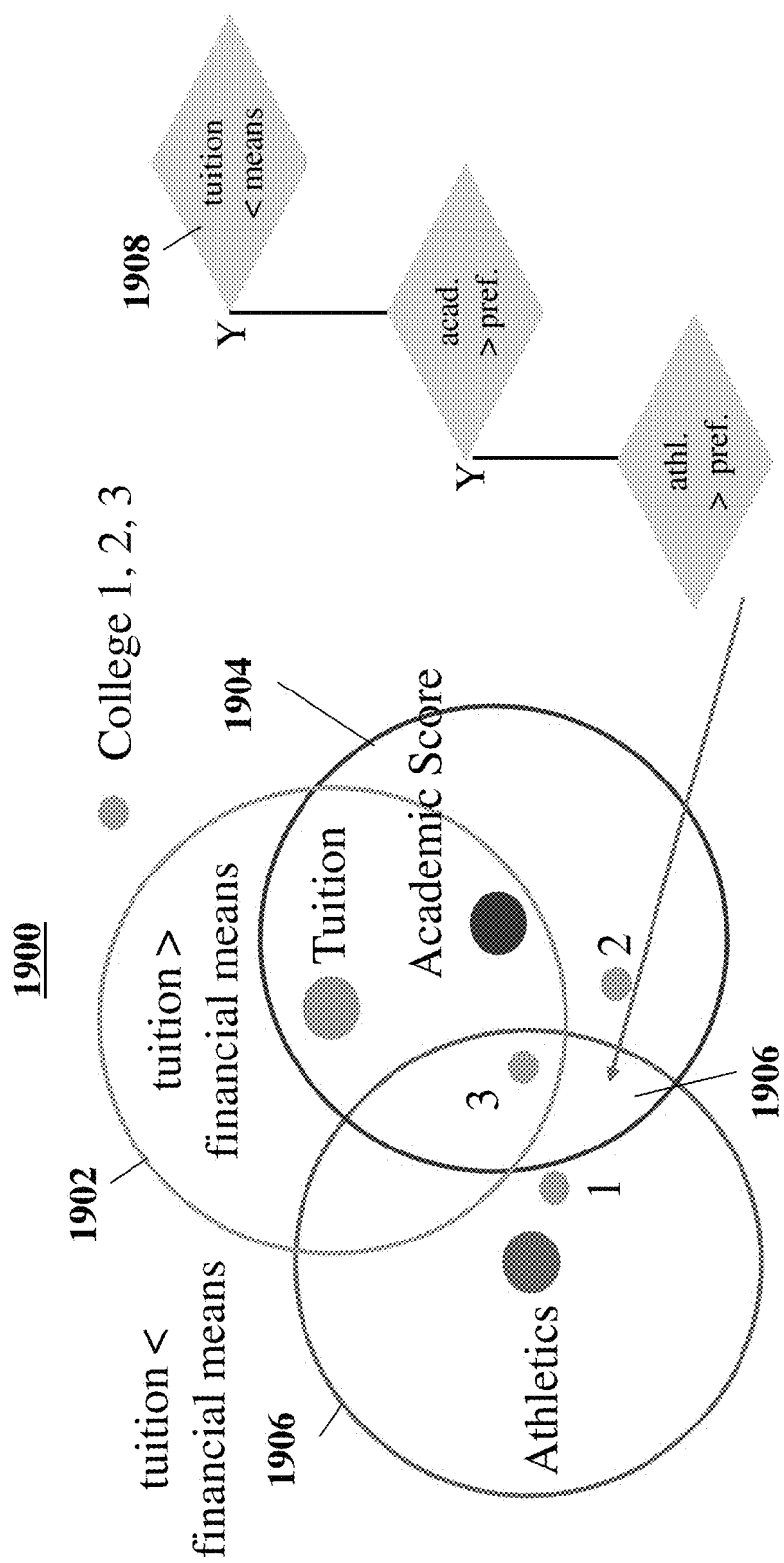
FIG. 19 is a diagram illustrating how a decision tree may be used to define regions in a map in accordance with some aspects of the present disclosure.

With reference now to FIGS. 18 and 19, in some aspects a decision tree 1800 may be used to generate the region map. For example, each tree level may introduce a set of attributes where the leaves of each level are data samples and each path in the tree is a region of the map.

As seen in FIG. 19, for each decision in the decision tree a determination may be made on whether there are any samples that meet the criteria. For example, a map 1900 may show a green region 1902 for tuition>financial means, a blue region 1904 for academic score>a preference, and a red region 1906 for athletics>a preference. In the decision tree 1908, yes or no decisions may be made at each decision point to set the criteria for the map. For example, a user may make a decision of Y at a decision point for tuition<means and a Y at a decision point for academic score>preference. At the final decision point of athletics>preference, map 1900 shows that there are no samples, e.g., schools, located inside both the blue and red regions but outside of the green region. Thus there are no schools that have both good athletics and academic score and tuition<financial means. In some aspects, the user therefore may not be able to make a Y decision at the decision point for athletics>preferences. Instead, the user may be presented with schools 1, 2, and 3 for consideration as being close to the boundary to the target region 1910 where both the red and blue regions intersect but the green region does not.

Pathways

Figure 20:
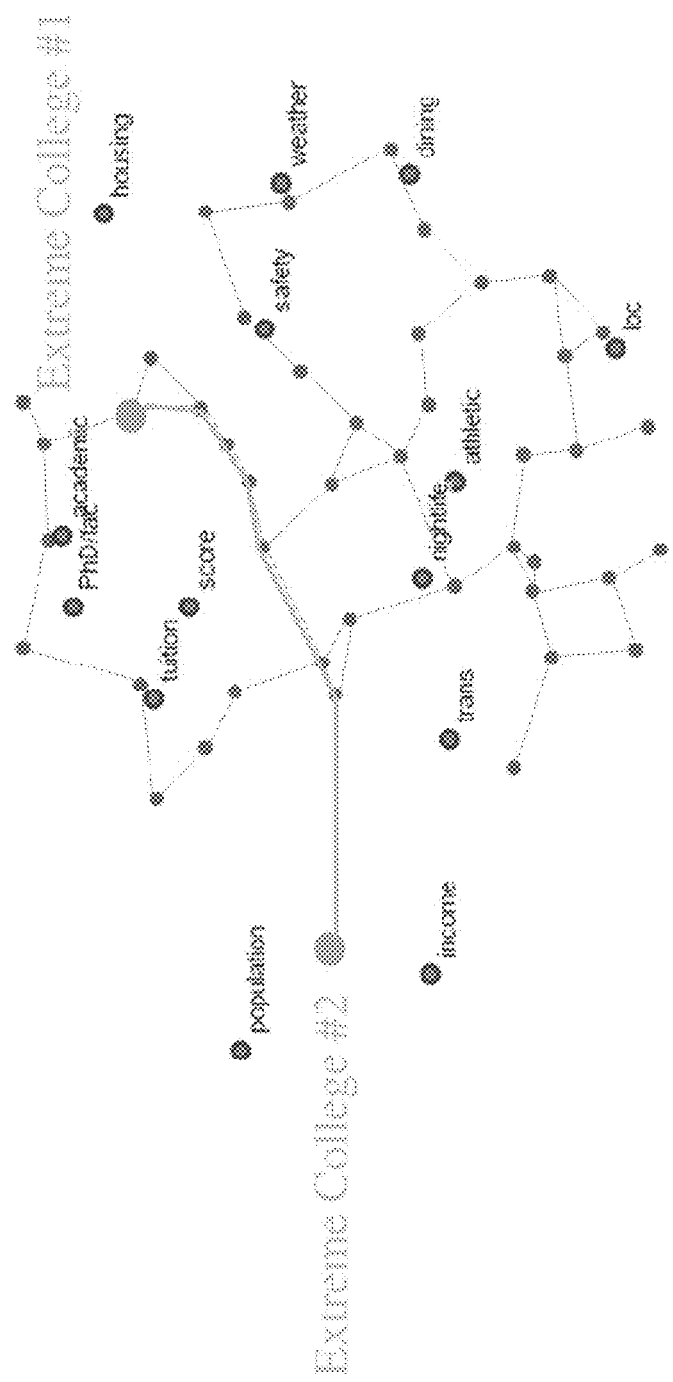
FIG. 20 illustrates a pathway between data samples in accordance with some aspects of the present disclosure.

With reference now to FIG. 20, in some aspects, a pathway between two samples may be generated. For example, as illustrated in FIG. 20, a pathway between extreme college 1 and extreme college 2 may be generated through other sample points to highlight tradeoffs between the qualities of each of the colleges.

Scatterplots to Scalar Fields

Within the field of information visualization (InfoVis), scatterplots are frequently used as two-dimensional (2D) displays of data points where the point locations are determined either by linear projection or by a non-linear layout algorithm. In the former, the data is typically projected onto a set of two orthogonal axes. These axes can be two original data axes, or they are weighted combinations of the axes (e.g. Principal Component Analysis (PCA), Linear Discriminant Analysis (LDA), or other similar techniques). Conversely, non-linear data layouts are created by optimizing some objective function, e.g., preserving, in the 2D plane, some distance metric that the data points fulfill in high-dimensional space. Typical algorithms that may be used include Multidimensional Scaling (MDS), IsoMap, and other similar algorithms.

The spatial (x, y) coordinates of the projected or mapped points may be denoted as planar variables and any visual embellishment of these points, such as size, color, intensity, etc. may be called retinal variables. In InfoVis, the retinal variables are predominantly employed to label the membership of points in certain clusters, classes, or for highlighting. An alternative, albeit less frequent, use of color and brightness is to encode the value of another scalar attribute.

The use of color and brightness to encode a primary attribute of the data, as opposed to the aforementioned cluster membership, is a frequent practice in scientific visualization (SciVis). Scalar fields often employ this technique. They are defined over a continuous domain and typically have a smooth and continuous appearance. The data usually come on regular or semi-regular grids, which tie the data to the underlying phenomena's spatial organization and continuity in the attributes measured in this space.

Spatial interpolation is used to generate off-grid values for a zoomable continuous display where the interpolation kernel defines the degree of smoothness.

Interesting properties of a scalar field are contour lines of a set of field iso-values and the scalar field gradients. The scalar field itself is often visualized in form of a heat map, which maps the scalar values to color using an appropriate color map. An example is the variation of pressure or temperature over a geometric shape such as an airplane wing.

The aforementioned point displays employed in InfoVis are different from those in SciVis in that they serve mainly the display of data distributions but not that of data values. While in a linear projection the data values can be read off along one or more data axes, in a data layout the context to the data values is typically lost. This loss of correspondence prevents the use of color or brightness to visualize the values of an attribute in these displays in a coherent manner. In SciVis, on the other hand, the values of an attribute are easily conveyed by grey level or color mapping or height mapping. In InfoVis, color is employed to denote a value such as in choropleth maps, but these are usually not continuous and do not lend themselves to smooth interpolation.

Mapping attributes via the retinal variable 'color' as opposed to using the retinal variable 'size' is advantageous since it only mildly conflicts with the primary retinal variable 'location'. Given the high density of neurons on the retina's fovea centralism, color does not take up spatial area on the viewer's retina, rather it extends the color-coded attribute's decoding into the retina's color recognition system. The (tri-color) sensors of that system are distributed on the retina on a much smaller scale than the amount of neurons that would be needed to decode size. The retinal variable 'brightness' is even better in this respect since it only uses the monochromatic channel which has the full retina resolution.

A prerequisite for generating a scalar field is that the data be spatially organized (i.e. the absolute position of a data point contains contextual meaning). Existing dimensionality reduction techniques preserve relative similarity but the location of a data point alone does not contain contextual meaning. InfoVis visualizations are often non-spatial and so it prevents the use of scalar fields as a visualization technique.

In some aspects, color and brightness maybe used as a mechanism to encode an attribute such that it makes scatterplots more expressive without limiting their resolution. But as mentioned, a defining obstacle in this endeavor is the inherent spatial disorganization of InfoVis non-spatial data. To achieve this expression of a scatterplot, a regularizing non-linear transform of the spatial organization of the data may be used. This transform creates a smooth transition in the color-coded variable making it easy to see trends in the context of the other variables. Similar to scalar fields the visualizations that are created are dense and not scattered. This enables other useful types of visualizations, such as iso-contours, topographic maps, and even extrapolations. At the same time, it may be important to maintain the values of the original data points such that the integrity of the original scattered information display can be preserved.

To reduce the overlap of 2D scatterplots and enhance more realistic exploration, a height field surface may be created which employs SciVis technique into InfoVis data. By zooming into the surface, a user is able to explore the data from different aspects with the help of gradient arrow. This could be useful, for example, when utilizing a virtual reality headset. To classify the multiple variables mixed distribution in the high dimensional space, the disclosed Pareto and tradeoffs paths may be used to navigate in the space.

In some cases there are projective and layout-optimizing methods that may be used to create scatterplot displays. Projective methods for high-dimensional data include simple bivariate scatterplots which might either be just bivariate using two attribute axes as a projection basis, or multivariate where the projection basis is formed by two general axes oriented in arbitrary (but orthogonal) directions of the high-dimensional space. Both can make use of view selection algorithms based on certain view quality criteria such as cluster separability. Scatterplot matrices (SPLOM) organize bivariate scatterplots in an array, while interactive displays allow users to navigate the large space of scatterplots generated with a general basis. Principal Coordinate Analysis (PCA) can find optimal projections in the sense of the expression of statistical variance of the data. Interesting scatterplots are then formed by the two eigenvectors associated with largest positive eigenvalues. Finally, Linear Discriminant Analysis (LDA) can also determine a reduced projection basis but here the number of basis vectors cannot be lower than the number of clusters or classes and some form of selection medium must be used to determine the desired 2D basis.

The set of layout-optimizing methods includes Multi-Dimensional Scaling (MDS), which minimizes the stress generated by the difference of pairwise distances in high-dimensional data space, and two-dimensional layout space. Optimizing this layout can be difficult when the number of points grows large and effective point scheduling and relaxation schemes such as Glimmer can overcome these problems. Using the right distance metric in high-dimensional space can make a crucial difference in these displays, and when using geodesic distances it is possible to unroll a high-dimensional manifold onto the 2D plane. Another optimizing layout algorithm is Locally Linear Embedding (LLE), which constructs a k-nearest neighbors (kNN) network and uses the shortest path on the manifold as the distance. Self-organizing maps (SOM) create a map on a regular grid that allocates the cells in terms of frequency of the similar data items. Finally, t-distributed stochastic neighbor embedding (tSNE) uses the conditional probability of two variables as the distance. All of these methods only focus on the layout of the data points constraining their mapped locations only by the direct distance relationships they mutually have in high-dimensional space. The disclosed framework adds a second constraint, the relationship these points have with regard to the attributes, as described above.

Scatterplots in InfoVis are in some sense (but not completely) related to scattered data in SciVis, but in the latter the data points have a clear spatial reference. In SciVis these data are typically given in three dimensions and visualized using volume rendering. The graphical rendering is usually done by (view) ray integration with optional gradient-based shading to depict 3D shape. This rendering requires an estimation of the values in the empty space, the space between the scattered sample points, which is typically done via interpolation. There is a vast body of literature on this topic with a common message that interpolation is subject to the model one has about the unknown data to be estimated. Interpolation is essentially based on certain assumptions, such as local smoothness, etc. In that sense it is not unlike the assessment of distances in high-dimensional space. Disclosed are interpolation methods in the new context of scatterplots.

Scatterplot Matrix

The scatterplot matrix is often used to illustrate a high dimensional data matrix DM. For example, the scatterplot matrix visualizes each bivariate relation with a scatterplot, then takes all the scatterplot blocks and forms a pairwise matrix. As such, the scatterplot matrix can depict all pairwise relations.

Figure 21:
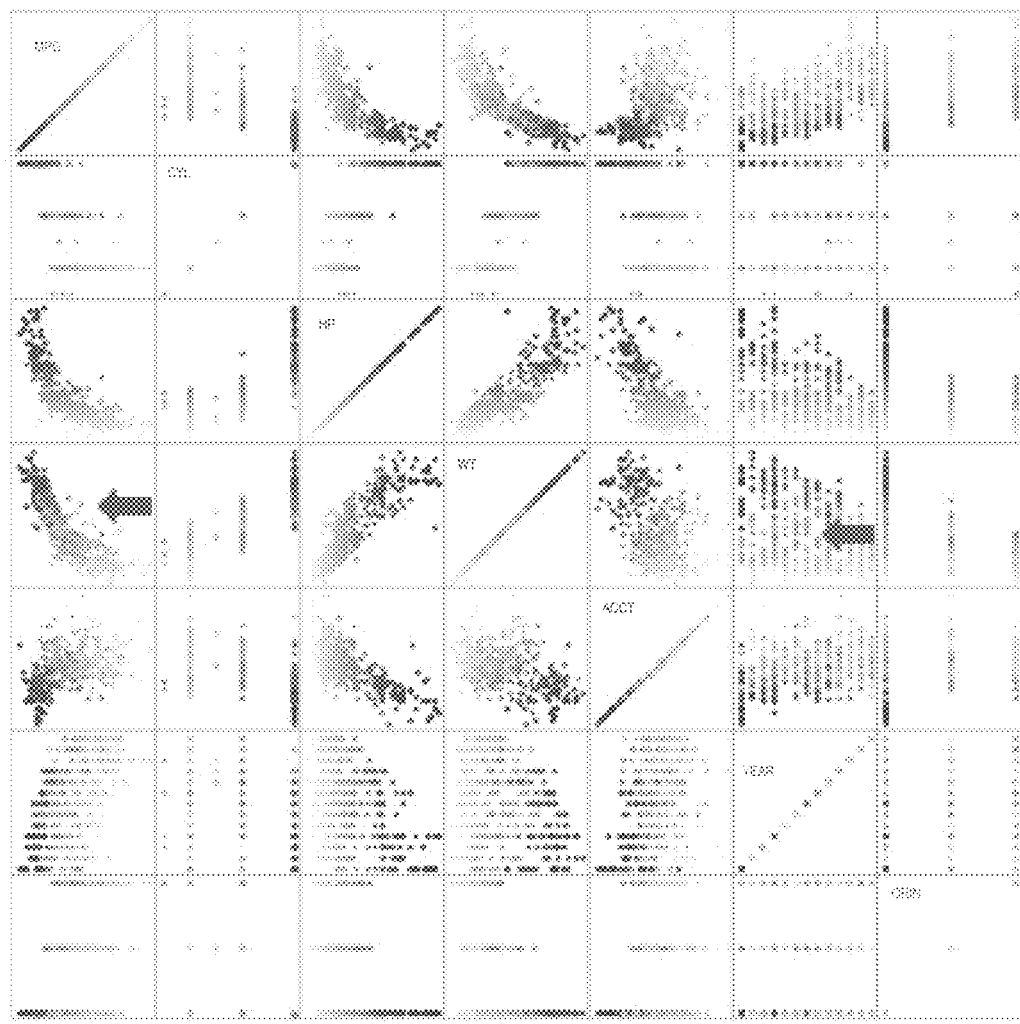
FIG. 21 illustrates a scatter plot matrix in accordance with some aspects of the present disclosure.

Using the UCI Auto MPG dataset again for an illustrative example which consists of 392 cars with seven attributes, miles per gallon (MPG), #cylinders (CYL), horsepower (HP), weight (WT), acceleration time to 60 mph (ACCT), year (YEAR), and origin (ORIN). FIG. 21 illustrates the dataset's scatterplot matrix. Neglecting for a moment the variations in point density, it can be observed that the scatterplot matrix shown in FIG. 21 can depict pairwise relations easily, e.g., WT and HP have strong positive correlations and "MPG" negatively affects "WT". The restriction of the scatterplot matrix is that it can only visualize bivariate relations coherently. Hence, the intensity variations in FIG. 2 attempt to map HP to brightness, making each tile of the plot trivariate. For example, the brightness variations in the third row and column turn darker (higher HP) along the y-axis or the x-axis, respectively. This is correct since HP participates in the spatial layout. But many of the tiles that do not involve HP in the spatial layout are less coherent. See for example, the Weight-Year tile or the MPG-WT tile (depicted with red arrows). There is not a clear trend with respect to HP. There exist points that look like outliers, at least in these bivariate spaces, but they might not be if all variables were considered. To gain better insight the scatterplot matrix may be switched to a display that gives a better overview in terms of similarity, such as an MDS display.

MDS Display

FIG. 22A shows an MDS visualization of the car data set. Similar to the example in FIG. 21, brightness is used to encode the HP value. In this layout, each point's location is based on its entire high-dimensional vector, and points that locate nearby are similar with respect to all attributes, and not just two like in the scatterplot matrix. This view also does not convey a clear trend with respect to "HPower", as bright and dim points are distributed almost randomly. This is because this layout is now based on similarities of a vector of attributes as opposed to a single attribute. This lack of structuring prohibits the use of a conventional MDS plot as a scalar field—one cannot perceive trends in the scalar variable.

Scatterplot++

To deal with the disorganization of data points in the MDS plot, a new method called Scatterplot++ is disclosed which organizes the data items based on the attributes locations. In this way the data items that have high values in a certain dimension will be positioned closely to this attribute and vice versa. Imposing this structuring for all attributes, or at least the attribute mapped to the scalar field, is poised to regulate the MDS layout. As an immediate effect, users will be able to read the attribute values by assessing the distance a data point has to the respective attribute node, similar to reading a value off a coordinate axis. This procedure structures and regularizes the scatterplot and enables it to produce the spatially coherent mapping of a scalar value needed for the scalar field.

The Attribute-Driven Layout

The first step is to create the fused layout of data items and attributes. This step follows the method described above. It achieves the composite layout by augmenting the original data distance matrix used in MDS by three additional matrices, the attribute correlation matrix and two data-attribute affinity matrices, where entries map to the degree of affinity a data point has with respect to certain attribute. MDS optimization is then used to embed this composite matrix into 2D space.

Suppose P is a set of mapped points, $P_D$ is the set of data sample points and $P_V$ is the set of attribute points. It is well known that the pairwise distances of data samples or attributes can be preserved with a space embedding method such as MDS as set forth in equation (14) below:

$$\|P_{Di}-P_{Dj}\|\approx\|D_i-D_j\|\|P_{Vi}-P_{Vj}\|\approx\|V_i-V_j\| \quad (14)$$

where $\|.\|$ is the distance metric and D and V are the original, high dimensional vectors in the data matrix. In addition, the attribute-data item relations are maintained according to the equation (15) below:

$$\|P_{Di}-P_{Vj}\|\approx\|D_i-V_j\| \quad (15)$$

Where 'distance' is the degree of affinity a data sample point has with respect to a certain attribute and the data matrix is normalized according to equation (16) below:

$$\|D_i-V_j\|=1-x_{ij} \quad (16)$$

If the embedding layout satisfies this condition, the data sample points will be organized and distributed by the attribute points. As described above, this method stretches out the high dimensional data spaces and constrains all three relations simultaneously, data samples to data samples, data samples to attributes similarities and attributes to data samples similarities. This layout has important implications for the scalar field. For example, attributes now actively attract high-valued data sample points closer or push low-valued data sample points further away. The attributes drive data sample points to their locations. The resulting layout is sensitive to the data distribution and implicitly also the density gradients where, for example, inserting new data sample points in sparse n-dimensional locations will stretch the 2D layout.

To create a scalar field layout for a single attribute, this attribute may be input into the original data matrix and the corresponding fused embedding may be obtained as illustrated, for example, in FIG. 22B. The data sample points may then be organized by this attribute where the data sample points with higher values in this dimension are close to this attribute and vice versa. Following this general principle, additional attributes may be included to drive the layout by these attributes. This is shown in FIGS. 22C and 22D, each showing the scalar field layout for one of the two variables, "HP" and "MPG". It can be observed from FIGS. 22C and 22D that data sample points with high "HP" ("MPG") values are closer to the "HP" ("MPG") node and those with lower values are further away.

Adding or removing a node point changes the layout, which can be confusing to users. Accordingly, all attributes may be added at the same time the fused layout may be used for all selections. This is shown in FIG. 22E where, for example, a consistent layout may still be observed.

Further, a helpful illustration often used in scalar fields is the iso-contour—a closed curve that indicates a certain level of the scalar attribute. A set of iso-contours, one for each level at some level spacing, can then function as a topographic map that makes the assessment of the scalar attribute's level at a certain spatial location intuitive. Such a map also enables users to visually assess areas where the scalar variable changes rapidly (areas with dense contours) or only varies gradually (areas with sparse contours).

From the plot in FIG. 22F, it can be observed that the cars near the attribute "H" have high values for that attribute and vice versa. While similar observations may be made for other attributes by comparing the data samples with the placement of their respective nodes, the contour lines computed for the "HP" attribute reveal additional information. For example, if a user desires a car with "HP" between 120~140, he or she can simply find the car of interest based on the iso-contour, e.g., a red circled car, "Plymouth Suburban" with its values displaying on the right block.

The scatterplot++ framework is a hybrid of a traditional contour map (using the "HP" attribute as the scalar variable, shown in yellow as the present attribute contour), an MDS-optimized scatterplot display for the data items (blue points), and a correlation map for all the attributes (red points). The MDS-optimized scatterplot display still supports tasks in the InfoVis domain where the goal is to visualize data point acquired at irregular locations (as opposed to functions defined in a continuous space). Conversely, the attribute correlation display supports the SciVis domain since it establishes a continuous field (in terms of the field variable HP) of data points.

Achieving the Scalar Field

Scatterplot++ allows users to assess a data sample's attribute value based on its distance to the respective attributes' location. To enable this quantitative measurement, a scale that translates the distance measured in the plot to the true value distance is required, similar to the scale of a coordinate axis. Take "HP" for example. When the distance between an arbitrary point in the plane, P, and the "HP" attribute point is 1, what is the value of P? Suppose $l_j$ is the $j^{th}$ attribute scale (i.e. the distance from P to the $j^{th}$ attribute), then P may be determined according to equation (17) below:

$$\|P_{Di} - P_{Vj}\| = l_j \|D_i - V_j\| \tag{17}$$

Determining this scale may be strenuous. The scale is associated with the scalar field gradients, but these gradients can vary over the mapping canvas. This means that the scale in each dimension is not a simple number but forms a function φ in canvas coordinates (x, y) according to equation (18) below:

$$l_j = \varphi(x, y) \tag{18}$$

The scalar field can be represented as a set of concentric contours into which the data points are inserted. However, data points may distribute sparsely in scatterplot++, at least in some plot regions. To obtain the contour, the empty space may be filled by estimation. Since the scale contours are disparate among dimensions, the contours may be computed separately for each attribute. Numerous approaches may be applied for this estimation. There are two requirements that need to be observed: (1) the values in the estimation area should distribute continuously and smoothly, and (2) the original data point values should be maintained. In some aspects, it may be preferable if values in the close area of samples are consistent or nearly consistent with the sample values.

Scalar Field Estimation

A scalar field is a continuous function but in InfoVis there is typically only a set of data sample points placed at irregular canvas locations. In order to fill the empty space, an interpolation method may be used, e.g., an interpolation method that can deal with non-regular point distributions. Some examples may include, e.g., nearest neighbor, linear, natural neighbor, or other similar techniques. The nearest neighbor interpolation cannot perform a smooth interpolation since it only considers the neighbors. The linear interpolation lacks realism as few things in the real life move in the straight lines, which causes high error. The natural neighbor interpolation creates a delauney triangulation by the points and selects the closest nodes that form a convex hull around the interpolation point, then weights their values by proportionate area. It is more accurate than the above two methods, but it also brings the drawbacks in that it does not take the distribution into consideration.

The Adaptive Kernel Density Estimation (AKDE) was developed based on the density of points and distribution process. It first models the values distribution by the kernel function and then utilizes the density when estimating the values. When the density is low, the sample points will have more impact area and vice versa.

Figure 23A:
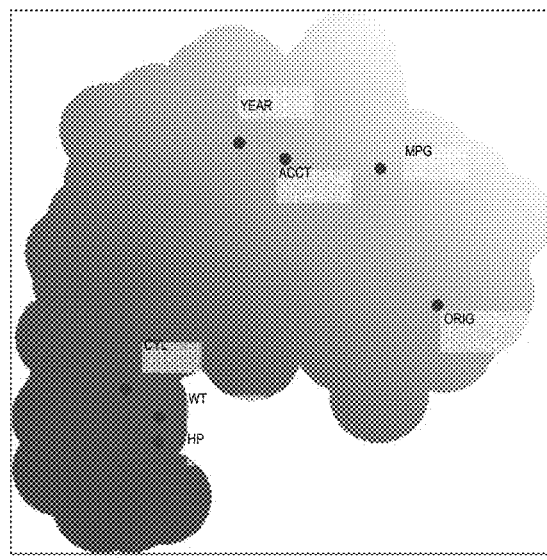
FIGS. 23A and 23B illustrate the difference in plots between AKDE regression and the Original Interpolating and Extrapolating variant of AKDE (OIE-AKDE) in accordance with some aspects of the present disclosure.

AKDE estimates the local density of each sample and then shrinks or enlarges the sample's bandwidth. Then it computes the estimated distance to each sample and performs Nadaraya-Watson kernel regression to obtain the estimated value. The estimated attribute value at point P* may be determined according to equation (19) below:

$$F(P^*) = \sum_{i=1}^{m} \frac{K_{Hi}(\|P^* - P_i\|) \cdot F(P_i)}{\sum_{j=1}^{m} K_{Hi}(\|P^* - P_j\|)} \tag{19}$$

where $K_H$ is the kernel function (a Gaussian function in our case) and $H_i$ is the adaptive bandwidth for ith sample. This method may be applied and the estimate is shown in FIG. 23A. We observe that the interpolated area is quite smooth. This method cannot, however, guarantee the original point values based on this estimation and the scalar field does not have smooth borders. Several methods like rule-of-thumb, maximum likelihood, or other similar are proposed to choose a proper initial bandwidth to solve these problems, but they do not work well. These issues are addressed with our proposed method.

OIE-AKDE Regression

Given these inherent shortcomings, a new estimation method called OIE-AKDE is disclosed which stands for original (O), interpolating (I), and extrapolating (E) variant of adaptive kernel density estimation regression (AKDE). It first estimates the density of samples and computes the bandwidth of each sample with AKDE. Then it calculates different value distributions for each sample. Computing the impact or diffusion factors of each sample in each dimension, an expression for the value distribution is gained in the given estimation area. In order to preserve the original sample values, a new method is disclosed that forces the estimated values equal to original sample values.

Suppose the n-dimensional space satisfies the distribution equation F=0. If a mathematical expression of F can be obtained, then gauging the value scales are easy. However, it is a challenge to obtain the exact mathematical expression of F. What we know is that all m samples satisfy this equation so that $F(P_i)=0$. Based on these samples, it is difficult to give the expression of F. Thus, several different models are disclosed.

First, the sample points may be treated as individual heat sources, diffusing the values over the estimation area. This can guarantee that the value distribution is smooth. Each heat has an impact area. The impact area is formed as distributions, e.g., "Uniform", "Triangular", "Gaussian", "Cosine", "Logistic", etc. These distributions form the kernel function K for each sample. The empty area values can then be computed by summing all heat contributions on this empty area.

However, similar to the AKDE method, this diffusion method cannot guarantee that the original sample point values are retained in the interpolation process. To allow for this, the notion of impact factor may be used. For example a sample point $P_i$, has an impact factor vector $\Lambda_i=[\lambda_{i1}, \lambda_{i2}, \ldots, \lambda_{im}]$, with one value for each dimension. In this vector, $\lambda_{ij}$ is the impact or diffuse factor of the ith sample on the jth dimension. This impact factor is used to adjust the difference between original sample values and estimated values. The weight for point $P_i$ is $w_i$. For any point P*, each dimension value can then be calculated based on the kernel distance according to equation (20) below:

$$F(P^*)=\Sigma_{i=1}^{m} K_{H_i}(\|P^*-P_i\|) \cdot w_i \cdot \Lambda_i \cdot F(P_i) \quad (20)$$

This fulfills the requirement of preserving the values of the original sample points while still maintaining a smooth scalar field. There are numerous of ways to determine $w_i$, from test results of different data sets. For example, $w_i$ may be determined according to equation (21) below:

$$w_i = \frac{\|P^* - P_i\|}{H_i} \quad (21)$$

A final issue is that this method does not fully infer the extrapolations, the empty areas outside the data point area. In order to perform extrapolations, the data values may be forced to grow smaller when they come closer to the border of the view, and the values of all border points may be assumed to be 0 in each dimension. With this constraint, the estimation function will bend to 0 and fade at the border.

Figure 23B:
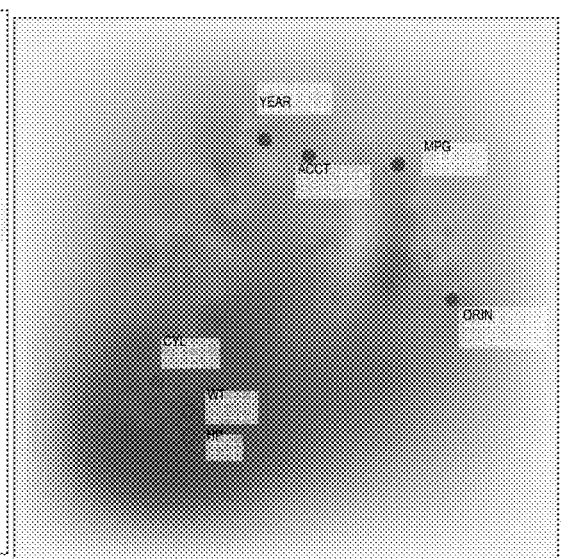

The mathematical expression of F may be obtained, but $\Lambda$s needs to be computed first. All the samples should satisfy equation (23) below, thus m equations with m $\lambda$s can be obtained. With this, we can get the solutions easily. An example of the scalar field estimation using the OIE-ADKE regression is shown, for example, in FIG. 23B. The color encodes the HP value. This estimation is smooth and the extrapolations are enforced. The estimation error may be computed and the interpolation method may be better than AKDE.

After filling the scalar field for each attribute the levels of each attribute are conveyed in the plot. This may be accomplished via iso-level contours as shown, for example, in FIG. 24A. The color of contour line encodes the value it represents. The scale can provide an easy way to read the value, similar to a ruler.

This estimation approach may also be applied to other dimensions, like MPG, e.g., as illustrated in FIG. 25A. Like HP, the estimation value smoothly distributes. The error between original data point values and estimated ones may be computed and shows that the estimation maintains the original sample values well.

Error Comparison

A goal of the interpolation is to preserve the original sample values. Computing the distortion between the original sample points' values and the estimated values may be required. The distortion may be computed by summing up the differences between the original sample points' values and the estimated values, and then divide the sum of original value according to equation (22) below:

$$EV = \frac{\sum_{i=1}^{m} |\Phi(P_i) - D_i|}{\sum_{i=1}^{m} \|D_i\|} \quad (22)$$

The error may be computed dimension by dimension for the car data set and the university data set in the case study. The error comparison table is shown in Table 2 below. It reduces the error from around 0.5 to 0.03 for the car data. For the university data, it reduces the error from around 0.9 (for every attribute) to 0.11. Other data sets were also tested and show that the disclosed method is more accurate.

TABLE 2

The error comparison between AKDE and OIE-AKDE

| Car | MPG | CYL | HP | WT | ACCT | YEAR | ORIN |
|---|---|---|---|---|---|---|---|
| AKDE | 0.48 | 0.49 | 0.51 | 0.48 | 0.47 | 0.52 | 0.55 |
| $_{OIE}$AKDE | 0.03 | 0.03 | 0.03 | 0.02 | 0.03 | 0.03 | 0.03 |
| University | ACAD | ATHL | NLIFE | SAF | PHD/F | TUITION | |
| AKDE | 0.98 | 0.92 | 0.89 | 0.93 | 0.97 | 0.98 | |
| $_{OIE}$AKDE | 0.11 | 0.12 | 0.1 | 0.14 | 0.11 | 0.12 | |

Height Field Surfaces

Embedding data into 2D often gives a general overview of the data distribution. The relative distance from attributes gives the user some insight into the data values. Outliers, however, can be difficult to identify. A point that is far from all the attributes could indicate that it has a low value for each attribute (i.e. all the attributes push it away), or it could indicate that it has a high value for each attribute (i.e. all the attributes are pulling it). In addition, in clusters of data points, occlusion may occur. This makes difficult to differentiate between points. Adding a third dimension based on the real values of the data points can address these issues.

Generating the Scalar Field Surface with Semantic Mapping

The attribute points can be viewed as source points whose value is the maximum with respect to the attribute it represents. Its influence radiates from the source and expands over the map canvas. This is like a mixture of Gaussians where each attribute point is the mean of a Gaussian. For two attributes $V_1$ and $V_2$ (FIG. 26A), their distribution values will merge when the values distribute to the middle and to the border. The $V_1$ and $V_2$ points are the peak values and the borders represent the valley. The height of one data points can be defined as the average value from all dimensions according to equation (23) below.

$$Height_i = \frac{\sum_{j=1}^{n} d_{ij}}{n} \quad (23)$$

The height field for the car dataset is shown in FIG. 26B. The grey shading shows the height contour, with the lighter shade indicating a greater height. From FIG. 26B, some cars are on the high-level contours, like "Datsun 280-zx", "Chrysler lebaro" etc. These cars have a high average score, while some at low level contours, like "Toyota mark ii", "Renault 12(sw)" etc, have low average scores. To display the height more intuitively, a 3D surface may be created as will be described in more detail below. Note the attribute "ACCT" is changed as "ACC".

Semantic Mapping

Figures 27A, 27B:
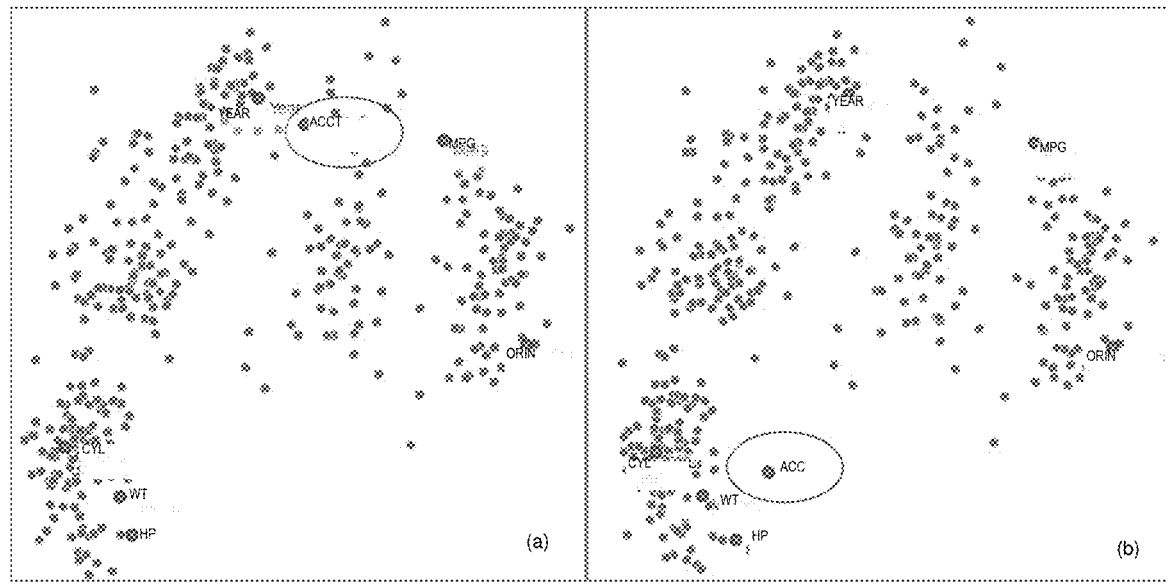
FIGS. 27A and 27B illustrate an adjustment of a layout due to semantic analysis in accordance with some aspects of the present disclosure.

To make the 3D surface easier to read the surface should have semantic meaning (i.e. higher is always considered better). Before creating a 3D surface, however, a semantic mapping is required. In some aspects, users may define whether a high value with respect to an attribute is desirable or undesirable. With respect to the car data set, for example, most users may consider high "horsepower" desirable but not a high "acceleration time", e.g., users normally do not want long acceleration times. Thus, some attributes may be adopted to fit this semantic meaning. For example, an attribute "acceleration time", may be changed to the opposite attribute, "acceleration" ("ACC"), and the appropriate column in the DM ($V_{ACCT}$) may be replaced with 1, $V_{ACCT}$. FIGS. 27A and 27B show the effect of changing the semantic meaning of an attribute. For example, a new layout is obtained as shown in FIG. 27B as compared to the original layout in FIG. 27B. For example, the "ACCT" (circled in red) moves from upper left corner to the bottom left corner. This is because "acceleration" is positively correlated with "HP", "WT", "CYL" but negatively correlated with "MPG".

Figures 28A, 28B:
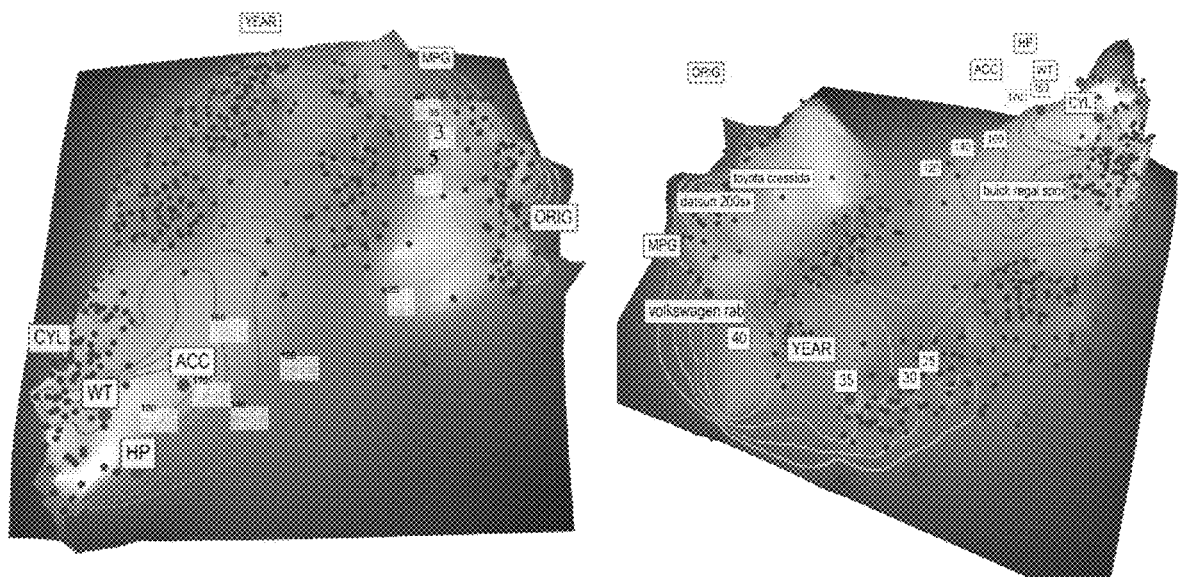
FIGS. 28A and 28B illustrate a 3D terrain plot showing scalar fields from different viewing angles in accordance with some aspects of the present disclosure.

After the semantic mapping, a 3D surface can be created to show the value distributions, for example, as illustrated in FIG. 28B. Some peaks may be observed, e.g., a "MPG" peak, a "YEAR" peak, a "ORIN" peak and the combined peak from "HP", "ACC", "WT" and "CYL". Numerous cars are shown near the peak, such as, e.g., "Chevrolet Capri", "VW Rabbit". These are considered good cars according the height semantic. On the other hand, some cars are shown at the valley, such as, e.g., "Plymouth Arrow".

Like the 2D view, contours may be added to the 3D surface map to help map distance to real attribute values. This makes the 3D surface look more like a terrain map. The variables act as the names of mountains while the contours indicate the distance to a mountain for example, as illustrated in FIGS. 28A and 28B. For example, the purple contour lines may represent the "HP" contour and start at the "HP" peak, and end in the valley. The teal contour lines may represent the "MPG" contour and may start from the "MPG" peak and end in the valley.

Colorizing the Surface

To better illustrate the terrain, color may be embedded at the points based on their locations. This can help show the dominant attributes in the dataset. In FIGS. 29A-29D, for example, the blue region corresponding to "MPG" covers roughly 25% of the surface, while the pink region representing the combined attributes "CYL", "WT", "ACC", and "HP" covers half of the map. This indicates that these attributes are very significant. Contrast this with the purple, "Year", region which covers very little space on the map.

The combination of color and height produces identifiable features. In FIGS. 9A-9D, for example, the 3D surface produces mountains and the color identifies them as the "blue" mountain for MPG, and the "pink" mountain for CYL, HP, WT and ACC. The pink region is made up of classic US muscle cars. Contrast this with the blue region, which contains newer cars with a higher MPG but low HP. This region covers the Japanese efficient compact cars.

Different color spaces can be used for the task of coloring the scalar field. RGB and HSV(HSL) are popular color models but they cannot preserve the perception uniformly. In other words, the distance in the 2D space does not map well to differences in color perception. By contrast, (CIE)LUV color space is a perceptually uniform space and it may better convey the similarity of data points as similar colors. In some aspects, a slice of LAB color space with a fixed brightness may be used.

Data Exploration

Figure 29A:
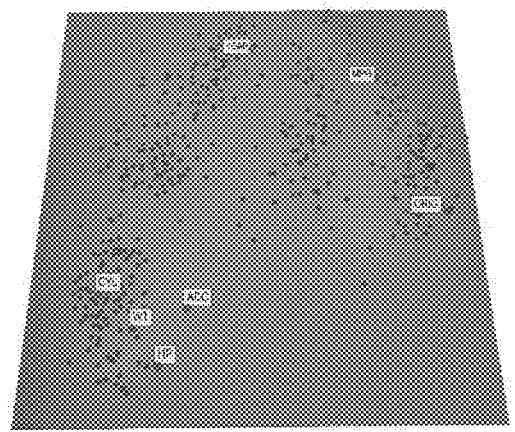
FIGS. 29A-29D illustrate height scaling from 2D to 3D and rotation of the 3D map in accordance with some aspects of the present disclosure.
Figure 29B:
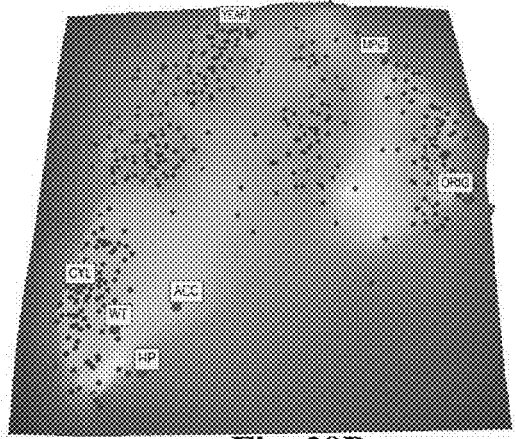
Figure 29C:
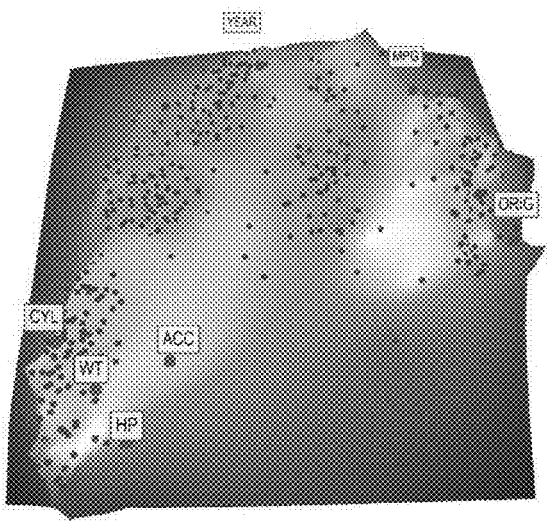
Figure 29D:
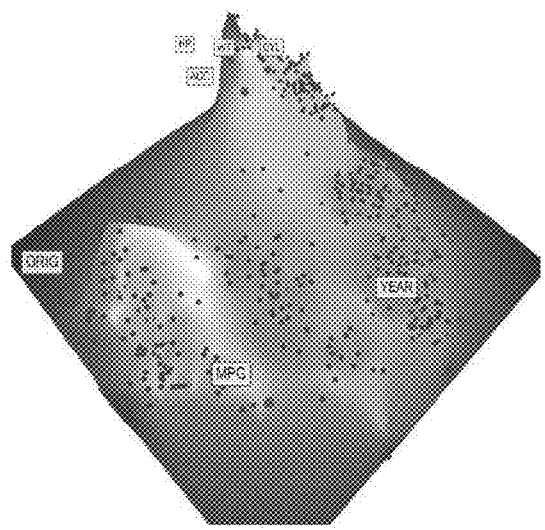

The 3D terrain is more informative than 2D, but exploring in the 3D terrain is more difficult as some parts may become occluded. To overcome this, rotation may be added to allow the user to see the map from different perspectives. In addition, a slider bar may be used to allow the user to change the terrain from 2D to 3D interactively. This transform from 2D to 3D can be easily achieved by scaling the height, for example, as illustrated in FIGS. 29A-29D. In FIG. 29A, the 2D scatterplot++ is presented, which may be slightly popped up into 3D as illustrated in FIG. 29B, and even more so in FIG. 29C. The 2D view in FIG. 29A provides an overview, and FIGS. 29B and 29C show the value accumulative distribution. Rotating the view, as illustrated in FIG. 29D, gives a better sense of the height of the mountains. This informs the user that the bottom left corner and upper right corner contain the "good" cars while the upper left corner contains the "bad" cars.

Local Exploration

Rotation and height scaling interactions may give the user an overview of the data, while zooming allows the user to see finer details of the data. In some cases, zooming in on a specific area, however, may cause some attributes to move out of view. This may cause the user to lose context or direction, e.g., the user may become "lost" in the terrain. Additionally, it may become difficult to identify smaller changes in attribute values. Moving to higher terrain, for example, may lead to a higher average attribute score, but some key attributes, e.g., HP, may decrease as illustrated, for example, in FIG. 24A. For example, a user may find the car "vovlo 145e (sw)" lacking in horsepower. When the user is determining which direction he should move in the terrain, he may attempt to compare two nearby points but this may prove difficult since the 3D surface does not give a good indication of the subtle changes in specific attributes.

To overcome this issue, direction arrows may be added to the 3D surface to guide the user's exploration. Each arrow may show the gradient direction at a specific area with respect to an attribute. The one-dimensional gradient may be easy to compute since the continuous distribution function F is already computed, for the jth dimension, the gradient at an arbitrary point, P*, may be determined, for example, according to equation (24) below:

$$\frac{\Delta F}{\Delta V_j}(P^*) = \lim_{P \to P^*} \frac{F_j(P) - F_j(P^*)}{\|P - P^*\|} \tag{24}$$

In some aspects, the multidimensional gradient may be constructed as the vector consisting of the gradients from each dimension. This vector may give the user guidance for specific direction exploration.

In some aspects, the gradient direction may be visualized using an arrow. The arrow length may represent the gradient magnitude and the arrow may point in the direction of increasing gradient. FIG. 24D shows the multidimensional gradient for a point representing the vovlo 145e (sw). FIG. 24D represents a zoomed in view of the area circled in white in FIG. 24C. From the gradient arrow, the user can see that the neighboring point, corresponding to the volvo 264gl, is a newer car with more horsepower. This is not easy to distinguish from the position of the points alone because neither is significantly closer to the HP attribute.

$$\left[\frac{\Delta F}{\Delta V_1}, \frac{\Delta F}{\Delta V_2}, \ldots, \frac{\Delta F}{\Delta V_i}\right] (i = 1, 2, \ldots, n) \quad (25)$$

Equation (25) above may be used to visualize the gradient using an arrow. The arrow length represents the gradient value and the arrow points to the gradient growth direction as illustrated, for example, in FIG. 24D. The user may observe that the "vovlo 145e (sw)" is marked in white in FIG. 24C, with its directions. From the direction arrow, the user may, for example, identify neighboring cars like the "volvo 264gl" at the "Hpower" and "Year" direction (e.g., more horsepower and newer car), the "Peugeot 604sl" at CYL direction, and the "saab99e etc" at MPG direction.

Tradeoffs Path

Embedding the high-dimensional data space into the 3D surface map may make it difficult for a user to evaluate nearby data points with respect to specific attributes. When a user is evaluating a small subset of points, the multidimensional gradient may be sufficient. When the user is examining a larger set of points, however, a path showing how specific attribute values change may be more informative to the user. This "tradeoffs path" may allow users to recognize differences, tradeoffs, and compromises across the scalar field.

As an example, a user, Kate, may be looking for a car with a lot of horsepower which is also fuel efficient. Looking at the 3D surface map in FIG. 30B, she may observe that these two factors are negatively correlated or have a low level of similarity and so she must compromise. An example of a low level of similarity may be a similarity of less than a predetermined threshold amount, e.g., 5%, 10%, 15%, or another amount of similarity set by default or input by the user. She may pick two cars that represent extremes for horsepower and fuel efficiency, e.g., using input device 120. For example, Kate may pick the "VW Rabbit", for MPG, and the "Ford F250", for HP as illustrated, for example, in FIG. 30B. By generating the tradeoffs path (blue line), Kate can observe all of the compromises between these two extremes choices. For example, starting from the VW Rabbit, each point on this path represents a car that has a little less fuel efficiency and a little more horsepower. She may, for example, select the Peugeot 604SL (circled in red) because it has a good balance of fuel efficiency and horsepower.

Figure 30A:
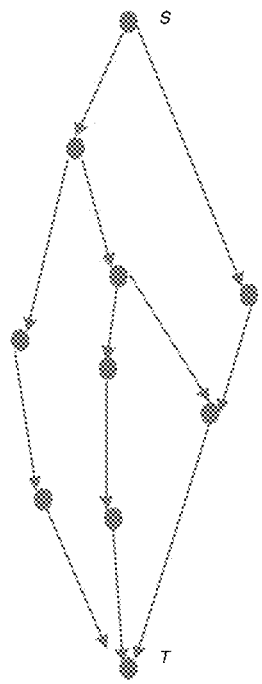
FIGS. 30A and 30B illustrate tradeoff paths in accordance with some aspects of the present disclosure.
Figure 30B:
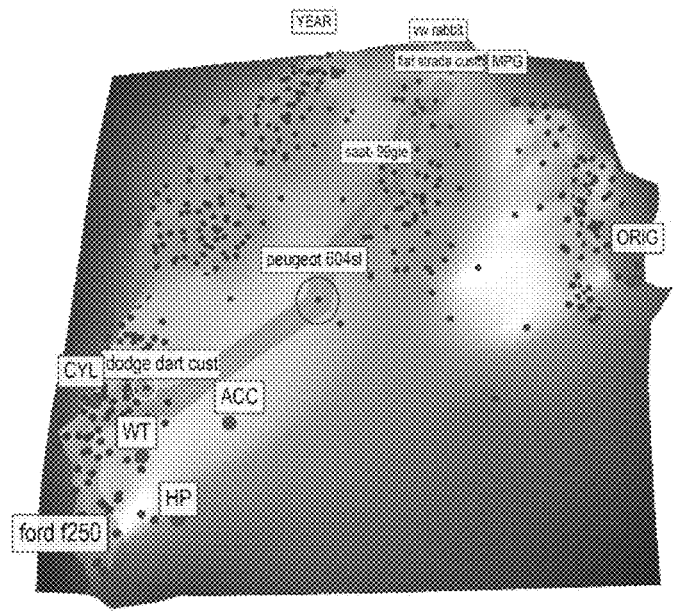

In some aspects, the contours in FIG. 28A may also suggest that the tradeoff path in FIG. 30B may correspond to less MPG and greater HP. Although contours can also give the user some insight on how attribute values change over the surface map, multiple contours can clutter the canvas area. The tradeoff path, however, can produce compromises based on several attributes without cluttering the view.

In some aspects, the tradeoff path may require two data points, e.g., a source point S and a destination point T. The intermediate nodes form a directed graph from S to T, for example, as illustrated in FIG. 30A. In some aspects, multiple paths may be taken through the graph. For example, different paths may represent different gradient directions. In some aspects, by default, the path with most intermediate nodes may be presented. This default path may provide users with more choices and may lead to more gradual tradeoffs.

Traversing the tradeoff path from S to T may require candidate points to build the path. These candidate points, L, may have attribute values between those of S to T. Users may be allowed to define which attributes the users wish to consider. For example, suppose q is the number of candidate points. These candidate points may then form a path ($L_p$, $L_{p+1}$, $L_q$) from S to T. With reference to equation (26) below, for each data item $L_i$ in the high-dimensional space:

$$S < L_p < L_{p+1} < \ldots < L_q < T \quad (26)$$

where < denotes precedence based on the chosen attributes.

In addition, since the disclosed layout preserves similarities, the points near the path may have similar values as those on the path. To illustrate these points, the path may include an impact area, e.g., an area that may be visualized as a fade band as shown, for example, in FIG. 30B whether the path includes a faded area on either side of the teal path. In some aspects, a data sample found in the band, e.g., the "dodge dart cust" (circled in yellow), may also be a good candidate sample that the user may wish to consider.

Pareto Frontier Path

Figure 31A:
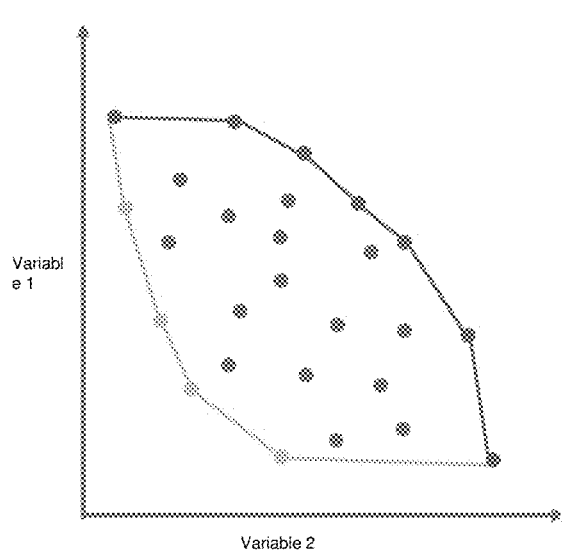
FIGS. 31A and 31B illustrate pareto frontier paths in accordance with some aspects of the present disclosure.
Figure 31B:
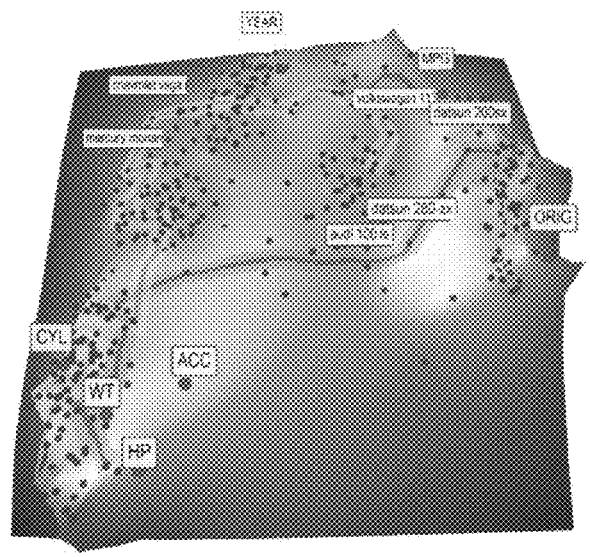

When two desirable attributes are negatively correlated or have a low level of correlation, dissimilarity, etc., multiple distinct peaks may be formed on the surface map. In FIGS. 31A and 31B, for example, there may be a peak for MPG and a peak for HP. These two attributes may be highly desirable, but the data suggests that obtaining both together is unlikely. To address the issue of multiple, negatively correlated peaks, the Pareto frontier may be computed to identify all the "best" points with respect to a set of chosen attributes.

The Pareto frontier is a generalization of the tradeoff path. It produces a set of compromises but does not require the user identify two extreme points. The points on the Pareto frontier are points that cannot be dominated by other points with respect to the chosen attributes. For example, let the set of chosen attributes be defined as $SV = \{V_p, \ldots V_q\}$. Suppose the Pareto frontier set is PF, then $$\{PF^* \in PF | D^* \in D, \forall k \in SV \{D_k^* > PF_k^*\} = \emptyset\} \quad (27)$$

where PF* is a point on the Pareto frontier and D* is a data point in high dimensional space.

FIG. 31A shows a simple example of the Pareto frontier. The red nodes belong to the Pareto frontier. Although the Pareto frontier is typically used to identify the "best" points, it can also be useful to identify the "worst" points. The Pareto frontier concept may be generalized to produce the Pareto frontier of worst points. These are points that are dominated by all other points with respect to the chosen attributes.

$$\{PF^* \in PF | D^* \in D, \forall k \in SV \{D_k^* < PF_k^*\} = \emptyset\} \quad (28)$$

The yellow points in FIG. 31A show the Pareto frontier of "bad" points.

FIG. 31B shows the Pareto frontier on the car dataset with respect to the HP and MPG attributes. The cars on the red path (e.g., the "Datsun 200sx", "Datsun 280-ZX", etc.) have the highest values for MPG and HP and correspond to the frontier of "good" cars. Conversely, the cars on the yellow path (e.g., the "Volkswagen11", "Mercury Mona", etc.) have the lowest values for MPG and HP and correspond to the frontier of "bad" cars. The red and yellow frontiers define a range on the selected attributes and help describe what is attainable. For example, the distance between the red and yellow frontiers is low near the HP attribute in FIG. 31B. This suggests to a user that there are few examples of cars with a high HP and a high MPG. Conversely, toward the center of the map, there is a large distance between the red and yellow frontiers. This suggest that while it is possible to gain MPG by sacrificing HP (e.g. the cars on the red frontier), there are also examples of cars that sacrifice HP but do not gain much MPG (e.g. the cars on the yellow frontier).

Case Study

Figure 32:
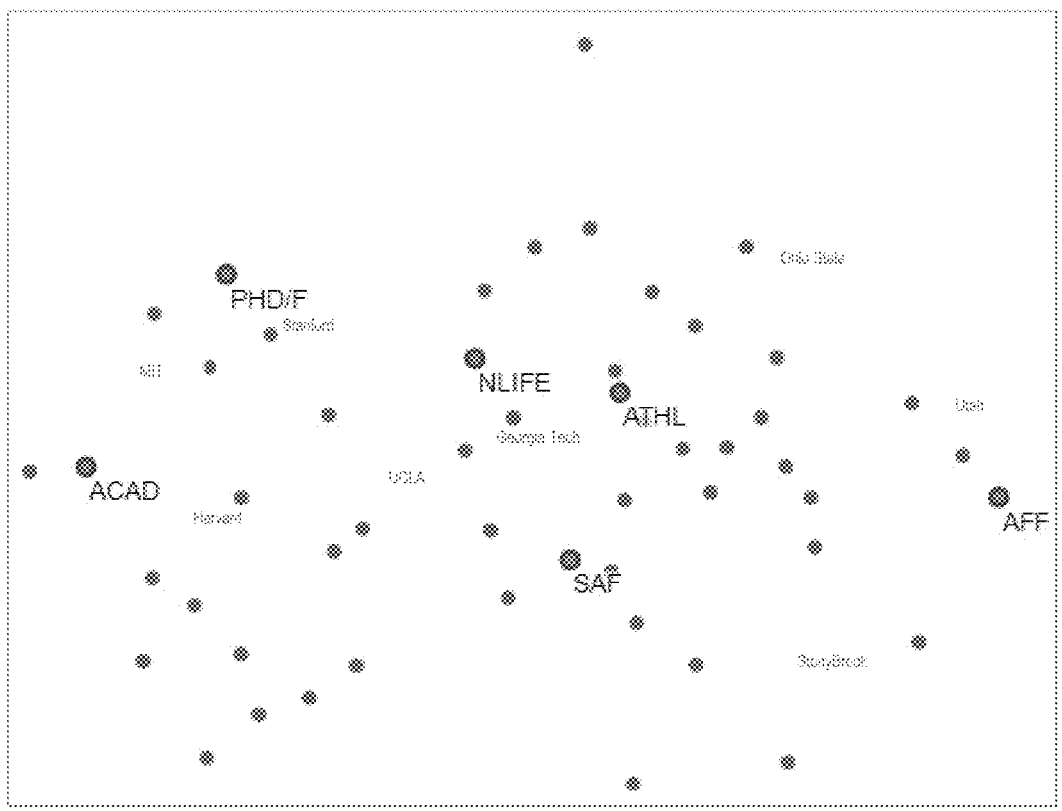
FIG. 32 illustrates a plot of a case study on university data using the scatterplot++ layout in accordance with some aspects of the present disclosure.

Another example case study is now presented that relates to the selection of a "good" university. Selecting a good university is an important decision for prospective students. Universities typically consist of multiple attributes. Balancing these attributes to choose a suitable university may be difficult and time consuming for students. In some aspects, the student may visualize a dataset containing 46 universities along with 6 attributes of interest: academics, athletics, nightlife, safety, PhD/faculty and tuition. The academics, athletics and tuition levels are averaged across all departments and is from the 2012 school year. As mentioned above, in an example utilization of the disclosed technique, the "tuition" attribute may be changed to an "affordability" attribute so that higher values may be more desirable. The scatterplot++ may be utilized to layout the data points with spatial organization, as seen, for example, in FIG. 32. As expected, the prestigious schools (e.g. MIT, Harvard, Stanford) congregate around the academic and PhD/fac attributes. Georgia Tech and UCLA have better nightlife and athletics. Finally, Stony Brook and Utah are the most affordable universities.

Figure 33A:
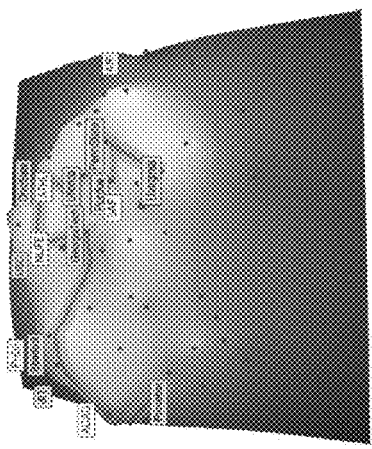
FIG. 33A illustrates a 3D scatterplot++ for the university data set based on academic level in accordance with some aspects of the present disclosure.

To evaluate the universities with respect to all the factors, a 3D surface map may be generated according to the above disclosure, as seen, for example, in FIG. 33A. In some aspects, the universities may be divided into three clusters, e.g., the universities on the red mountain (left) are the good academic university like MIT, Stanford, CMU, Harvard, etc. At the middle part, are universities with good social life events, like Georgia Tech, USC-Viterbi, etc. On the right blue mountain, there are low tuition universities, like Stony Brook University, Arizona State University and Utah University. The universities at the peaks are "good" universities with respect to all the factors. In this scenario, MIT, Stanford, CMU, Harvard may be considered first level universities; Georgia Tech, USC-Viterbi, UCLA may be considered second level universities; and Stony Brook university, Arizona State University and Utah university may be considered third level universities. To explore the terrain from a different aspect, the terrain may be rotated as shown, for example, in FIG. 33B.

Figure 33D:
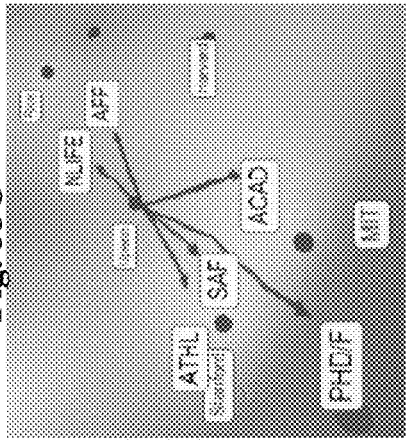
FIG. 33D illustrates the 3D scatterplot++ of FIG. 33A including a pareto frontier path based on the academic, athletics, and affordability attributes in accordance with some aspects of the present disclosure.
Figure 33B:
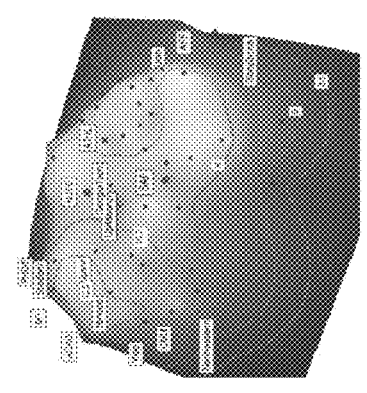
FIG. 33B illustrates an exploration of the terrain of the 3D scatterplot++ of FIG. 33A for different aspects including contour lines in accordance with some aspects of the present disclosure.

To quantitatively measure the university from attribute view, the contour lines may be drawn in FIG. 33B. The pink contour shows the academic level of each university, e.g., scored between 0 and 12. For example, Harvard, CMU, and MIT are scored between 10.5 to 11.5. UCLA and Georgia Tech are scored between 9 and 10.5; Northwestern University is between scored between 5 to 9 and Stony Brook is scored between 3.5 and 5.

Figure 33E:
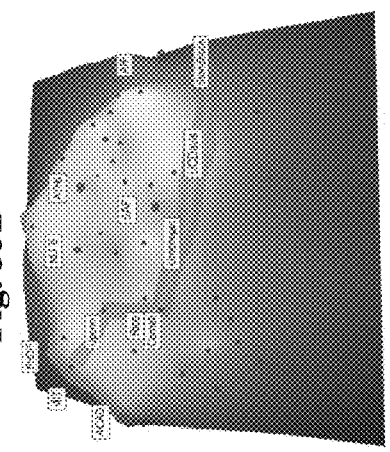
FIG. 33E illustrates the 3D scatterplot++ of FIG. 33A including a tradeoff path between Stony Brook and MIT in accordance with some aspects of the present disclosure.
Figure 33C:
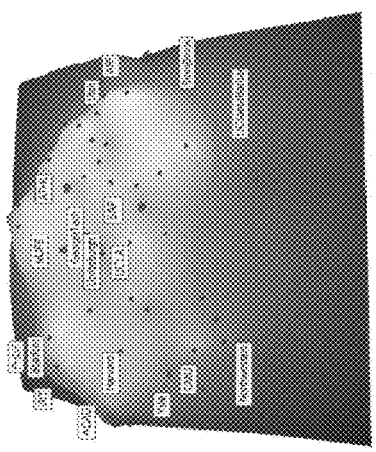
FIG. 33C illustrates the 3D scatterplot++ of FIG. 33A including a pareto frontier path based on academic and athletics attributes in accordance with some aspects of the present disclosure.

For the prospective students, different students may have different preferences. For example, Peter, one of the prospective students, is a sporty and hard-working student. He wants to go to a prestigious university with a top athletics program. He generates the Pareto frontier with respect to these two attributes as illustrated, for example, in FIG. 33C.

When he views these universities, he suddenly finds he missed one additional attribute requirement, the affordability. He generates a new Pareto frontier considering affordability as an additional attribute, as seen, for example, in FIG. 33D. The path starts from the cheap universities (affordability), and then goes through the athletics, nightlife and finally reaches the high academic and PhD/fac level universities. There are a few new candidates, Utah, Stony Brook, Upenn, etc. He observes UIUC is not on the path, but it is quite close to the path so it is also a good option.

Peter is sure that he can be admitted by Stony Brook University but he really wants to go to MIT. Stony Brook is Peter's "safety" school while MIT is a long shot. To overcome this problem, he may generate the tradeoffs path from Stony Brook University to MIT based on affordability, academic level and athletic level as illustrated, for example, in FIG. 33E. This path arises from the valley of the terrain and slightly goes to the peak. On this path, there stands the universities like UC Davis, university of Michigan and the University of Pennsylvania. These are the recommended universities for him.

Figure 33F:
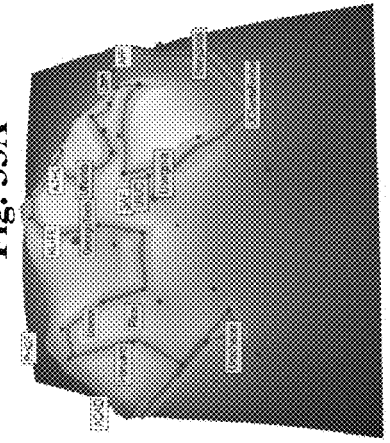
FIG. 33F illustrates the 3D scatterplot++ of FIG. 33A including arrow guidance for Penn University in accordance with some aspects of the present disclosure.

Peter is quite interested in the University of Pennsylvania, but he still wants to explore and check whether there are other options before he makes his final decision. He zooms in to further explore the region around UPenn, as illustrated, for example, in FIG. 33F. The arrow helps differentiate between neighboring universities. It shows that if he wants to have better PhD/fac, he could choose MIT; if would like to have better academic, he could choose Harvard; if he wants to have better athletics, nightlife, he could choose Rice university.

Spatial locations allow users to appreciate similarity relationships among the high dimensional data points by their spatial organization on the 2D display. The disclosed scatterplot++ can display the scalar points. This may be achieved by applying fused layout techniques to get the spatial location of InfoVis data. By means of an extension to adaptive kernel-density interpolation that interpolates the scattered data points, a continuous scalar field may be created. This enables the construction of other features of scalar fields such as, e.g., iso-contours, topographic maps, and height field surfaces.

Further Example

Figure 34:
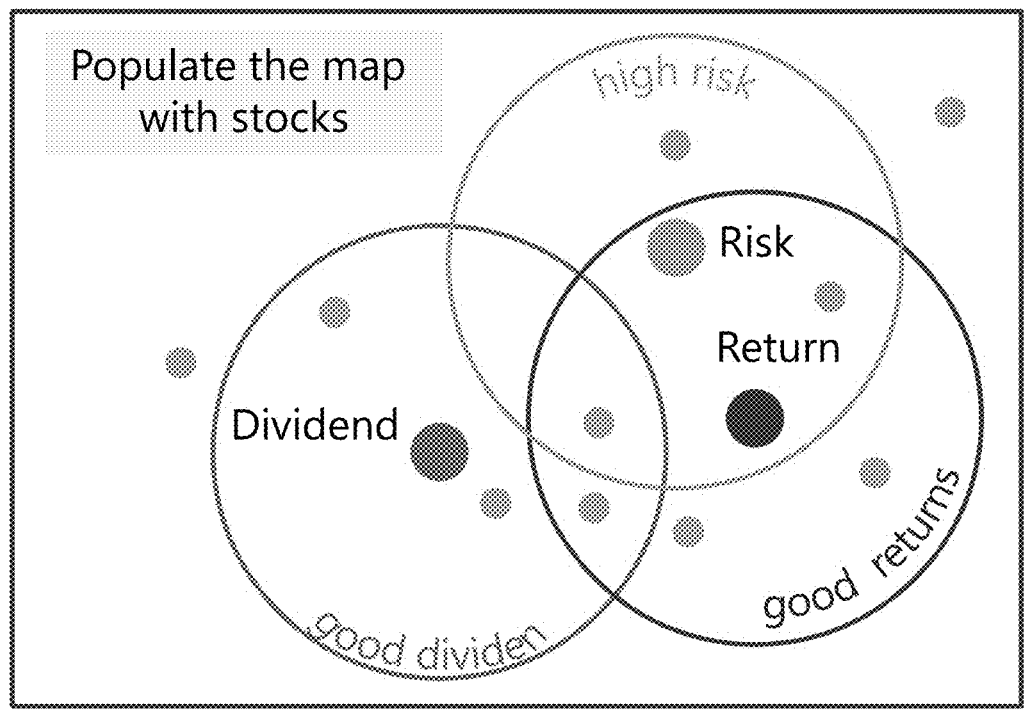
FIG. 34 is a diagram illustrating a map of competing attributes for a stock in accordance with some aspects of the present disclosure.
Figure 35:
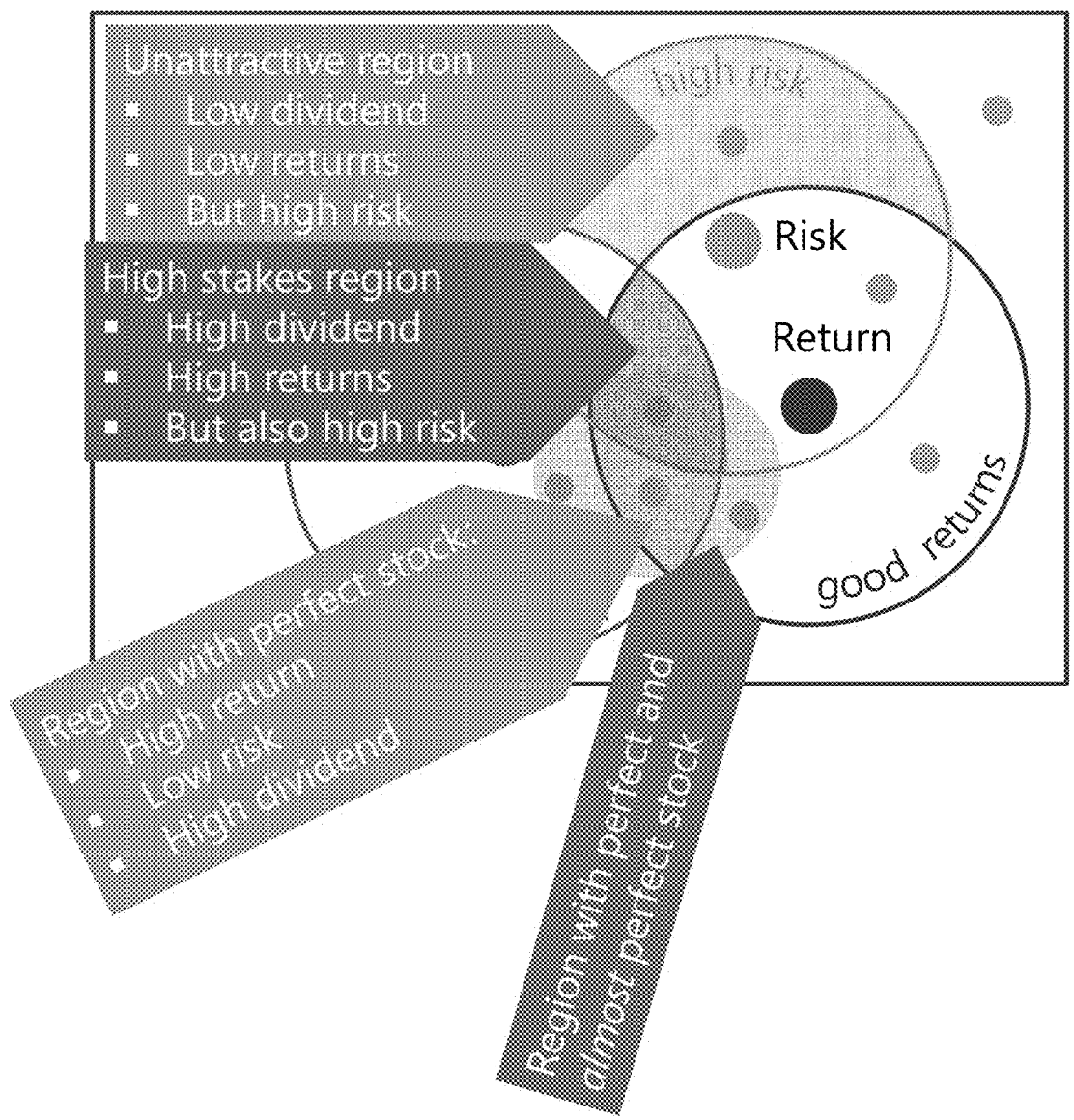
FIG. 35 is a diagram providing descriptions related to the region breakdowns of FIG. 34 in accordance with some aspects of the present disclosure.

With reference now to FIG. 34 a mapping for stocks is illustrated. In the example of FIG. 34, for example, attributes of dividend, risk, and return may be selected as target attributes. As seen in FIG. 35, for example, the region indicated by the grey arrow may be unattractive to a user due to the high risk, low return and low dividends. The region indicated by the red arrow may be attractive as a region which provides high dividends and returns but also has high risk. The region indicated by the green arrow may be considered the perfect stock region including high return, low risk, and high dividends. A broader region than the region indicated by the green arrow, for example, as indicated by the blue arrow and spanning across may represent stocks that are either within the perfect stock region or closely surrounding the perfect stock region.

Figure 36:
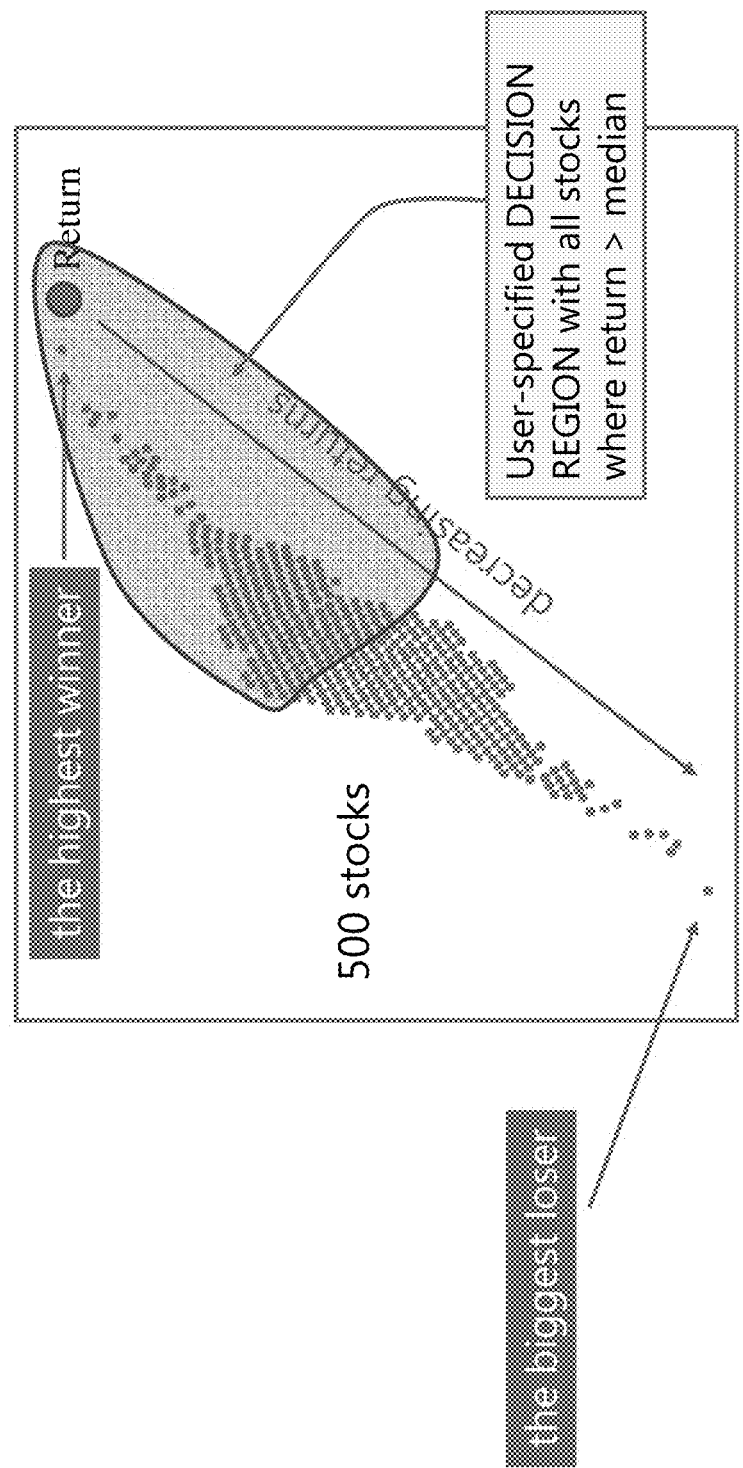
FIG. 36 is a diagram of a map based on a return attribute in accordance with some aspects of the present disclosure.

With reference now to FIG. 36, a mapping may be generated which shows the relative returns of the different stocks. For example, the stock with the best return may be considered the highest winner while the stock with the lowest return may be considered the biggest loser.

Figure 37:
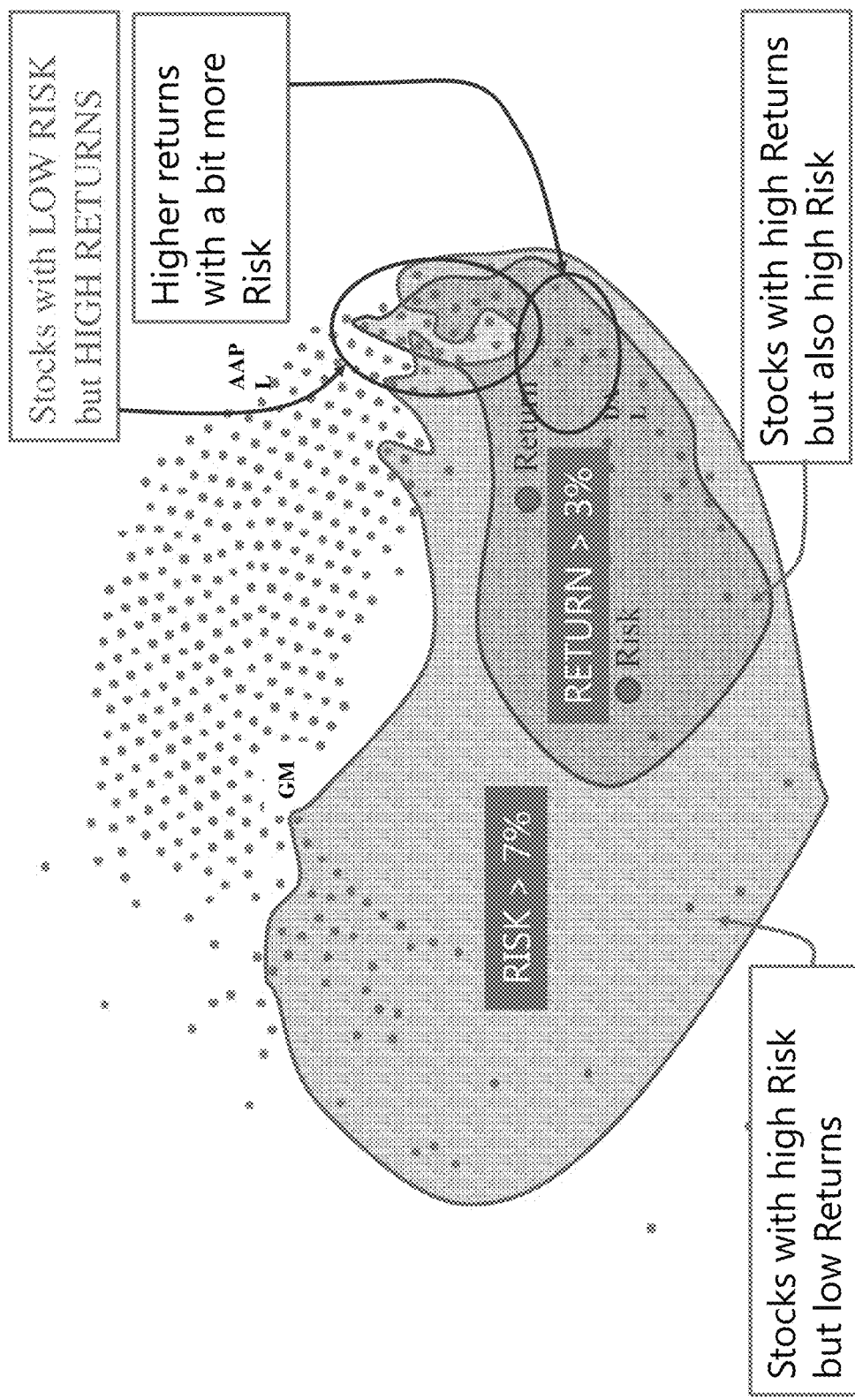
FIG. 37 is a data context map including overlapping regions based on two attributes in accordance with some aspects of the present disclosure.

With reference to FIG. 37, a composite map may be generated as described above that takes into account more than one attribute criteria. For example, a user may specify decision thresholds, e.g., Risk>7%, and return<3% which may then be visualized as red and blue regions, respectively, on the composite map. A user may observe the composite map including the visualized regions to understand that the closer a stock is to the risk and return attributes, the higher value of the risk and return, respectively. The overlapping regions are those where risk is high but returns are also high, and the region where return>3% does not overlap risk>7% provides returns which meet the criteria but have less than the specified risk.

Figure 38:
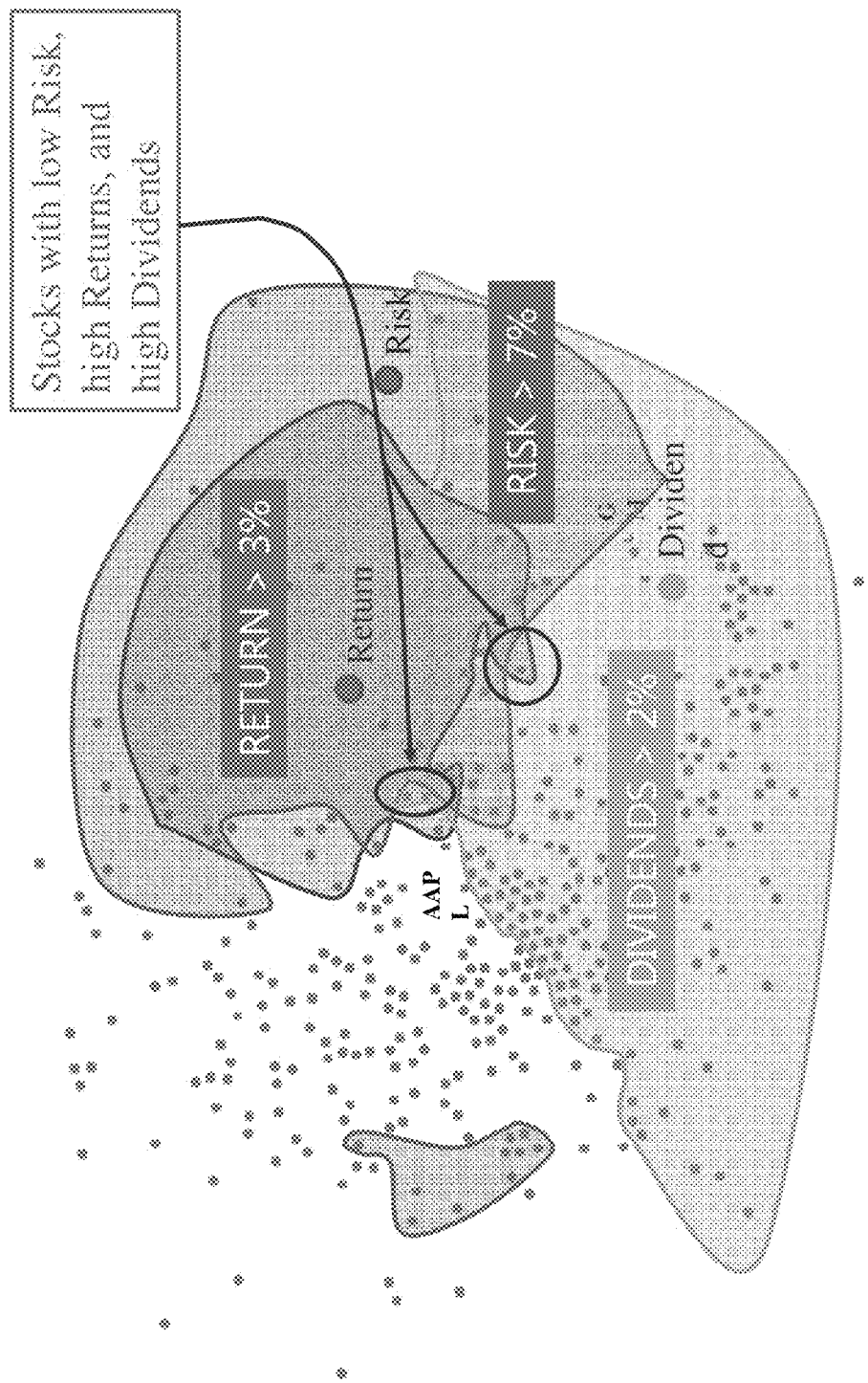
FIG. 38 is a data context map including overlapping regions based on three attributes in accordance with some aspects of the present disclosure.

With reference to FIG. 38, the user may add further attribute criteria such as, e.g., dividends>2%, which introduces a further visualized region, i.e., the orange region in FIG. 38. As seen in FIG. 38, the overlapping portions of the red, blue, and orange regions may be observed by the user to determine a region where stocks with low risk, high returns, and high dividends are present, e.g., a region where the orange and blue regions overlap but the red region does not.

Figure 39:
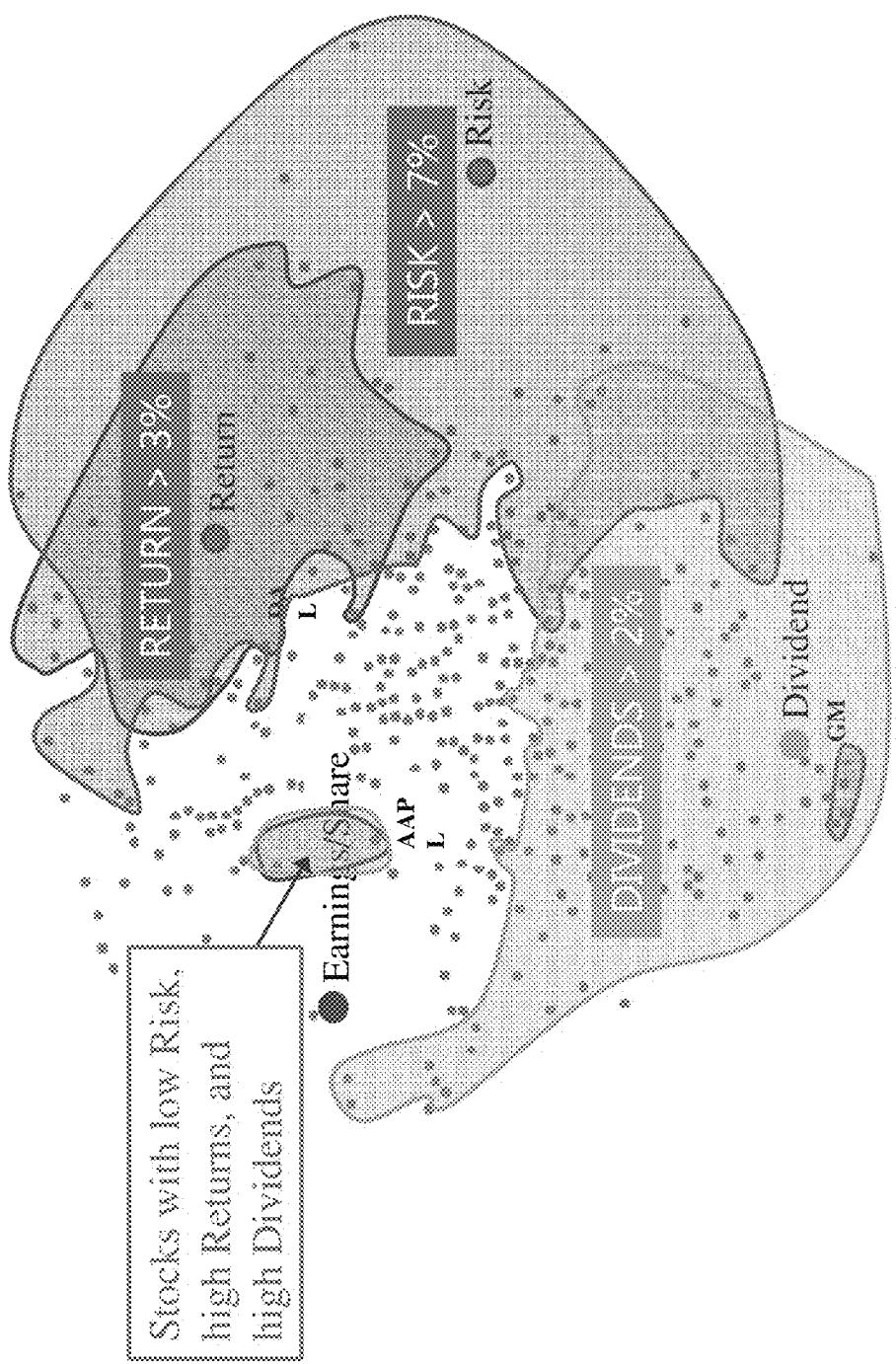
FIG. 39 is a data context map including overlapping regions based on four attributes in accordance with some aspects of the present disclosure.

With reference now to FIG. 39, the user may add a further attribute for earnings per share that may reconfigure the map due to new similarity data. For example, the addition of the additional factor alters the visualization locations of the different sample points (stocks) and the visualization regions as shown in FIG. 39.

Figure 40:
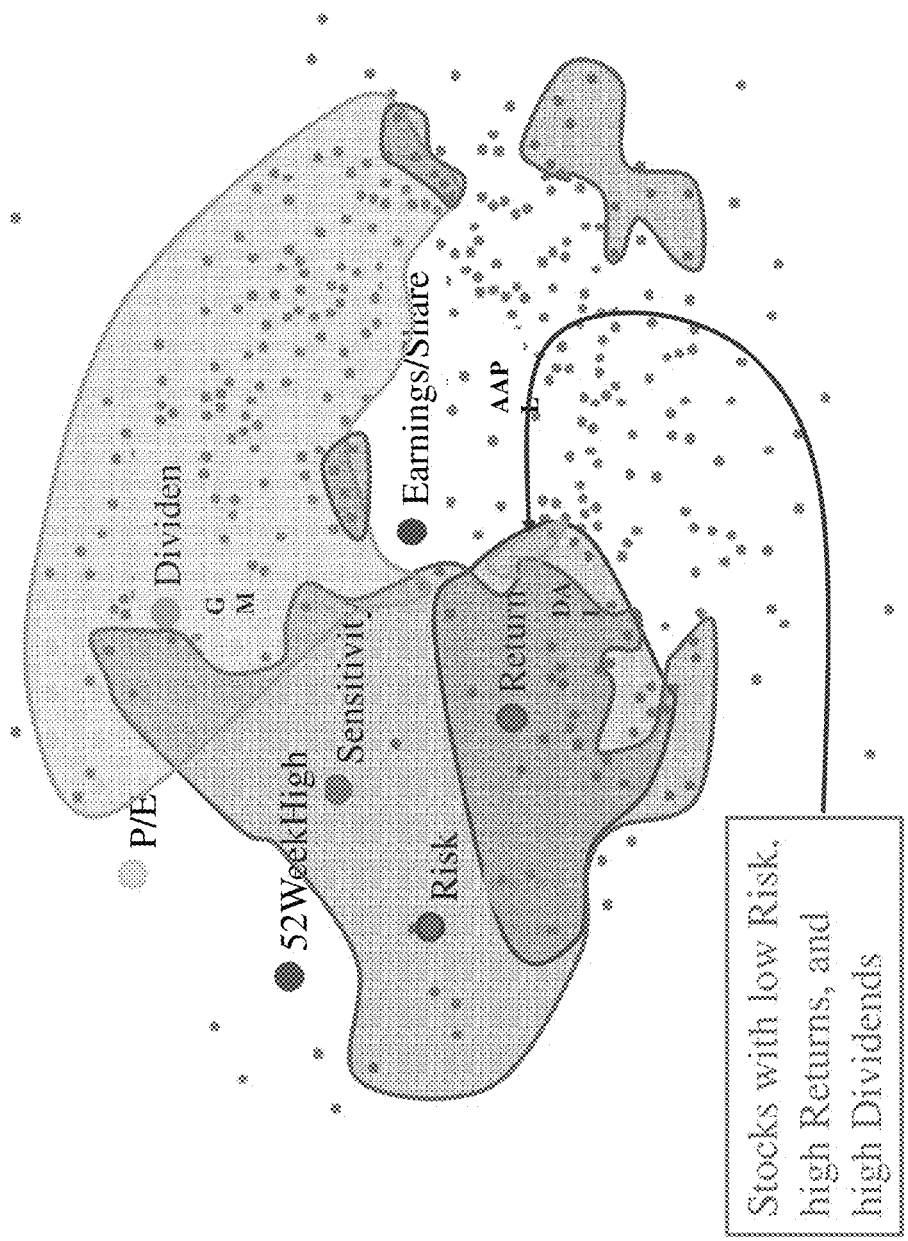
FIG. 40 is a data context map including overlapping regions based on seven attributes in accordance with some aspects of the present disclosure.

With reference now to FIG. 40, the user may add a further attributes for price/earning, 52 week high, and sensitivity that may further reconfigure the map due to new similarity data. For example, the addition of the new factors may alter the visualization locations of the different sample points (stocks) and the visualization regions as shown in FIG. 40.

Figure 41:
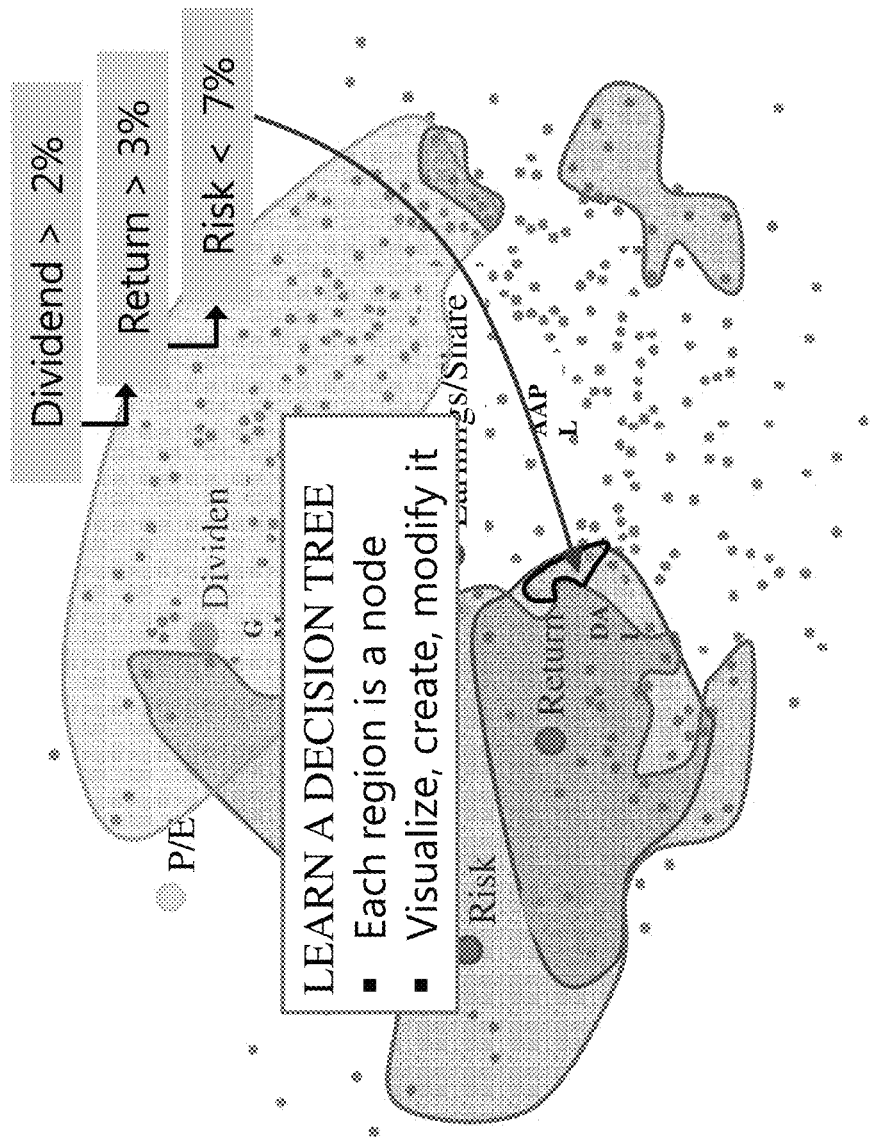
FIG. 41 is a data context map including a region defined based on a decision tree in accordance with some aspects of the present disclosure.

With reference now to FIG. 41, using a decision tree as disclosed above, the user may generate a target region that meets the specified criteria, e.g., dividend>2%, return>3%, risk<7%, as illustrated by the region with the black outline.

Machine Learning Training Data

In some aspects, the decision boundary map (DBM) may enable the debugging of machine learning models, and in particular a visualization of the classifiers used for prediction and labeling tasks. These models may be decision trees and decision forests, support vector machines, neural networks and deep neural networks, and others. The DBM provides a unique visualization that will help the machine learning model designer better understand the machine learning models and foster trust in the model. The DBM may also be used to enable model verification. This may be important in high stakes algorithmic decision making applications such as, e.g., quantitative finance, algorithmic trading, hiring, admissions, criminal justice, foster care, and many others. All of these fields use high-dimensional data for training machine learning models.

The ability of the DBM to display the training data in the context of the decision variables (factors, attributes) will enable model designers to intuitively observe data points that were incorrectly classified, either as false positives (FP) or false negatives (FN). For example, for a decision tree a FP may locate inside an intersection of the corresponding decision boundaries, while a FN may locate outside of the intersection. Critical data points that were nearly misclassified (and can be sensitive to measurement error) may be located near the boundaries. The DBM visualization provides a model designer with a faster and more intuitive way to recognize potential weaknesses of the model without having to resort to the painstaking process of looking for a needle in the proverbial haystack of a sparse high-dimensional data space. The DBM non-linearly collapses the data space into a 2D display that is easy to visually explore. In response to the determination that a classification resulted in a FP or FN, the classification scheme may be updated to remove the occurrence of the FP or FN.

The machine learning model may then be trained or generated based on the updated classifications.

Model designers may also use the DBM to interactively configure and create decision regions based on the observed relationships of data and attributes. The program will then construct the model from these sketched regions automatically.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:
generating a first similarity matrix encoding a similarity between a plurality of attributes;
generating a second similarity matrix encoding a similarity between a plurality of data samples;
fusing the first similarity matrix and the second similarity matrix to generate a first fused similarity matrix that encodes a similarity of the plurality of data samples with respect to the plurality of attributes and a second fused similarity matrix that encodes the similarity of the plurality of attributes with respect to the plurality of data samples;
generating a composite distance matrix based on the first similarity matrix, the second similarity matrix, the first fused similarity matrix and the second fused similarity matrix;
generating a data context map based on the composite distance matrix, the data context map presenting each data sample at a distance relative to each attribute based on a relative value of each attribute for the each data sample, wherein the data context map is a three dimensional scalar field data context map with gradient direction arrows, wherein the scalar field data context map comprises an automatically formed set of concentric contours and original data point values of the plurality of data samples, and wherein the concentric contours are computed separately for each of the plurality of attributes;
presenting the data context map to a user via a display device;
receiving an input and automatically modifying the display device from presenting the three dimensional scalar field data context map with gradient direction arrows as the context map to a two dimensional data context map as the context map;
receiving a selection on the presented data context map of a first data sample
receiving a selection on the presented data context map of a second data sample, the first data sample located closer to a first of the attributes on the presented data context map than the second data sample, the second data sample located closer to a second of the attributes on the presented data context map than the first data sample;
generating a pathway between the first data sample and the second data sample, the pathway comprising the first data sample, the second data sample, and at least one intermediate data sample, the intermediate data sample representing a tradeoff between the first data sample and the second data sample with respect to the first of the attributes and the second of the attributes; and
presenting the pathway to a user on the data context map via the display device.

2. The method of claim 1, wherein a location of the each data sample on the data context map is based at least in part on a similarity of the data sample to at least one other data sample and on a similarity between an attribute of the data sample to the same attribute of the at least one other data sample.

3. The method of claim 1, wherein a location of the each data sample on the context map is based at least in part on the similarity of the plurality of data samples with respect to the plurality of attributes encoded in the first fused similarity matrix and the similarity of the plurality of attributes with respect to the plurality of data samples encoded in the second fused similarity matrix.

4. The method of claim 1, wherein the first of the attributes and the second of the attributes are negatively correlated or have a level of similarity below a pre-determined threshold amount.

5. The method of claim 4, further comprising:
determining a first frontier pathway and a second frontier pathway based on the negative correlation or level of similarity between the first of the attributes and the second of the attributes, the first frontier pathway corresponding to data samples having as high a correlation between the first of the attributes and the second of the attributes as possible, the second frontier pathway corresponding to data samples having as low a correlation between the first of the attributes and the second of the attributes as possible; and
presenting the first frontier pathway and the second frontier pathways on the data context map.

6. The method of claim 1, further comprising:
receiving a selection of the first of the attributes and the second of the attributes; and
colorizing the contour lines of the 3D scalar field associated with the selected first of the attributes and second of the attributes, the contour lines associated with each selected attribute having a different color.

7. The method of claim 1, further comprising:
receiving a selection of a first criteria associated with a first of the attributes;
determining a first region of the data context map corresponding to the first criteria, the each data sample in the first region having corresponding attributes that meet the first criteria;
receiving a selection of a second criteria associated with the second of the attributes; and
determining a second region of the data context map corresponding to the second criteria, the each data sample in the second region having corresponding attributes that meet the second criteria,
wherein presenting the data context map includes presenting a visual indication of the first region and the second regions on the data context map to a user via the display device.

8. The method of claim 1, further comprising determining an impact region extending along the pathway and defining a pre-determined width about the pathway, the impact region comprising at least one intermediate data sample that is not located on the pathway but has a tradeoff between the first data sample and the second data sample with respect to the first of the attributes and the second of the attributes that is similar to a tradeoff that would be found in an intermediate data sample located on the pathway at a location adjacent to the at least one intermediate data sample.

9. A non-transitory computer readable medium storing instructions that, when executed by at least one hardware processor, configure the at least one hardware processor to:
generate a first similarity matrix encoding a similarity between a plurality of attributes;
generate a second similarity matrix encoding a similarity between a plurality of data samples;
fuse the first similarity matrix and the second similarity matrix to generate a first fused similarity matrix that encodes a similarity of the plurality of data samples with respect to the plurality of attributes and a second fused similarity matrix that encodes the similarity of the plurality of attributes with respect to the plurality of data samples;
generate a composite distance matrix based on the first similarity matrix, the second similarity matrix, the first fused similarity matrix and the second fused similarity matrix;
generate a data context map based on the composite distance matrix, the data context map presenting each data sample at a distance relative to each attribute based on a relative value of each attribute for the each data sample, wherein the data context map is a three dimensional scalar field data context map with gradient direction arrows, wherein the scalar field data context map comprises an automatically formed set of concentric contours and original data point values of the plurality of data samples, and wherein the concentric contours are computed separately for each of the plurality of attributes;
present the data context map to a user via a display device;
receive an input and automatically modify the display device from presenting the three dimensional scalar field data context map with gradient direction arrows as the context map to a two dimensional data context map as the context map;
receive a selection on the presented data context map of a first data sample;
receive a selection on the presented data context map of a second data sample, the first data sample located closer to a first of the attributes on the presented data context map than the second data sample, the second data sample located closer to a second of the attributes on the presented data context map than the first data sample;
generate a pathway between the first data sample and the second data sample, the pathway comprising the first data sample, the second data sample, and at least one intermediate data sample, the intermediate data sample representing a tradeoff between the first data sample and the second data sample with respect to the first of the attributes and the second of the attributes; and
present the pathway to a user on the data context map via the display device.

10. The non-transitory computer readable medium of claim 9, wherein a location of the each data sample on the data context map is based at least in part on a similarity of the data sample to at least one other data sample and a similarity between an attribute of the data sample to the same attribute of the at least one other data sample.

11. The non-transitory computer readable medium of claim 9, wherein a location of the each data sample on the context map is based at least in part on the similarity of the plurality of data samples with respect to the plurality of attributes encoded in the first fused similarity matrix and the similarity of the plurality of attributes with respect to the plurality of data samples encoded in the second fused similarity matrix.

12. The non-transitory computer readable medium of claim 9, wherein the first of the attributes and the second of the attributes are negatively correlated or have a level of similarity below a predetermined threshold amount.

13. The non-transitory computer readable medium of claim 12, the instructions further configuring the at least one hardware processor to:
- determine a first frontier pathway and a second frontier pathways based on the negative correlation or level of similarity between the first of the attributes and the second of the attributes, the first frontier pathway corresponding to data samples having as high a correlation between the first of the attributes and the second of the attributes as possible, the second frontier pathway corresponding to data samples having as low a correlation between the first attributes and the second attributes as possible; and
- present the first frontier pathway and the second frontier pathways on the data context map.

14. The non-transitory computer readable medium of claim 9, the instructions further configuring the at least one hardware processor to:
- receive a selection of the first of the attributes and the second of the attributes; and
- colorize the contour lines of the 3D scalar field associated with the selected first of the attributes and second of the attributes, the contour lines associated with each selected attribute having a different color.

15. The non-transitory computer readable medium of claim 9, the instructions further configuring the at least one hardware processor to:
- receive a selection of a first criteria associated with a first of the attributes;
- determine a first region of the data context map corresponding to the first criteria, the each data sample in the first region having corresponding attributes that meet the first criteria;
- receive a selection of a second criteria associated with the second of the attributes; and
- determine a second region of the data context map corresponding to the second criteria, the each data sample in the second region having corresponding attributes that meet the second criteria,
- wherein presenting the data context map includes presenting a visual indication of the first region and the second regions on the data context map to a user via the display device.

16. The non-transitory computer readable medium of claim 9, the instructions further configuring the at least one hardware processor to determine an impact region extending along the pathway and defining a pre-determined width about the pathway, the impact region comprising at least one intermediate data sample that is not located on the pathway but has a tradeoff between the first data sample and the second data sample with respect to the first of the attributes and the second of the attributes that is similar to a tradeoff that would be found in an intermediate data sample located on the pathway at a location adjacent to the at least one intermediate data sample.

17. A method comprising:
- receiving training data for training a machine learning model, the training data including a plurality of data samples;
- receiving classifier data for training the machine learning model, the classifier data including a plurality of attributes;
- generating a first similarity matrix encoding a similarity between the plurality of attributes of the classifier data;
- generating a second similarity matrix encoding a similarity between the plurality of data samples of the training data;
- fusing the first similarity matrix and the second similarity matrix to generate a first fused similarity matrix that encodes a similarity of the plurality of data samples with respect to the plurality of attributes and a second fused similarity matrix that encodes the similarity of the plurality of attributes with respect to the plurality of data samples;
- generating a composite distance matrix based on the first similarity matrix, the second similarity matrix, the first fused similarity matrix and the second fused similarity matrix;
- generating a data context map based on the composite distance matrix, the data context map presenting each data sample at a distance relative to each attribute based on a relative value of each attribute for the each data sample, wherein the data context map is a three dimensional scalar field data context map with gradient direction arrows, wherein the scalar field data context map comprises an automatically formed set of concentric contours and original data point values of the plurality of data samples, and wherein the concentric contours are computed separately for each of the plurality of attributes;
- receiving a selection of a first criteria associated with a first of the attributes;
- determining a first region of the data context map corresponding to the first criteria, the each data sample in the first region having corresponding attributes that meet the first criteria;
- receiving a selection of a second criteria associated with the second of the attributes;
- determining a second region of the data context map corresponding to the second criteria, the each data sample in the second region having corresponding attributes that meet the second criteria;
- presenting the data context map including the first region and the second regions to a user via a display device;
- receiving an input and automatically modifying the display device from presenting the three dimensional scalar field data context map with gradient direction arrows as the context map to a two dimensional data context map as the context map;
- receiving a user input selecting at least one data sample of the data context map, the user input indicating that the selected at least one data sample is misclassified; and
- updating the classification data based on the received user input.

18. The method of claim 17, further comprising training a machine learning model based on the training data and the updated classification data.

19. The method of claim 1, wherein computing the concentric contours comprises distributing continuously and smoothly the relative value for each attribute in an estimation area and maintaining the original data point values of the plurality of data samples.

20. The non-transitory computer readable medium of claim 9, wherein computing the concentric contours comprises distributing continuously and smoothly the relative value for each attribute in an estimation area and maintaining the original data point values of the plurality of data samples.

21. The method of claim 17, wherein computing the concentric contours comprises distributing continuously and smoothly the relative value for each attribute in an estimation area and maintaining the original data point values of the plurality of data samples.

* * * * *